United States Patent
Fujimoto et al.

(10) Patent No.: US 12,460,025 B2
(45) Date of Patent: Nov. 4, 2025

(54) POLYTETRAFLUOROETHYLENE PRODUCTION METHOD

(71) Applicant: DAIKIN INDUSTRIES, LTD., Osaka (JP)

(72) Inventors: Yohei Fujimoto, Osaka (JP); Kenji Ichikawa, Osaka (JP); Yoshinori Nanba, Osaka (JP); Taketo Kato, Osaka (JP); Taku Yamanaka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 722 days.

(21) Appl. No.: 17/747,655

(22) Filed: May 18, 2022

(65) Prior Publication Data

US 2022/0289877 A1 Sep. 15, 2022

Related U.S. Application Data

(63) Continuation of application No. PCT/JP2020/043293, filed on Nov. 19, 2020.

(30) Foreign Application Priority Data

Nov. 19, 2019 (JP) ................................. 2019-209153

(51) Int. Cl.
| | | |
|---|---|---|
| C08L 27/18 | (2006.01) | |
| C08F 2/30 | (2006.01) | |
| C08F 14/26 | (2006.01) | |
| C08L 27/12 | (2006.01) | |

(52) U.S. Cl.
CPC ............. *C08F 14/26* (2013.01); *C08L 27/12* (2013.01); *C08L 27/18* (2013.01); *C08F 2/30* (2013.01)

(58) Field of Classification Search
None
See application file for complete search history.

(56) References Cited

U.S. PATENT DOCUMENTS

| | | | | |
|---|---|---|---|---|
| 11,767,379 B2 * | 9/2023 | Nanba | .................... | C08F 259/08 |
| | | | | 526/242 |
| 2010/0160490 A1 * | 6/2010 | Leffew | .................... | C08F 14/26 |
| | | | | 523/201 |
| 2014/0200310 A1 | 7/2014 | Taira et al. | | |
| 2020/0392266 A1 | 12/2020 | Nanba et al. | | |
| 2021/0115224 A1 * | 4/2021 | Kato | ........................ | C08F 14/18 |
| 2022/0002531 A1 | 1/2022 | Nanba et al. | | |
| 2022/0010118 A1 | 1/2022 | Nanba et al. | | |

FOREIGN PATENT DOCUMENTS

| | | | | |
|---|---|---|---|---|
| JP | 5533961 B2 | 6/2014 | | |
| WO | 2010/075494 A1 | 7/2010 | | |
| WO | WO-2018181898 A1 * | 10/2018 | ............. | C08F 14/18 |
| WO | 2019/168183 A1 | 9/2019 | | |
| WO | 2020/105650 A1 | 5/2020 | | |
| WO | 2020/105651 A1 | 5/2020 | | |

OTHER PUBLICATIONS

Extended European Search Report dated Dec. 11, 2023 in European Application No. 20890067.0.
International Search Report of PCT/JP2020/043293 dated Jan. 26, 2021.
International Preliminary Report on Patentability with Translation of Written Opinion dated May 17, 2022 in International Application No. PCT/JP2020/043293.

\* cited by examiner

*Primary Examiner* — Richard A. Huhn
(74) *Attorney, Agent, or Firm* — Sughrue Mion, PLLC

(57) ABSTRACT

Provided is a method for producing polytetrafluoroethylene, which includes polymerizing tetrafluoroethylene in an aqueous medium in the presence of a nucleating agent and a polymer (I) containing a polymerization unit (I) based on a monomer represented by the general formula (I) to obtain polytetrafluoroethylene:

$$CX^1X^3=CX^2R(-CZ^1Z^2-A^0)_m \qquad (I)$$

wherein $X^1$ and $X^3$ are each independently F, Cl, H, or $CF_3$; $X^2$ is H, F, an alkyl group, or a fluorine-containing alkyl group; $A^0$ is an anionic group; R is a linking group; $Z^1$ and $Z^2$ are each independently H, F, an alkyl group, or a fluorine-containing alkyl group; and m is an integer of 1 or more.

10 Claims, No Drawings

POLYTETRAFLUOROETHYLENE PRODUCTION METHOD

CROSS-REFERENCE TO RELATED APPLICATIONS

This application is a Rule 53(b) Continuation of International Application No. PCT/JP2020/043293 filed Nov. 19, 2020, which claims priority based on Japanese Patent Application No. 2019-209153 filed Nov. 19, 2019, the respective disclosures of which are incorporated herein by reference in their entirety.

TECHNICAL FIELD

The present disclosure relates to a method for producing polytetrafluoroethylene.

BACKGROUND ART

In Patent Literature 1, particles containing a bulk of a fluoropolymer and a nucleus of a fluorinated ionomer are described.

CITATION LIST

Patent Literature

Patent Literature 1: International Publication No. WO 2010/075494

SUMMARY

The present disclosure provides a method for producing polytetrafluoroethylene, the method comprising polymerizing tetrafluoroethylene in an aqueous medium in the presence of a nucleating agent and a polymer (I) containing a polymerization unit (I) based on a monomer represented by the general formula (I) to obtain polytetrafluoroethylene:

$$CX^1X^3=CX^2R(-CZ^1Z^2-A^0)_m \quad (I)$$

wherein $X^1$ and $X^3$ are each independently F, Cl, H, or $CF_3$; $X^2$ is H, F, an alkyl group, or a fluorine-containing alkyl group; $A^0$ is an anionic group; R is a linking group; $Z^1$ and $Z^2$ are each independently H, F, an alkyl group, or a fluorine-containing alkyl group; and m is an integer of 1 or more.

EFFECTS

The present disclosure can provide a method for producing polytetrafluoroethylene, the method being capable of generating a sufficient number of polytetrafluoroethylene particles during polymerization, and capable of obtaining polytetrafluoroethylene primary particles having a small average primary particle size.

DESCRIPTION OF EMBODIMENTS

Hereinafter, specific embodiments of the present disclosure will now be described in detail, but the present disclosure is not limited to the following embodiments.

Before specifically describing the present disclosure, some terms used herein are defined or explained.

The term "organic group" as used herein means a group containing one or more carbon atoms or a group formed by removing one hydrogen atom from an organic compound.

Examples of the "organic group" include:
an alkyl group optionally having one or more substituents,
an alkenyl group optionally having one or more substituents,
an alkynyl group optionally having one or more substituents,
a cycloalkyl group optionally having one or more substituents,
a cycloalkenyl group optionally having one or more substituents,
a cycloalkadienyl group optionally having one or more substituents,
an aryl group optionally having one or more substituents,
an aralkyl group optionally having one or more substituents,
a non-aromatic heterocyclic group optionally having one or more substituents,
a heteroaryl group optionally having one or more substituents,
a cyano group,
a formyl group,
RaO—,
RaCO—,
$RaSO_2$—,
RaCOO—,
RaNRaCO—,
RaCONRa-,
RaOCO—,
$RaOSO_2$—, and
$RaNPRbSO_2$—,
wherein Ra is each independently
an alkyl group optionally having one or more substituents,
an alkenyl group optionally having one or more substituents,
an alkynyl group optionally having one or more substituents,
a cycloalkyl group optionally having one or more substituents,
a cycloalkenyl group optionally having one or more substituents,
a cycloalkadienyl group optionally having one or more substituents,
an aryl group optionally having one or more substituents,
an aralkyl group optionally having one or more substituents,
a non-aromatic heterocyclic group optionally having one or more substituents, or
a heteroaryl group optionally having one or more substituents, and
Rb is independently H or an alkyl group optionally having one or more substituents.

The organic group is preferably an alkyl group optionally having one or more substituents.

The term "substituent" as used herein means a group capable of replacing another atom or group. Examples of the "substituent" include an aliphatic group, an aromatic group, a heterocyclic group, an acyl group, an acyloxy group, an acylamino group, an aliphatic oxy group, an aromatic oxy group, a heterocyclic oxy group, an aliphatic oxycarbonyl group, an aromatic oxycarbonyl group, a heterocyclic oxycarbonyl group, a carbamoyl group, an aliphatic sulfonyl group, an aromatic sulfonyl group, a heterocyclic sulfonyl group, an aliphatic sulfonyloxy group, an aromatic sulfonyloxy group, a heterocyclic sulfonyloxy group, a sulfamoyl group, an aliphatic sulfonamide group, an aromatic sulfonamide group, a heterocyclic sulfonamide group, an amino group, an aliphatic amino group, an aromatic amino group, a heterocyclic amino group, an aliphatic oxycarbonylamino group, an aromatic oxycarbonylamino group, a heterocyclic oxycarbonylamino group, an aliphatic sulfinyl group, an aromatic sulfinyl group, an aliphatic thio group, an aromatic thio group, a hydroxy group, a cyano group, a sulfo group, a carboxy group, an aliphatic oxyamino group, an aromatic oxy amino group, a carbamoylamino group, a sulfamoylamino group, a halogen atom, a sulfamoylcarbamoyl group, a carbamoyl sulfamoyl group, a dialiphatic oxyphosphinyl group, and a diaromatic oxyphosphinyl group.

The aliphatic group may be saturated or unsaturated, and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic group include alkyl groups having 1 to 8, and preferably 1 to 4 carbon atoms in total, such as a methyl group, an ethyl group, a vinyl group, a cyclohexyl group, and a carbamoylmethyl group.

The aromatic group may have, for example, a nitro group, a halogen atom, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic group include aryl groups having 6 to 12 carbon atoms, and preferably 6 to 10 carbon atoms in total, such as a phenyl group, a 4-nitrophenyl group, a 4-acetylaminophenyl group, and a 4-methanesulfonylphenyl group.

The heterocyclic group may have a halogen atom, a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the heterocyclic group include 5- or 6-membered heterocyclic groups having 2 to 12, and preferably 2 to 10 carbon atoms in total, such as a 2-tetrahydrofuryl group and a 2-pyrimidyl group.

The acyl group may have an aliphatic carbonyl group, an arylcarbonyl group, a heterocyclic carbonyl group, a hydroxy group, a halogen atom, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the acyl group include acyl groups having 2 to 8, and preferably 2 to 4 carbon atoms in total, such as an acetyl group, a propanoyl group, a benzoyl group, and a 3-pyridinecarbonyl group.

The acylamino group may have an aliphatic group, an aromatic group, a heterocyclic group, or the like, and may have, for example, an acetylamino group, a benzoylamino group, a 2-pyridinecarbonylamino group, a propanoylamino group, or the like. Examples of the acylamino group include acylamino groups having 2 to 12 and preferably 2 to 8 carbon atoms in total, and alkylcarbonylamino groups having 2 to 8 carbon atoms in total, such as an acetylamino group, a benzoylamino group, a 2-pyridinecarbonylamino group, and a propanoylamino group.

The aliphatic oxycarbonyl group may be saturated or unsaturated, and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic oxycarbonyl group include alkoxycarbonyl groups having 2 to 8, and preferably 2 to 4 carbon atoms in total, such as a methoxycarbonyl group, an ethoxycarbonyl group, and a (t)-butoxycarbonyl group.

The carbamoyl group may have an aliphatic group, an aromatic group, a heterocyclic group, or the like. Examples of the carbamoyl group include an unsubstituted carbamoyl group and alkylcarbamoyl groups having 2 to 9 carbon atoms in total, and preferably an unsubstituted carbamoyl group and alkylcarbamoyl groups having 2 to 5 carbon atoms in total, such as a N-methylcarbamoyl group, a N,N-dimethylcarbamoyl group, and a N-phenylcarbamoyl group.

The aliphatic sulfonyl group may be saturated or unsaturated, and may have a hydroxy group, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic sulfonyl group include alkylsulfonyl groups having 1 to 6 carbon atoms in total, and preferably 1 to 4 carbon atoms in total, such as a methanesulfonyl group.

The aromatic sulfonyl group may have a hydroxy group, an aliphatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic sulfonyl group include arylsulfonyl groups having 6 to 10 carbon atoms in total, such as a benzenesulfonyl group.

The amino group may have an aliphatic group, an aromatic group, a heterocyclic group, or the like.

The acylamino group may have, for example, an acetylamino group, a benzoylamino group, a 2-pyridinecarbonylamino group, a propanoylamino group, or the like. Examples of the acylamino group include acylamino groups having 2 to 12 carbon atoms in total, preferably 2 to 8 carbon atoms in total, and more preferably alkylcarbonylamino groups having 2 to 8 carbon atoms in total, such as an acetylamino group, a benzoylamino group, a 2-pyridinecarbonylamino group, and a propanoylamino group.

The aliphatic sulfonamide group, the aromatic sulfonamide group, and the heterocyclic sulfonamide group may be, for example, a methanesulfonamide group, a benzenesulfonamide group, and a 2-pyridinesulfonamide group, respectively.

The sulfamoyl group may have an aliphatic group, an aromatic group, a heterocyclic group, or the like. Examples of the sulfamoyl group include a sulfamoyl group, alkylsulfamoyl groups having 1 to 9 carbon atoms in total, dialkylsulfamoyl groups having 2 to 10 carbon atoms in total, arylsulfamoyl groups having 7 to 13 carbon atoms in total, and heterocyclic sulfamoyl groups having 2 to 12 carbon atoms in total, more preferably a sulfamoyl group, alkylsulfamoyl groups having 1 to 7 carbon atoms in total, dialkylsulfamoyl groups having 3 to 6 carbon atoms in total, arylsulfamoyl groups having 6 to 11 carbon atoms in total, and heterocyclic sulfamoyl groups having 2 to 10 carbon atoms in total, such as a sulfamoyl group, a methylsulfamoyl group, a N,N-dimethylsulfamoyl group, a phenylsulfamoyl group, and a 4-pyridinesulfamoyl group.

The aliphatic oxy group may be saturated or unsaturated, and may have a methoxy group, an ethoxy group, an i-propyloxy group, a cyclohexyloxy group, a methoxyethoxy group, or the like. Examples of the aliphatic oxy group include alkoxy groups having 1 to 8, and preferably 1 to 6 carbon atoms in total, such as a methoxy group, an ethoxy group, an i-propyloxy group, a cyclohexyloxy group, and a methoxyethoxy group.

The aromatic amino group and the heterocyclic amino group each may have an aliphatic group, an aliphatic oxy group, a halogen atom, a carbamoyl group, a heterocyclic group ring-fused with the aryl group, and an aliphatic oxycarbonyl group, and preferably an aliphatic group having 1 to 4 carbon atoms in total, an aliphatic oxy group having 1 to 4 carbon atoms in total, a halogen atom, a carbamoyl group having 1 to 4 carbon atoms in total, a nitro group, or an aliphatic oxycarbonyl group having 2 to 4 carbon atoms in total.

The aliphatic thio group may be saturated or unsaturated, and examples include alkylthio groups having 1 to 8 carbon atoms in total, and more preferably 1 to 6 carbon atoms in total, such as a methylthio group, an ethylthio group, a carbamoylmethylthio group, and a t-butylthio group.

The carbamoylamino group may have an aliphatic group, an aryl group, a heterocyclic group, or the like. Examples of the carbamoylamino group include a carbamoylamino group, alkylcarbamoylamino groups having 2 to 9 carbon atoms in total, dialkylcarbamoylamino groups having 3 to 10 carbon atoms in total, arylcarbonylamino groups having 7 to 13 carbon atoms in total, and heterocyclic carbamoylamino groups having 3 to 12 carbon atoms in total, preferably a carbamoylamino group, alkylcarbamoylamino groups having 2 to 7 carbon atoms in total, dialkylcarbamoylamino groups having 3 to 6 carbon atoms in total, arylcarbonylamino groups having 7 to 11 carbon atoms in total, and heterocyclic carbamoylamino groups having 3 to 10 carbon atoms in total, such as a carbamoylamino group, a methylcarbamoylamino group, a N,N-dimethylcarbamoylamino group, a phenylcarbamoylimino group, and a 4-pyridinecarbamoylamino group.

A range specified by the endpoints as used herein includes all numerical values within the range (for example, the range of 1 to 10 includes 1.4, 1.9, 2.33, 5.75, 9.98, and the like).

The phrase "at least one" as used herein includes all numerical values equal to or greater than 1 (such as at least 2, at least 4, at least 6, at least 8, at least 10, at least 25, at least 50, and at least 100).

Next, the production method of the present disclosure will now be specifically described.

In the production method of the present disclosure, polytetrafluoroethylene (PTFE) is obtained by polymerizing tetrafluoroethylene (TFE) in an aqueous medium in the presence of a nucleating agent and a polymer (I).

By polymerizing TFE in the presence of a nucleating agent and a polymer (I), a sufficient number of PTFE particles can be generated during polymerization, and thus PTFE can be produced in a high yield. Further, by polymerizing TFE in the presence of a nucleating agent and a polymer (I), primary particles having a small average primary particle size and a small aspect ratio are readily obtained, and polymerization of TFE in an aqueous medium smoothly proceeds, thus enabling PTFE to be readily produced. In addition, coagulating the aqueous dispersion obtained by polymerization enables a PTFE powder to be recovered, and thus PTFE (an uncoagulated polymer) unlikely remains in discharge water remaining after the powder is recovered. Moreover, the resulting PTFE powder exhibits a high breaking strength and a long stress relaxation time.

<Nucleating Agent>

In the production method of the present disclosure, TFE is polymerized in the presence of a nucleating agent together with a polymer (I).

It can be said that the polymerization started when the gas fluoromonomer in the reactor became PTFE and the pressure drop in the reactor occurred. U.S. Pat. No. 3,391,099 (Punderson) discloses dispersion polymerization of TFE in an aqueous medium comprising two separate steps of a polymerization process comprising: first, formation of a polymer nucleus as a nucleation site, and then the growth step comprising polymerization of the established particles. The polymerization is usually started when both the monomer to be polymerized and the polymerization initiator are charged in the reactor. Further, in the present disclosure, an additive that relates to the formation of a nucleation site is referred to as a nucleating agent.

The nucleating agent to be used in the production method of the present disclosure is preferably at least one selected from the group consisting of fluoropolyether, a nonionic surfactant, and a chain transfer agent because more particles can be generated during polymerization.

In addition, as a nucleating agent to be used in the production method of the present disclosure, a chain transfer agent is more preferable, and a chain transfer agent and one or both of a nonionic surfactant and fluoropolyether are still more preferable because more particles can be generated during polymerization and, also, primary particles having a smaller average primary particle size and a smaller aspect ratio can be obtained. When a chain transfer agent and one or both of a nonionic surfactant and fluoropolyether are used as the nucleating agent, the nucleating agent contains a combination of a chain transfer agent and a nonionic surfactant, a combination of a chain transfer agent and fluoropolyether, or a combination of a chain transfer agent, a nonionic surfactant, and fluoropolyether. In particular, the nucleating agent is preferably a combination of a chain transfer agent and a nonionic surfactant.

<Fluoropolyether>

Fluoropolyether itself provides a polymerization field and can be a nucleation site.

Fluoropolyether is preferably perfluoropolyether.

Fluoropolyether preferably has a repeating unit represented by formulas (1a) to (1d):

(—CFCF₃—CF₂—O—)ₙ      (1a)

(—CF₂—CF₂—CF₂—O—)ₙ      (1b)

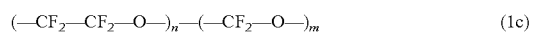

(—CF₂—CF₂—O—)ₙ—(—CF₂—O—)ₘ      (1c)

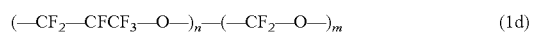

(—CF₂—CFCF₃—O—)ₙ—(—CF₂—O—)ₘ      (1d)

wherein m and n are each an integer of 1 or more.

Fluoropolyether is preferably fluoropolyether acid or a salt thereof, and fluoropolyether acid is preferably carboxylic acid, sulfonic acid, sulfonamide, or phosphonic acid, and more preferably carboxylic acid. Among fluoropolyether acid or a salt thereof, a salt of fluoropolyether acid is preferable, an ammonium salt of fluoropolyether acid is more preferable, and an ammonium salt of fluoropolyethercarboxylic acid is still more preferable.

Fluoropolyether acid or a salt thereof can have any chain structure in which oxygen atoms in the main chain of the molecule are separated by a saturated fluorocarbon group having 1 to 3 carbon atoms. Two or more types of fluorocarbon groups can be present in the molecule.

These structures are discussed in J. Appl. Polymer Sci., 57, 797 (1995) by Kasai. As disclosed herein, such fluoropolyether can have a carboxylic acid group or a salt thereof at one end or both ends. Similarly, such fluoropolyether may have a sulfonic acid or phosphonic acid group or a salt thereof at one end or both ends. In addition, fluoropolyether having acid functional groups at the opposite ends may have a different group at each end. Regarding monofunctional fluoropolyether, the other end of the molecule is usually perfluorinated, but may contain a hydrogen or chlorine atom.

Fluoropolyether having an acid group at one or both ends has at least two ether oxygen atoms, preferably at least four ether oxygen atoms, and still more preferably at least six ether oxygen atoms. Preferably, at least one fluorocarbon group separating ether oxygen atoms, more preferably at least two of such fluorocarbon groups, has 2 or 3 carbon atoms. Still more preferably, at least 50% of the fluorocarbon groups separating ether oxygen atoms has 2 or 3 carbon atoms. Also preferably, fluoropolyether has at least 15 carbon atoms in total, and, for example, a preferable minimum value of n or n+m in the repeating unit structure is preferably at least 5. Two or more kinds of fluoropolyether having an acid group at one end or both ends can be used in the method of the present disclosure. Typically, fluoropolyether may contain a plurality of compounds in varying proportions within the molecular weight range based on the average molecular weight, unless special care is taken in the production of a single specific fluoropolyether compound.

Fluoropolyether acid or a salt thereof is preferably a compound represented by the following formula:

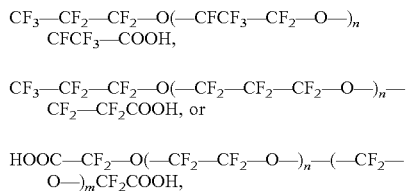

$CF_3$—$CF_2$—$CF_2$—O(—$CFCF_3$—$CF_2$—O—)$_n$
$CFCF_3$—COOH, $CF_3$—$CF_2$—$CF_2$—O(—$CF_2$—$CF_2$—$CF_2$—O—)$_n$—
$CF_2$—$CF_2$COOH, or

HOOC—$CF_2$—O(—$CF_2$—$CF_2$—O—)$_n$—(—$CF_2$—
O—)$_m$$CF_2$COOH, (wherein m and n are the same as those described above) or a salt thereof.

Fluoropolyether preferably has a number average molecular weight of 800 g/mol or more. Since it may be difficult to disperse fluoropolyether acid or a salt thereof in an aqueous medium, fluoropolyether acid or a salt thereof preferably has a number average molecular weight of less than 6,000 g/mol. Fluoropolyether acid or a salt thereof more preferably has a number average molecular weight of 900 g/mol or more, and still more preferably 1,000 g/mol or more. The number average molecular weight is preferably 3,500 g/mol or less, and more preferably 2,500 g/mol or less.

<Nonionic Surfactant>

The nonionic surfactant is usually free from a charged group and has a hydrophobic moiety that is a long chain hydrocarbon. The hydrophilic moiety of the nonionic surfactant contains a water-soluble functional group such as a chain of ethylene ether derived from polymerization with ethylene oxide.

Examples of the nonionic surfactant include the following.

Polyoxyethylene alkyl ether, polyoxyethylene alkyl phenyl ether, polyoxyethylene alkyl ester, sorbitan alkyl ester, polyoxyethylene sorbitan alkyl ester, glycerol ester, and derivatives thereof.

Specific examples of polyoxyethylene alkyl ethers: polyoxyethylene lauryl ether, polyoxyethylene cetyl ether, polyoxyethylene stearyl ether, polyoxyethylene oleyl ether, polyoxyethylene behenyl ether, and the like.

Specific examples of polyoxyethylene alkyl phenyl ether: polyoxyethylene nonylphenyl ether, polyoxyethylene octylphenyl ether, and the like.

Specific examples of polyoxyethylene alkyl esters: polyethylene glycol monolaurylate, polyethylene glycol monooleate, polyethylene glycol monostearate, and the like.

Specific examples of sorbitan alkyl ester: polyoxyethylene sorbitan monolaurate, polyoxyethylene sorbitan monopalmitate, polyoxyethylene sorbitan monostearate, polyoxyethylene sorbitan monooleate, and the like.

Specific examples of polyoxyethylene sorbitan alkyl ester: polyoxyethylene sorbitan monolaurate, polyoxyethylene sorbitan monopalmitate, polyoxyethylene sorbitan monostearate, and the like.

Specific examples of glycerol ester: glycerol monomyristate, glycerol monostearate, glycerol monooleate, and the like.

Specific examples of derivatives: polyoxyethylene alkylamine, polyoxyethylene alkyl phenyl-formaldehyde condensate, and polyoxyethylene alkyl ether phosphate.

Ethers and esters may have an HLB value of 10 to 18.

Examples of nonionic hydrocarbon surfactants include Triton® X series (X15, X45, X100, etc.), Tergitol® 15-S series, Tergitol® TMN series (TMN-6, TMN-10, TMN-100, etc.), and Tergitol® L series, manufactured by The Dow Chemical Company, Pluronic® R series (31R1, 17R2, 10R5, 25R4 (m to 22, n to 23), and Iconol® TDA series (TDA-6, TDA-9, TDA-10) manufactured by BASF.

The nonionic surfactant itself provides a polymerization field and, further, can be a nucleation site by giving a large number of low molecular weight fluoropolymers by chain transfer of radicals in the initial stage.

The nonionic surfactant is preferably a fluorine-free nonionic surfactant. Examples include ether-type nonionic surfactants such as polyoxyethylene alkyl phenyl ether, polyoxyethylene alkyl ether, and polyoxyethylene alkylene alkyl ether; polyoxyethylene derivatives such as ethylene oxide/propylene oxide block copolymers; ester-type nonionic surfactants such as sorbitan fatty acid esters, polyoxyethylene sorbitan fatty acid esters, polyoxyethylene sorbitol fatty acid esters, glycerin fatty acid esters, and polyoxyethylene fatty acid esters; and amine-based nonionic surfactants such as polyoxyethylene alkyl amine and alkylalkanolamide.

The hydrophobic group of the nonionic surfactant may be any of an alkylphenol group, a linear alkyl group, and a branched alkyl group.

Examples of the nonionic surfactant include nonionic surfactants represented by the general formula (i):

$R^3$—O-$A^1$-H     (i)

wherein $R^3$ is a linear or branched primary or secondary alkyl group having 8 to 18 carbon atoms, and $A^1$ is a polyoxyalkylene chain. $R^3$ preferably has 10 to 16, and more preferably 12 to 16 carbon atoms. When the number of carbon atoms of $R^3$ is 18 or less, good dispersion stability of the aqueous dispersion is likely obtained. On the other hand, when the number of carbon atoms of $R^3$ exceeds 18, it is difficult to handle the nonionic surfactant because of the high flow temperature. When $R^3$ has less than 8 carbon atoms, the surface tension of the aqueous dispersion is high, and the permeability and the wettability are likely impaired.

The polyoxyalkylene chain may be composed of oxyethylene and oxypropylene. The polyoxyalkylene chain is a polyoxyalkylene chain in which the average number of repeating oxyethylene groups is 5 to 20 and the average number of repeating oxypropylene groups is 0 to 2, and is a hydrophilic group. The number of oxyethylene units may have either a broad or narrow monomodal distribution as typically provided, or a broader or bimodal distribution which may be obtained by blending. When the average number of repeating oxypropylene groups is more than 0, the oxyethylene groups and the oxypropylene groups in the polyoxyalkylene chain may be arranged in a block-wise or random manner.

From the viewpoint of the viscosity and the stability of the aqueous dispersion, a polyoxyalkylene chain, in which the average number of repeating oxyethylene groups is 7 to 12, and the average number of repeating oxypropylene groups is 0 to 2, is preferable. In particular, $A^1$ having 0.5 to 1.5 oxypropylene groups on average favorably results in reduced foamability and is thus preferable.

More preferably, $R^3$ is (R')(R")HC—, wherein R' and R" are the same or different linear, branched, or cyclic alkyl groups, and the total amount of carbon atoms is at least 5, and preferably 7 to 17. Preferably, at least one of R' and R" is a branched or cyclic hydrocarbon group.

Specific examples of the nonionic surfactant include $C_{13}H_{27}$—O—$(C_2H_4O)_{10}$—H, $C_{12}H_{25}$—O—$(C_2H_4O)_{10}$—H, $C_{10}H_{21}CH(CH_3)$ $CH_2$—O—$(C_2H_4O)_9$—H, $C_{13}H_{27}$—O—$(C_2H_4O)_9$—(CH(CH$_3$) CH$_2$O)—H, $C_{16}H_{33}$—O—$(C_2H_4O)_{10}$—H, and HC($C_5H_{11}$)($C_7H_{15}$)—O—$(C_2H_4O)_9$—H.

Examples of the nonionic surfactant include block copolymers of polyethylene glycol-polypropylene glycol-polyethylene glycol.

Examples of commercially available products of the nonionic surfactant include Genapol X080 (product name, available from Clariant), NOIGEN TDS series (available from DKS Co., Ltd.) such as NOIGEN TDS-80 (trade name), LEOCOL TD series (available from Lion Corp.) such as LEOCOL TD-90 (trade name), LIONOL® TD series (available from Lion Corp.), T-Det A series (available from Harcros Chemicals Inc.) such as T-Det A 138 (trade name), and TERGITOL® 15 S series (available from The Dow Chemical Company).

The nonionic surfactant is preferably an ethoxylate of 2,6,8-trimethyl-4-nonanol having about 4 to about 18 ethylene oxide units on average, an ethoxylate of 2,6,8-trimethyl-4-nonanol having about 6 to about 12 ethylene oxide units on average, or a mixture thereof. This type of nonionic surfactant is also commercially available, for example, as TERGITOL TMN-6, TERGITOL TMLN-10, and TERGITOL TMN-100X (all product names, manufactured by The Dow Chemical Company).

The hydrophobic group of the nonionic surfactant may be any of an alkylphenol group, a linear alkyl group, and a branched alkyl group.

Examples of the nonionic surfactant also include nonionic surfactants represented by the following general formula (ii):

$$R^4—C_6H_4—O-A^2-H \quad (ii)$$

wherein $R^4$ is a linear or branched primary or secondary alkyl group having 4 to 12 carbon atoms, and $A^2$ is a polyoxyalkylene chain. Examples of the nonionic surfactant include Triton X-100 (trade name, manufactured by The Dow Chemical Company).

Examples of the nonionic surfactant also include polyol compounds. Specific examples include those described in International Publication No. WO 2011/014715.

Typical examples of polyol compounds include compounds having one or more sugar units as polyol units. The sugar units may be modified to contain at least one long chain. Examples of suitable polyol compounds containing at least one long chain moiety include alkyl glycosides, modified alkyl glycosides, sugar esters, and combinations thereof. Examples of sugars include, but are not limited to, monosaccharides, oligosaccharides, and sorbitans. Examples of monosaccharides include pentoses and hexoses. Typical examples of monosaccharides include ribose, glucose, galactose, mannose, fructose, arabinose, and xylose. Examples of oligosaccharides include oligomers of 2 to 10 of the same or different monosaccharides. Examples of oligosaccharides include, but are not limited to, saccharose, maltose, lactose, raffinose, and isomaltose.

Typically, sugars suitable for use as polyol compounds include cyclic compounds containing a 5-membered ring of four carbon atoms and one heteroatom (typically oxygen or sulfur, preferably an oxygen atom), or cyclic compounds containing a 6-membered ring of five carbon atoms and one heteroatom as described above, preferably, an oxygen atom. These further contain at least two or at least three hydroxy groups (—OH groups) bonded to carbon ring atoms. Typically, the sugars are modified in that one or more hydrogen atoms of hydroxy groups (and/or hydroxyalkyl groups) bonded to carbon ring atoms are replaced with long chain residues such that an ether or ester bond is created between a long chain residue and a sugar moiety.

The sugar-based polyol may contain a single sugar unit or a plurality of sugar units. The single sugar unit or the plurality of sugar units may be modified with long chain moieties as described above. Specific examples of sugar-based polyol compounds include glycosides, sugar esters, sorbitan esters, and mixtures and combinations thereof.

Preferable types of polyol compounds are alkyl or modified alkyl glucosides. These type of surfactants contains at least one glucose moiety. Examples of alkyl or modified alkyl glucosides include compounds represented by the formula:

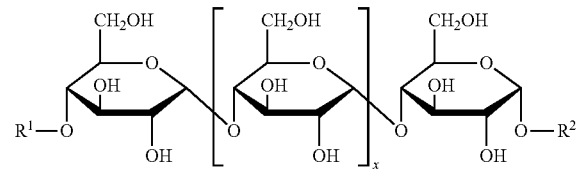

wherein x represents 0, 1, 2, 3, 4, or 5, and $R^1$ and $R^2$ each independently represent H or a long chain unit containing at least 6 carbon atoms, provided that at least one of $R^1$ and $R^2$ is not H. Typical examples of $R^1$ and $R^2$ include aliphatic alcohol residues. Examples of aliphatic alcohols include hexanol, heptanol, octanol, nonanol, decanol, undecanol, dodecanol (lauryl alcohol), tetradecanol, hexadecanol (cetyl alcohol), heptadecanol, octadecanol (stearyl alcohol), eicosanoic acid, and combinations thereof.

It is understood that the above formula represents specific examples of alkyl poly glucosides showing glucose in its pyranose form but other sugars or the same sugars but in different enantiomeric or diastereomeric forms may also be used.

Alkyl glucosides are obtainable by, for example, acid-catalyzed reactions of glucose, starch, or n-butyl glucoside with aliphatic alcohols, which typically yields a mixture of various alkyl glucosides (Alkylpolyglycoside, Rompp, Lexikon Chemie, Version 2.0, Stuttgart/New York, Georg Thieme Verlag, 1999). Examples of aliphatic alcohols include hexanol, heptanol, octanol, nonanol, decanol, undecanol, dodecanol (lauryl alcohol), tetradecanol, hexadecanol (cetyl alcohol), heptadecanol, octadecanol (stearyl alcohol), eicosanoic acid, and combinations thereof. Alkyl glucosides are also commercially available under the trade name GLUCOPON or DISPONIL from Cognis GmbH, Dusseldorf, Germany.

Examples of other nonionic surfactants include bifunctional block copolymers supplied from BASF as Pluronic® R series and tridecyl alcohol alkoxylates supplied from BASF as Iconol® TDA series.

The nonionic surfactant is preferably at least one selected from the group consisting of a nonionic surfactant represented by the general formula (i) and a nonionic surfactant represented by the general formula (ii).

<Chain Transfer Agent>

The chain transfer agent can be a nucleation site by giving a large number of low molecular weight fluoropolymers by chain transfer of radicals in the initial stage.

Examples of the chain transfer agent include esters such as dimethyl malonate, diethyl malonate, methyl acetate, ethyl acetate, butyl acetate, and dimethyl succinate, as well as isopentane, methane, ethane, propane, isobutane, methanol, ethanol, isopropanol, acetone, various mercaptans, various halogenated hydrocarbons such as carbon tetrachloride, and cyclohexane.

The chain transfer agent to be used may be a bromine compound or an iodine compound. An example of a polymerization method involving a bromine compound or an iodine compound is a method of performing polymerization of a fluoromonomer in an aqueous medium substantially in the absence of oxygen and in the presence of a bromine compound or an iodine compound (iodine transfer polymerization). Representative examples of the bromine compound or the iodine compound to be used include compounds represented by the following general formula:

$$R^aI_xBr_y$$

wherein x and y are each an integer of 0 to 2 and satisfy $1 \leq x+y \leq 2$; and $R^a$ is a saturated or unsaturated fluorohydrocarbon or chlorofluorohydrocarbon group having 1 to 16 carbon atoms, or a hydrocarbon group having 1 to 3 carbon atoms, each of which optionally contains an oxygen atom. By using a bromine compound or an iodine compound, iodine or bromine is introduced into the polymer, and serves as a crosslinking point.

Examples of the bromine compound or the iodine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1, and a monoiodo- and monobromo-substitution product, diiodo- and monobromo-substitution product, and (2-iodoethyl)- and (2-bromoethyl)-substitution product of benzene. These compounds may be used alone or in any combination.

Among these, the chain transfer agent is preferably at least one selected from the group consisting of alkane and alcohol from the viewpoints of polymerization reactivity, crosslinkablility, availability, and the like. The alkane preferably has 1 to 6, more preferably 2 to 4, and still more preferably 3 to 4 carbon atoms. Further, the alcohol preferably has 1 to 5, more preferably 1 to 4, and still more preferably 3 to 4 carbon atoms. The chain transfer agent is preferably at least one selected from the group consisting of alcohols having 1 to 4 carbon atoms and alkanes having 2 to 4 carbon atoms, and more preferably at least one selected from the group consisting of isopropanol, sec-butanol, and tert-butanol. In particular, by using a chain transfer agent containing tertiary carbon, more particles can be generated during polymerization.

<Polymer (I)>

The polymer (I) used in the production method of the present disclosure contains a polymer unit (I) based on a monomer represented by the general formula (I). The polymer (I) preferably contains two or more polymerization units (I):

$$CX^1X^3=CX^2R(-CZ^1Z^2-A^0)_m \qquad (I)$$

wherein $X^1$ and $X^3$ are each independently F, Cl, H, or $CF_3$; $X^2$ is H, F, an alkyl group, or a fluorine-containing alkyl group; $A^0$ is an anionic group; R is a linking group; $Z^1$ and $Z^2$ are each independently H, F, an alkyl group, or a fluorine-containing alkyl group; and m is an integer of 1 or more.

$X^2$ is preferably F, Cl, H, or $CF_3$. Further, $Z^1$ and $Z^2$ are preferably F or $CF_3$.

In the present disclosure, the anionic group includes a functional group that imparts an anionic group, e.g., an acid group such as —COOH and an acid base such as —$COONH_4$, in addition to anionic groups such as a sulfate group and a carboxylate group. The anionic group is preferably a sulfate group, a carboxylate group, a phosphate group, a phosphonate group, a sulfonate group, or —$C(CF_3)_2OM$, wherein M is —H, a metal atom, —$NR^7_4$, imidazolium optionally having a substituent, pyridinium optionally having a substituent, or phosphonium optionally having a substituent, and $R^7$ is H or an organic group.

The polymer (I) may contain the polymerization unit (I) that is based solely on one monomer represented by the general formula (I), or may contain the polymerization unit (I) that is based on two or more monomers represented by the general formula (I).

R is a linking group. The "linking group" as used herein is a (m+1)-valent linking group, and refers to a divalent group when m is 1. The linking group may be a single bond and preferably contains at least one carbon atom, and the number of carbon atoms may be 2 or more, 4 or more, 8 or more, 10 or more, or 20 or more. The upper limit is not limited, and may be 100 or less, and may be 50 or less, for example.

The linking group may be linear or branched, cyclic or acyclic, saturated or unsaturated, substituted or unsubstituted, and optionally contains one or more heteroatoms selected from the group consisting of sulfur, oxygen, and nitrogen, and optionally contains one or more functional groups selected from the group consisting of ester, amide, sulfonamide, carbonyl, carbonate, urethane, urea, and carbamate. The linking group may be free from carbon atoms and may be a catenary heteroatom such as oxygen, sulfur, or nitrogen.

m is an integer of 1 or more and is preferably 1 or 2 and more preferably 1. When m is an integer of 2 or more, $Z^1$, $Z^2$, and $A^0$ may be the same or different.

Next, a suitable configuration wherein m is 1 in the general formula (I) will now be described.

R is preferably a catenary heteroatom such as oxygen, sulfur, or nitrogen, or a divalent organic group.

When R is a divalent organic group, a hydrogen atom bonded to a carbon atom may be replaced with a halogen other than fluorine, such as chlorine, and the divalent organic group may or may not contain a double bond. Further, R may be linear or branched, and may be cyclic or acyclic. R may also contain a functional group (e.g., ester, ether, ketone (a keto group), amine, halide, etc.).

R may also be a fluorine-free divalent organic group or a partially fluorinated or perfluorinated divalent organic group.

R may be, for example, a hydrocarbon group in which a fluorine atom is not bonded to a carbon atom, a hydrocarbon group in which some of the hydrogen atoms bonded to carbon atoms are replaced with fluorine atoms, or a hydrocarbon group in which all of the hydrogen atoms bonded to carbon atoms are replaced with fluorine atoms, and these groups optionally contain an oxygen atom, optionally contain a double bond, and optionally contain a functional group.

R is preferably a hydrocarbon group having 1 to 100 carbon atoms that optionally contains an ether bond or a keto group, wherein some or all of the hydrogen atoms bonded to carbon atoms in the hydrocarbon group may be replaced with fluorine.

R is preferably at least one selected from —$(CH_2)_a$—, —$(CF_2)_a$—, —O—$(CF_2)_a$—, —$(CF_2)_a$—O—$(CF_2)_b$—, —O$(CF_2)_a$—O—$(CF_2)_b$—, —$(CF_2)_a$—[O—$(CF_2)_b$]$_c$—, —O$(CF_2)_a$—[O—$(CF_2)_b$]$_c$—, —[$(CF_2)_a$—O]$_b$—[$(CF_2)_c$—O]$_d$—, —O[$(CF_2)_a$—O]$_b$—[$(CF_2)_c$—O]$_d$—, —O—[$CF_2CF(CF_3)$O]$_a$—$(CF_2)_b$—, —[$CF_2CF(CF_3)$O]$_a$—, —[$CF(CF_3)CF_2$O]$_a$—, —$(CF_2)_a$—O—[$CF(CF_3)CF_2$O]$_a$—, —$(CF_2)_a$—O—[$CF(CF_3)CF_2$O]$_a$—$(CF_2)_b$—, —[$CF_2CF(CF_3)$]$_a$—CO—$(CF_2)_b$—, and combinations thereof.

In the formulas, a, b, c, and d are independently at least 1 or more. a, b, c, and d may independently be 2 or more, 3 or more, 4 or more, 10 or more, or 20 or more. The upper limits of a, b, c, and d are, for example, 100.

R is preferably a divalent group represented by the general formula (r1):

(r1)

wherein $X^6$ is each independently H, F, or $CF_3$; e is an integer of 0 to 3; f is an integer of 0 to 3; and g is 0 or 1, and more preferably a divalent group represented by the general formula (r2):

(r2)

wherein $X^7$ is each independently H, F, or $CF_3$; e is an integer of 0 to 3; and g is 0 or 1.

Specific suitable examples of R include —$CF_2$—O—, —$CF_2$—O—$CF_2$—, —$CF_2$—O—$CH_2$—, —$CF_2$—O—$CH_2CF_2$—, —$CF_2$—O—$CF_2CF_2$—, —$CF_2$—O—$CF_2CH_2$—, —$CF_2$—O—$CF_2CF_2CH_2$—, —$CF_2$—O—$CF(CF_3)$—, —$CF_2$—O—$CF(CF_3)CF_2$—, —$CF_2$—O—$CF(CF_3)CF_2$—O—, —$CF_2$—O—$CF(CF_3)CF_2$—O—$CF_2$—, and —$CF_2$—O—$CF(CF_3)CH_2$—. In particular, R is preferably a perfluoroalkylene group optionally containing an oxygen atom, and, specifically, —$CF_2$—O—, —$CF_2$—O—$CF_2$—, —$CF_2$—O—$CF_2CF_2$—, —$CF_2$—O—$CF(CF_3)$—, —$CF_2$—O—$CF(CF_3)CF_2$—, or —$CF_2$—O—$CF(CF_3)CF_2$—O— is preferable.

—R—$CZ^1Z^2$— in the general formula (I) is preferably what is represented by the general formula (s1):

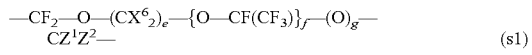

(s1)

(wherein $X^6$ is each independently H, F, or $CF_3$; e is an integer of 0 to 3; f is an integer of 0 to 3; g is 0 or 1; and $Z^1$ and $Z^2$ are each independently H, F, an alkyl group, or a fluorine-containing alkyl group), and more preferably, in the formula (s1), $Z^1$ and $Z^2$ are F or $CF_3$, and further preferably one is F, and the other is $CF_3$.

Further, —R—$CZ^1Z^2$— in the general formula (I) is preferably what is represented by the general formula (s2):

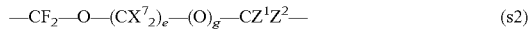

(s2)

(wherein $X^7$ is each independently H, F, or $CF_3$; e is an integer of 0 to 3; g is 0 or 1; and $Z^1$ and $Z^2$ are each independently H, F, an alkyl group, or a fluorine-containing alkyl group), and more preferably, in the formula (s2), $Z^1$ and $Z^2$ are F or $CF_3$, and further preferably one is F, and the other is $CF_3$.

—R—$CZ^1Z^2$— in the general formula (I) is preferably —$CF_2$—O—$CF_2$—, —$CF_2$—O—$CF(CF_3)$—, —$CF_2$—O—$C(CF_3)_2$—, —$CF_2$—O—$CF_2$—$CF_2$—, —$CF_2$—O—$CF_2$—$CF(CF_3)$—, —$CF_2$—O—$CF_2$—$C(CF_3)_2$—, —$CF_2$—O—$CF_2CF_2$—$CF_2$—, —$CF_2$—O—$CF_2CF_2$—$CF(CF_3)$—, —$CF_2$—O—$CF_2CF_2$—$C(CF_3)_2$—, —$CF_2$—O—$CF(CF_3)$—$CF_2$—, —$CF_2$—O—$CF(CF_3)$—$CF(CF_3)$—, —$CF_2$—O—$CF(CF_3)$—$C(CF_3)_2$—, —$CF_2$—O—$CF(CF_3)$—$CF(CF_3)$—, —$CF_2$—O—$CF(CF_3)$—$C(CF_3)_2$—, —$CF_2$—O—$CF(CF_3)$$CF_2$—$CF(CF_3)$—, —$CF_2$—O—$CF(CF_3)CF_2$—$CF(CF_3)$—, —$CF_2$—O—$CF(CF_3)CF_2$—$C(CF_3)_2$—, —$CF_2$—O—$CF(CF_3)CF_2$—O—$CF_2$—, —$CF_2$—O—$CF(CF_3)CF_2$—O—$CF(CF_3)$—, or —$CF_2$—O—$CF(CF_3)CF_2$—O—$C(CF_3)_2$—, and more preferably —$CF_2$—O—$CF(CF_3)$—, —$CF_2$—O—$CF_2$—$CF(CF_3)$—, —$CF_2$—O—$CF_2CF_2$—$CF(CF_3)$—, —$CF_2$—O—$CF(CF_3)$—$CF(CF_3)$—, —$CF_2$—O—$CF(CF_3)$$CF_2$—$CF(CF_3)$—, or —$CF_2$—O—$CF(CF_3)CF_2$—O—$CF(CF_3)$—.

Also preferably, the polymer (I) is highly fluorinated. Except for the anionic group ($A^0$) such as a phosphate group moiety (such as $CH_2OP(O)(OM)_2$) or a sulfate group moiety (such as $CH_2OS(O)_2OM$), 80% or more, 90% or more, 95% or more, or 100% of the C—H bonds in the polymer (I) are preferably replaced with C—F bonds.

The polymer (I) also preferably has a C—F bond and does not have a C—H bond, in the portion excluding the anionic group ($A^0$). In other words, in the general formula (I), preferably, $X^1$, $X^2$, and $X^3$ are all F, and R is a perfluoroalkylene group having one or more carbon atoms; the perfluoroalkylene group may be either linear or branched, may be either cyclic or acyclic, and may contain at least one catenary heteroatom. The perfluoroalkylene group may have 2 to 20 carbon atoms or 4 to 18 carbon atoms.

The polymer (I) may be partially fluorinated. In other words, the polymer (I) also preferably has at least one hydrogen atom bonded to a carbon atom and at least one fluorine atom bonded to a carbon atom, in the portion excluding the anionic group ($A^0$).

The anionic group ($A^0$) may be —$SO_3M$, —$OSO_3M$, —$COOM$, —$SO_2NR'CH_2COOM$, —$CH_2OP(O)(OM)_2$, [—$CH_2O]_2P(O)(OM)$, —$CH_2CH_2OP(O)(OM)_2$, [—$CH_2CH_2O]_2P(O)(OM)$, —$CH_2CH_2OSO_3M$, —$P(O)(OM)_2$, —$SO_2NR'CH_2CH_2OP(O)(OM)_2$, [—$SO_2NR'CH_2CH_2O]_2P(O)(OM)$, —$CH_2OSO_3M$, —$SO_2NR'CH_2CH_2OSO_3M$, or —$C(CF_3)_2OM$. Among these, —$SO_3M$, —COOM, or —$P(O)(OM)_2$ is preferable, —$SO_3M$ or —COOM is more preferable, and —COOM is still more preferable.

M is H, a metal atom, $NR^7_4$, imidazolium optionally having a substituent, pyridinium optionally having a substituent, or phosphonium optionally having a substituent, wherein $R^7$ is H or an organic group.

Examples of the metal atom include alkali metals (Group 1) and alkaline earth metals (Group 2), and preferable is Na, K, or Li.

M is preferably —H, a metal atom, or $NR^7_4$, more preferably —H, an alkali metal (Group 1), an alkaline earth metal (Group 2), or $NR^7_4$, still more preferably —H, —Na, —K, —Li, or $NH_4$, further preferably —H, —Na, —K, or $NH_4$, particularly preferably —H, —Na, or $NH_4$, and most preferably —H or —$NH_4$.

In the polymer (I), each polymerization unit (I) may have a different anionic group or may have the same anionic group.

The polymer (I) is also preferably a polymer containing a polymerization unit (Ia) based on a monomer represented by the general formula (Ia):

$$CF_2=CF-O-Rf^0-A^0 \quad (Ia)$$

wherein $A^0$ is an anionic group; and $Rf^0$ is a perfluorinated divalent linking group that is perfluorinated, may be a linear or branched, cyclic or acyclic, saturated or unsaturated, substituted or unsubstituted, and optionally contains one or more heteroatoms selected from the group consisting of sulfur, oxygen, and nitrogen.

The polymer (I) is also preferably a polymer containing a polymerization unit (Ib) based on a monomer represented by the general formula (Ib):

$$CH_2=CH-O-Rf^0-A^0 \quad (Ib)$$

wherein $A^0$ is an anionic group, and $Rf^0$ is a perfluorinated divalent linking group as defined in formula (Ia).

In a preferable embodiment, $A^0$ in the general formula (I) is a sulfate group. $A^0$ is, for example, $-CH_2OSO_3M$, $-CH_2CH_2OSO_3M$, or $-SO_2NR'CH_2CH_2OSO_3M$, wherein R' is H or an alkyl group having 1 to 4 carbon atoms, and M is as described above.

When $A^0$ is a sulfate group, examples of the monomer represented by the general formula (I) include $CF_2=CF(OCF_2CF_2CH_2OSO_3M)$, $CH_2=CH((CF_2)_4CH_2OSO_3M)$, $CF_2=CF(O(CF_2)_4CH_2OSO_3M)$, $CF_2=CF(OCF_2CF(CF_3)CH_2OSO_3M)$, $CF_2=CF(OCF_2CF(CF_3)OCF_2CF_2CH_2OSO_3M)$, $CH_2=CH((CF_2)_4CH_2OSO_3M)$, $CF_2=CF(OCF_2CF_2SO_2N(CH_3)CH_2CH_2OSO_3M)$, $CH_2=CH(CF_2CF_2CH_2OSO_3M)$, and $CF_2=CF(OCF_2CF_2CF_2CF_2SO_2N(CH_3)CH_2CH_2OSO_3M)$. In the formula, M is as described above.

In a preferable embodiment, $A^0$ in the general formula (I) is a sulfonate group. $A^0$ is, for example, $-SO_3M$, wherein M is as described above.

When $A^0$ is a sulfonate group, examples of the monomer represented by the general formula (I) include $CF_2=CF(OCF_2CF_2SO_3M)$, $CF_2=CF(O(CF_2)_3SO_3M)$, $CF_2=CF(O(CF_2)_4SO_3M)$, $CF_2=CF(OCF_2CF(CF_3)SO_3M)$, $CF_2=CF(OCF_2CF(CF_3)OCF_2CF_2SO_3M)$, $CH_2=CH(CF_2CF_2SO_3M)$, $CF_2=CF(OCF_2CF(CF_3)OCF_2CF_2CF_2SO_3M)$, $CH_2=CH((CF_2)_4SO_3M)$, and $CH_2=CH((CF_2)_3SO_3M)$. In the formula, M is as described above.

In a preferable embodiment, $A^0$ in the general formula (I) is a carboxylate group. $A^0$ is, for example, COOM or $SO_2NR'CH_2COOM$, wherein R' is H or an alkyl group having 1 to 4 carbon atoms, and M is as described above. When $A^0$ is a carboxylate group, examples of the monomer represented by the general formula (I) include $CF_2=CF(OCF_2CF_2COOM)$, $CF_2=CF(O(CF_2)_3COOM)$, $CF_2=CF(O(CF_2)_4COOM)$, $CF_2=CF(O(CF_2)_5COOM)$, $CF_2=CF(OCF_2CF(CF_3)COOM)$, $CF_2=CF(OCF_2CF(CF_3)O(CF_2)_nCOOM)$ (n is greater than 1), $CH_2=CH(CF_2CF_2COOM)$, $CH_2=CH((CF_2)_4COOM)$, $CH_2=CH((CF_2)_3COOM)$, $CF_2=CF(OCF_2CF_2SO_2NR'CH_2COOM)$, $CF_2=CF(O(CF_2)_4SO_2NR'CH_2COOM)$, $CF_2=CF(OCF_2CF(CF_3)SO_2NR'CH_2COOM)$, $CF_2=CF(OCF_2CF(CF_3)OCF_2CF_2SO_2NR'CH_2COOM)$, $CH_2=CH(CF_2CF_2SO_2NR'CH_2COOM)$, $CF_2=CF(OCF_2CF(CF_3)OCF_2CF_2CF_2SO_2NR'CH_2COOM)$, $CH_2=CH((CF_2)_4SO_2NR'CH_2COOM)$, and $CH_2=CH((CF_2)_3SO_2NR'CH_2COOM)$. In the formula, R' is H or an alkyl group having 1 to 4 carbon atoms, and M is as described above.

In a preferable embodiment, $A^0$ in the general formula (I) is a phosphate group. $A^0$ is, for example, $-CH_2OP(O)(OM)_2$, $[-CH_2O]_2P(O)(OM)$, $-CH_2CH_2OP(O)(OM)_2$, $[-CH_2CH_2O]_2P(O)(OM)$, $[-SO_2NR'CH_2CH_2O]_2P(O)(OM)$, or $SO_2NR'CH_2CH_2OP(O)(OM)_2$, wherein R' is an alkyl group having 1 to 4 carbon atoms, and M is as described above.

When $A^0$ is a phosphate group, examples of the monomer represented by the general formula (I) include $CF_2=CF(OCF_2CF_2CH_2OP(O)(OM)_2)$, $CF_2=CF(O(CF_2)_4CH_2OP(O)(OM)_2)$, $CF_2=CF(OCF_2CF(CF_3)CH_2OP(O)(OM)_2)$, $CF_2=CF(OCF_2CF(CF_3)OCF_2CF_2CH_2OP(O)(OM)_2)$, $CF_2=CF(OCF_2CF_2SO_2N(CH_3)CH_2CH_2OP(O)(OM)_2)$, $CF_2=CF(OCF_2CF_2CF_2CF_2SO_2N(CH_3)CH_2CH_2OP(O)(OM)_2)$, $CH_2=CH(CF_2CF_2CH_2OP(O)(OM)_2)$, $CH_2=CH((CF_2)_4CH_2OP(O)(OM)_2)$, and $CH_2=CH((CF_2)_3CH_2OP(O)(OM)_2)$. In the formula, M is as described above.

In a preferable embodiment, $A^0$ in the general formula (I) is a phosphonate group. When $A^0$ is a phosphonate group, examples of the monomer represented by the general formula (I) include $CF_2=CF(OCF_2CF_2P(O)(OM)_2)$, $CF_2=CF(O(CF_2)_4P(O)(OM)_2)$, $CF_2=CF(OCF_2CF(CF_3)P(O)(OM)_2)$, $CF_2=CF(OCF_2CF(CF_3)OCF_2CF_2P(O)(OM)_2)$, $CH_2=CH(CF_2CF_2P(O)(OM)_2)$, $CH_2=CH((CF_2)_4P(O)(OM)_2)$, and $CH_2=CH((CF_2)_3P(O)(OM)_2)$, wherein M is as described above.

The polymer (I) is preferably a polymer (1) containing a polymerization unit (1) based on a monomer represented by the general formula (1):

$$CX_2=CY(-CZ_2-O-Rf-A) \quad (1)$$

wherein X is the same or different and is —H or F; Y is —H, —F, an alkyl group, or a fluorine-containing alkyl group; Z is the same or different and is —H, —F, an alkyl group, or a fluoroalkyl group; Rf is a fluorine-containing alkylene group having 1 to 40 carbon atoms or a fluorine-containing alkylene group having 2 to 100 carbon atoms and having an ether bond; and A is —COOM, —SO_3M, —OSO_3M, or $C(CF_3)_2OM$, wherein M is —H, a metal atom, —NR$^7_4$, imidazolium optionally having a substituent, pyridinium optionally having a substituent, or phosphonium optionally having a substituent, and $R^7$ is H or an organic group, provided that at least one of X, Y, and Z contains a fluorine atom.

The fluorine-containing alkylene group having 2 to 100 carbon atoms and having an ether bond is an alkylene group that does not include a structure wherein an oxygen atom is an end and that contains an ether bond between carbon atoms.

In the general formula (1), each X is —H or F. Both X may be —F, or at least one may be —H. For example, one may be —F and the other may be —H, or both may be —H.

In the general formula (1), Y is —H, —F, an alkyl group, or a fluorine-containing alkyl group. The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms. The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms. Y is preferably —H, —F, or —CF_3, and more preferably —F.

In the general formula (1), Z is the same or different and is —H, —F, an alkyl group, or a fluoroalkyl group. The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms. The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms. Z is preferably —H, —F, or —CF$_3$, and more preferably —F.

In the general formula (1), at least one of X, Y, and Z contains a fluorine atom. For example, X may be —H, and Y and Z may be —F.

In the general formula (1), Rf is a fluorine-containing alkylene group having 1 to 40 carbon atoms or a fluorine-containing alkylene group having 2 to 100 carbon atoms and having an ether bond.

The fluorine-containing alkylene group preferably has 2 or more carbon atoms. Further, the fluorine-containing alkylene group preferably has 30 or less carbon atoms, more preferably 20 or less carbon atoms, still more preferably 10 or less carbon atoms, particularly preferably 6 or less carbon atoms, and most preferably 3 or less carbon atoms. Examples of the fluorine-containing alkylene group include —CF$_2$—, —CH$_2$CF$_2$—, —CF$_2$CF$_2$—, —CF$_2$CH$_2$—, —CF$_2$CF$_2$CF$_2$—, —CF$_2$CF$_2$CH$_2$—, —CF(CF$_3$)—, —CF(CF$_3$)CF$_2$—, and —CF(CF$_3$)CH$_2$—. The fluorine-containing alkylene group is preferably a perfluoroalkylene group.

The fluorine-containing alkylene group having an ether bond preferably has 3 or more carbon atoms. Further, the number of carbon atoms of the fluorine-containing alkylene group having an ether bond is preferably 60 or less, more preferably 30 or less, still more preferably 12 or less, particularly preferably 9 or less, and most preferably 6 or less. The fluorine-containing alkylene group having an ether bond is also preferably a divalent group represented by the general formula:

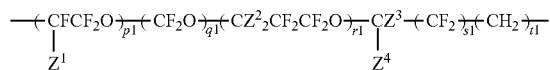

wherein $Z^1$ is F or CF$_3$; $Z^2$ and $Z^3$ are each H or F; $Z^4$ is H, F, or CF$_3$; p1+q1+r1 is an integer of 1 to 10; s1 is 0 or 1; and t1 is an integer of 0 to 5.

Specific examples of the fluorine-containing alkylene group having an ether bond include —CF(CF$_3$)CF$_2$—O—CF(CF$_3$)—, —(CF(CF$_3$)CF$_2$—O)$_n$—CF(CF$_3$)— (wherein n is an integer of 1 to 10), —CF(CF$_3$)CF$_2$—O—CF(CF$_3$)CH$_2$—, —(CF(CF$_3$)CF$_2$—O)$_n$—CF(CF$_3$)CH$_2$— (wherein n is an integer of 1 to 10), —CH$_2$CF$_2$CF$_2$O—CH$_2$CF$_2$CH$_2$—, —CF$_2$CF$_2$CF$_2$O—CF$_2$CF$_2$—, —CF$_2$CF$_2$CF$_2$O—CF$_2$CF$_2$CH$_2$—, —CF$_2$CF$_2$O—CF$_2$—, and —CF$_2$CF$_2$O—CF$_2$CH$_2$—. The fluorine-containing alkylene group having an ether bond is preferably a perfluoroalkylene group.

In the general formula (1), A is —COOM, —SO$_3$M, —OSO$_3$M, or —C(CF$_3$)$_2$OM, wherein M is H, a metal atom, —NR$^7_4$, imidazolium optionally having a substituent, pyridinium optionally having a substituent, or phosphonium optionally having a substituent, and R$^7$ is H or an organic group.

R$^7$ is preferably H or a C$_{1-10}$ organic group, more preferably H or a C$_{1-4}$ organic group, and still more preferably H or a C$_{1-4}$ alkyl group.

Examples of the metal atom include alkali metals (Group 1) and alkaline earth metals (Group 2), and preferable is Na, K, or Li.

M is preferably H, a metal atom, or NR$^7_4$, more preferably H, an alkali metal (Group 1), an alkaline earth metal (Group 2), or NR$^7_4$, still more preferably H, Na, K, Li, or NH$_4$, further preferably H, Na, K, or NH$_4$, particularly preferably H, —Na, or NH$_4$, and most preferably H or NH$_4$.

A is preferably —COOM or —SO$_3$M, and more preferably —COOM.

Examples of the monomer represented by the general formula (1) include fluoroallyl ether compounds represented by the general formula (1a):

$$CX_2=CFCF_2-O-(CF(CF_3)CF_2O)_{n5}-CF(CF_3)\text{-}A \qquad (1a)$$

wherein each X is the same and represents F or H; n5 represents an integer of 0 or 1 to 10; and A is as defined above.

In the general formula (1a), n5 is preferably an integer of 0 or 1 to 5, more preferably 0, 1, or 2, and still more preferably 0 or 1.

The polymer (1) may be a homopolymer of the fluoroallyl ether compound represented by the general formula (1a), or may be a copolymer with a further monomer.

The polymerization unit (1) is preferably a polymerization unit (1A) based on a monomer represented by the general formula (1A):

$$CH_2=CF(-CF_2-O-Rf\text{-}A) \qquad (1A)$$

wherein Rf and A are as described above.

The polymer (1) may be a homopolymer of the monomer represented by the general formula (1A), or may be a copolymer with a further monomer.

Specific examples of the monomer represented by the formula (1A) include monomers represented by the general formula:

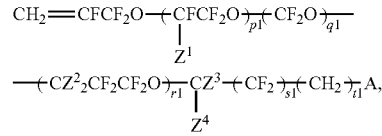

wherein $Z^1$ is F or CF$_3$; $Z^2$ and $Z^3$ are each H or F; $Z^4$ is H, F, or CF$_3$; p1+q1+r1 is an integer of 0 to 10; s1 is 0 or 1; t1 is an integer of 0 to 5, provided that when $Z^3$ and $Z^4$ are both H, p1+q1+r1+s1 is not 0; and A is as defined above. More specific examples preferably include:

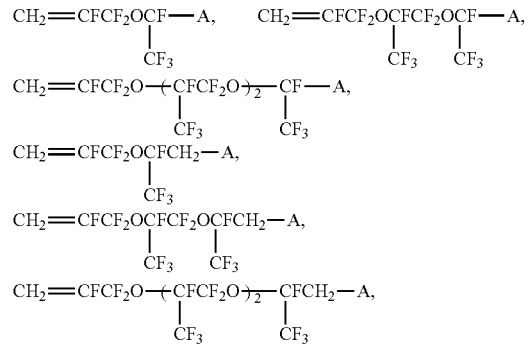

CH$_2$=CFCF$_2$OCH$_2$CF$_2$-A, CH$_2$=CFCF$_2$O(CH$_2$CF$_2$CF$_2$O)CH$_2$CF$_2$-A,
CH$_2$=CFCF$_2$OCH$_2$CF$_2$CH$_2$-A,
CH$_2$=CFCF$_2$O(CH$_2$CF$_2$CF$_2$O)CH$_2$CF$_2$CH$_2$-A,
CH$_2$=CFCF$_2$OCF$_2$CF$_2$-A, CH$_2$=CFCF$_2$O(CF$_2$CF$_2$CF$_2$O)CF$_2$CF$_2$-A,
CH$_2$=CFCF$_2$OCF$_2$CF$_2$CH$_2$-A,
CH$_2$=CFCF$_2$O(CF$_2$CF$_2$CF$_2$O)CF$_2$CF$_2$CH$_2$-A,
CH$_2$=CFCF$_2$OCF$_2$-A, CH$_2$=CFCF$_2$O(CF$_2$CF$_2$O)CF$_2$-A,
CH$_2$=CFCF$_2$OCF$_2$CH$_2$-A,
CH$_2$=CFCF$_2$O(CF$_2$CF$_2$O)CF$_2$CH$_2$-A,

Of these,

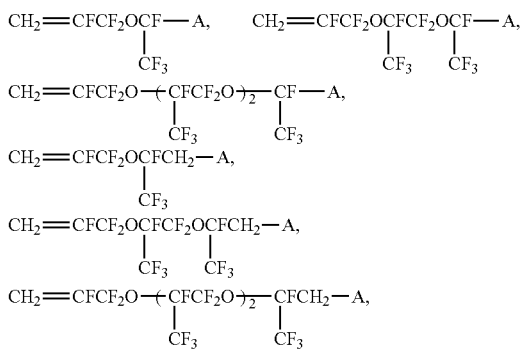

are preferable.

In the monomer represented by the general formula (1A), A in the formula (1A) is preferably —COOM. Specifically, the monomer represented by the general formula (1A) is preferably at least one selected from the group consisting of CH$_2$=CFCF$_2$OCF(CF$_3$)COOM and CH$_2$=CFCF$_2$OCF(CF$_3$)CF$_2$OCF(CF$_3$)COOM (wherein M is as defined above), and more preferably CH$_2$=CFCF$_2$OCF(CF$_3$)COOM.

Examples of the monomer represented by the general formula (1) further include monomers represented by the following formula:

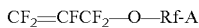

wherein Rf and A are as described above.

More specific examples include:

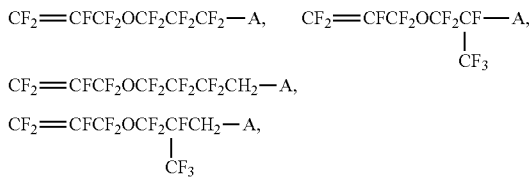

and the like.

The polymer (I) is also preferably a polymer (2) containing a polymerization unit (2) based on a monomer represented by the general formula (2):

CX$_2$=CY(—O—Rf-A)　　(2)

wherein X is the same or different and is —H or F; Y is —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond or a keto group; and A is as described above.

In the general formula (2), each X is —H or —F. X may be both —F, or at least one may be —H. For example, one may be —F and the other may be —H, or both may be —H.

In the general formula (2), Y is —H, —F, an alkyl group, or a fluorine-containing alkyl group. The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms. The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms. Y is preferably —H, —F, or —CF$_3$, and more preferably —F.

In the general formula (2), at least one of X and Y preferably contains a fluorine atom. For example, X may be —H, and Y and Z may be —F.

In the general formula (2), Rf is a fluorine-containing alkylene group having 1 to 40 carbon atoms, a fluorine-containing alkylene group having 2 to 100 carbon atoms and having an ether bond, or a fluorine-containing alkylene group having 2 to 100 carbon atoms and having a keto group. The fluorine-containing alkylene group having 2 to 100 carbon atoms and having an ether bond is an alkylene group that does not include a structure wherein an oxygen atom is an end and that contains an ether bond between carbon atoms.

The fluorine-containing alkylene group of Rf preferably has 2 or more carbon atoms. Further, the number of carbon atoms is preferably 30 or less, more preferably 20 or less, still more preferably 10 or less, and particularly preferably 5 or less. Examples of the fluorine-containing alkylene group include —CF$_2$—, —CH$_2$CF$_2$—, —CF$_2$CF$_2$—, —CF$_2$CH$_2$—, —CF$_2$CF$_2$CH$_2$—, —CF(CF$_3$)—, —CF(CF$_3$)CF$_2$—, —CF(CF$_3$)CH$_2$—, —CF$_2$CF$_2$CF$_2$—, and —CF$_2$CF$_2$CF$_2$CF$_2$—. The fluorine-containing alkylene group is preferably a perfluoroalkylene group, and more preferably an unbranched linear perfluoroalkylene group.

The fluorine-containing alkylene group having an ether bond preferably has 3 or more carbon atoms. Further, the fluorine-containing alkylene group having an ether bond preferably has 60 or less, more preferably 30 or less, still more preferably 12 or less carbon atoms, and particularly preferably 5 or less carbon atoms. The fluorine-containing alkylene group having an ether bond is also preferably a divalent group represented by the general formula:

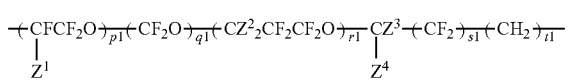

wherein Z$^1$ is F or CF$_3$; Z$^2$ and Z$^3$ are each H or F; Z$^4$ is H, F, or CF$_3$; p1+q1+r1 is an integer of 1 to 10; s1 is 0 or 1; and t1 is an integer of 0 to 5.

Specific examples of the fluorine-containing alkylene group having an ether bond include —CF$_2$CF(CF$_3$)OCF$_2$CF$_2$—, —CF(CF$_3$)CF$_2$—O—CF(CF$_3$)—, —(CF(CF$_3$)CF$_2$—O)$_n$—CF(CF$_3$)— (wherein n is an integer of 1 to 10), —CF(CF$_3$)CF$_2$—O—CF(CF$_3$)CH$_2$—, —(CF(CF$_3$)CF$_2$—O)$_n$—CF(CF$_3$)CH$_2$— (wherein n is an integer of 1 to 10), —CH$_2$CF$_2$CF$_2$O—CH$_2$CF$_2$CH$_2$—, —CF$_2$CF$_2$CF$_2$O—CF$_2$—, —CF$_2$CF$_2$CF$_2$O—CF$_2$CF$_2$—, —CF$_2$CF$_2$CF$_2$O—CF$_2$CF$_2$CF$_2$—, —CF$_2$CF$_2$CF$_2$O—CF$_2$CF$_2$CH$_2$—, —CF$_2$CF$_2$O—CF$_2$—, and —CF$_2$CF$_2$O—CF$_2$CH$_2$—. The fluorine-containing alkylene group having an ether bond is preferably a perfluoroalkylene group.

The fluorine-containing alkylene group having a keto group preferably has 3 or more carbon atoms. Further, the number of carbon atoms of the fluorine-containing alkylene group having a keto group is preferably 60 or less, more preferably 30 or less, still more preferably 12 or less, and particularly preferably 5 or less.

Examples of the fluorine-containing alkylene group having a keto group include $-CF_2CF(CF_3)CO-CF_2-$, $-CF_2CF(CF_3)CO-CF_2CF_2-$, $-CF_2CF(CF_3)CO-CF_2CF_2CF_2-$, and $-CF_2CF(CF_3)CO-CF_2CF_2CF_2CF_2-$. The fluorine-containing alkylene group having a keto group is preferably a perfluoroalkylene group.

The monomer represented by the general formula (2) is preferably at least one selected from the group consisting of monomers represented by the following general formulas (2a), (2b), (2c), (2d), and (2e):

$$CF_2=CF-O-(CF_2)_{n1}\text{-}A \qquad (2a)$$

wherein n1 represents an integer of 1 to 10, and A is as defined above;

$$CF_2=CF-O-(CF_2C(CF_3)F)_{n2}\text{-}A \qquad (2b)$$

wherein n2 represents an integer of 1 to 5, and A is as defined above;

$$CF_2=CF-O-(CFX^1)_{n3}\text{-}A \qquad (2c)$$

wherein $X^1$ represents F or $CF_3$, n3 represents an integer of 1 to 10, and A is as defined above;

$$CF_2=CF-O-(CF_2CFX^1O)_{n4}-(CF_2)_{n6}\text{-}A \qquad (2d)$$

wherein n4 represents an integer of 1 to 10, n6 represents an integer of 1 to 3, and A and $X^1$ are as defined above; and $$CF_2=CF-O-(CF_2CF_2CFX^1O)_{n5}-CF_2CF_2CF_2\text{-}A \qquad (2e)$$

wherein n5 represents an integer of 0 to 10, and A and $X^1$ are as defined above.

In the general formula (2a), n1 is preferably an integer of 5 or less, and more preferably an integer of 2 or less.

Examples of the monomer represented by the general formula (2a) include $CF_2=CF-O-CF_2COOM$, $CF_2=CF(OCF_2CF_2COOM)$, $CF_2=CF(O(CF_2)_3COOM)$, and $CF_2=CF(OCF_2CF_2SO_3M)$, wherein M is as defined above.

In the general formula (2b), n2 is preferably an integer of 3 or less from the viewpoint of dispersion stability of the resulting composition.

In the general formula (2c), n3 is preferably an integer of 5 or less from the viewpoint of water solubility, A is preferably $-COOM$, and M is preferably H or $NH_4$.

In the general formula (2d), $X^1$ is preferably $-CF_3$ from the viewpoint of dispersion stability of the composition, n4 is preferably an integer of 5 or less from the viewpoint of water solubility, A is preferably $-COOM$, and M is preferably H or $NH_4$.

Examples of the monomer represented by the general formula (2d) include $CF_2=CFOCF_2CF(CF_3)OCF_2CF_2COOM$, $CF_2=CFOCF_2CF(CF_3)OCF_2COOM$, and $CF_2=CFOCF_2CF(CF_3)OCF_2CF_2CF_2COOM$ (wherein M represents H, $NH_4$, or an alkali metal).

In the general formula (2e), n5 is preferably an integer of 5 or less from the viewpoint of water solubility, A is preferably $-COOM$, and M is preferably H or $NH_4$.

Examples of the monomer represented by the general formula (2e) include $CF_2=CFOCF_2CF_2CF_2COOM$ (wherein M represents H, $NH_4$, or an alkali metal).

The polymer (I) is also preferably a polymer (3) containing a polymerization unit (3) based on a monomer represented by general formula (3):

$$CX_2=CY(-Rf\text{-}A) \qquad (3)$$

wherein X is the same or different and is $-H$ or $-F$; Y is $-H$, $-F$, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and A is as described above.

The fluorine-containing alkylene group having 2 to 100 carbon atoms and having an ether bond is an alkylene group that does not include a structure wherein an oxygen atom is an end and that contains an ether bond between carbon atoms.

In the general formula (3), Rf is preferably a fluorine-containing alkylene group having 1 to 40 carbon atoms. In the general formula (3), at least one of X and Y preferably contains a fluorine atom.

The monomer represented by the general formula (3) is preferably at least one selected from the group consisting of a monomer represented by the general formula (3a):

$$CF_2=CF-(CF_2)_{n1}\text{-}A \qquad (3a)$$

wherein n1 represents an integer of 1 to 10, and A is as defined above; and a monomer represented by the general formula (3b):

$$CF_2=CF-(CF_2C(CF_3)F)_{n2}\text{-}A \qquad (3b)$$

wherein n2 represents an integer of 1 to 5, and A is as defined above.

In general formulas (3a) and (3b), A is preferably $-SO_3M$ or $-COOM$, and M is preferably H, a metal atom, $NR^7_4$, imidazolium optionally having a substituent, pyridinium optionally having a substituent, or phosphonium optionally having a substituent. $R^7$ represents H or an organic group.

In the general formula (3a), n1 is preferably an integer of 5 or less, and more preferably an integer of 2 or less. A is preferably $-COOM$, and M is preferably H or $NH_4$.

Examples of the monomer represented by the general formula (3a) include $CF_2=CFCF_2COOM$, wherein M is as defined above.

In the general formula (3b), n2 is preferably an integer of 3 or less from the viewpoint of dispersion stability of the resulting composition, A is preferably $-COOM$, and M is preferably H or $NH_4$.

Next, a suitable configuration wherein m is an integer of 2 or more in the general formula (I) will now be described.

The polymer (I) is also preferably a polymer (4) containing a polymerization unit (4) that is based on at least one monomer selected from the group consisting of monomers represented by the general formulas (4a) and (4b):

$$CF_2=CF-CF_2-O-Q^{F1}\text{-}CF(-Q^{F2}\text{-}CZ^1Z^2\text{-}A)_2 \qquad (4a)$$

wherein $Z^1$, $Z^2$, and A are as defined above, and $Q^{F1}$ and $Q^{F2}$ are the same or different and are a single bond, a fluorine-containing alkylene group optionally containing an ether bond between carbon atoms, or a fluorine-containing oxyalkylene group optionally containing an ether bond between carbon atoms; and $$CF_2=CF-O-Q^{F1}\text{-}CF(-Q^{F2}\text{-}CZ^1Z^2\text{-}A)_2 \qquad (4b)$$

wherein $Z^1$, $Z^2$, A, $Q^{F1}$, and $Q^{F2}$ are as defined above.

Examples of the monomers represented by the general formulas (4a) and (4b) include:

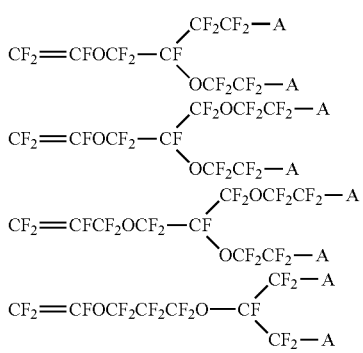

and the like.

The polymer (I) is preferably at least one selected from the group consisting of the polymer (1), the polymer (2), and the polymer (3), and the polymer (1) is more preferable.

The polymer (I) may be a homopolymer composed solely of the polymerization unit (I), or may be a copolymer containing the polymerization unit (I) and a polymerization unit that is based on a further monomer copolymerizable with the monomer represented by the general formula (I). From the viewpoint of solubility in an aqueous medium, a homopolymer composed solely of the polymerization unit (I) is preferable. The polymerization unit (I) may be the same or different at each occurrence, and may contain the polymerization unit (I) that is based on two or more different monomers represented by the general formula (I).

The further monomer is preferably a monomer represented by the general formula $CFR=CR_2$ wherein R is independently H, F, or a perfluoroalkyl group having 1 to 4 carbon atoms). Also, the further monomer is preferably a fluorine-containing ethylenic monomer having 2 or 3 carbon atoms. Examples of the further monomer include $CF_2=CF_2$, $CF_2=CFCl$, $CH_2=CF_2$, $CFH=CH_2$, $CFH=CF_2$, $CF_2=CFCF_3$, $CH_2=CFCF_3$, $CH_2=CHCF_3$, $CHF=CHCF_3$ (E-form), and $CHF=CHCF_3$ (Z-form).

Among these, from the viewpoint of good copolymerizability, at least one selected from the group consisting of tetrafluoroethylene ($CF_2=CF_2$), chlorotrifluoroethylene ($CF_2=CFCl$), and vinylidene fluoride ($CH_2=CF_2$) is preferable, and tetrafluoroethylene is more preferable. Accordingly, the polymerization unit that is based on the further monomer is preferably a polymerization unit that is based on tetrafluoroethylene. The polymerization unit that is based on the further monomer may be the same or different at each occurrence, and the polymer (I) may contain a polymerization unit that is based on two or more different further monomers.

Examples of the further monomer include monomers represented by the general formula (n1-2):

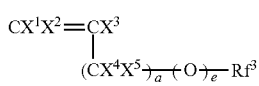
(n1-2)

wherein $X^1$ and $X^2$ are the same or different and H or F; $X^3$ is H, F, Cl, $CH_3$, or $CF_3$; $X^4$ and $X^5$ are the same or different and H or F; a and c are the same or different and 0 or 1; and $Rf^3$ is a fluorine-containing alkyl group having 1 to 40 carbon atoms or a fluorine-containing alkyl group having 2 to 100 carbon atoms and having an ether bond.

Specifically, preferable examples include $CH_2=CFCF_2—O—Rf^3$, $CF_2=CF—O—Rf^3$, $CF_2=CFCF_2—O—Rf^3$, $CF_2=CF—Rf^3$, $CH_2=CH—Rf^3$, and $CH_2=CH—O—Rf^3$ (wherein $Rf^3$ is as in the above formula (n1-2)).

Examples of the further monomer also include fluorine-containing acrylate monomers represented by the formula (n2-1):

wherein $X^9$ is H, F, or $CH_3$; and $Rf^4$ is a fluorine-containing alkyl group having 1 to 40 carbon atoms or a fluorine-containing alkyl group having 2 to 100 carbon atoms and having an ether bond. Examples of the $Rf^4$ group include:

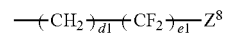

wherein $Z^8$ is H, F or Cl; d1 is an integer of 1 to 4; and e1 is an integer of 1 to 10;

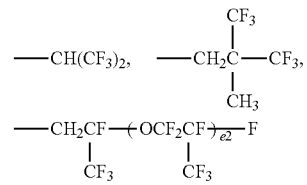

wherein e2 is an integer of 1 to 5; and

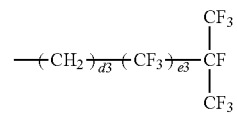

wherein d3 is an integer of 1 to 4; and e3 is an integer of 1 to 10.

Examples of the further monomer also include fluorine-containing vinyl ether represented by the formula (n2-2):

$CH_2=CHO—Rf^5$ (n2-2)

wherein $Rf^5$ is a fluorine-containing alkyl group having 1 to 40 carbon atoms or a fluorine-containing alkyl group having 2 to 100 carbon atoms and having an ether bond.

Specifically, preferable examples of the monomer represented by the general formula (n2-2) include:

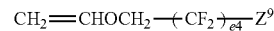

wherein $Z^9$ is H or F; and e4 is an integer of 1 to 10;

wherein e5 is an integer of 1 to 10; and

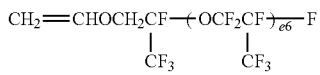

wherein e6 is an integer of 1 to 10.
More specific examples include:
$CH_2=CHOCH_2CF_2CF_2H$,

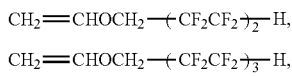

$CH_2=CHOCH_2CF_2CF_3$,
$CH_2=CHOCH_2CF_3$,

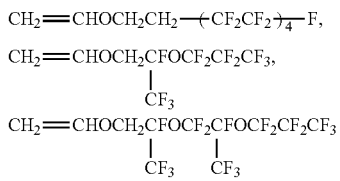

and the like.

In addition, examples also include fluorine-containing allyl ether represented by the general formula (n2-3):

$CH_2=CHCH_2O-Rf^6$ (n2-3)

wherein $Rf^6$ is a fluorine-containing alkyl group having 1 to 40 carbon atoms or a fluorine-containing alkyl group having 2 to 100 carbon atoms and having an ether bond; and fluorine-containing vinyl monomers represented by the general formula (n2-4):

$CH_2=CH-Rf^7$ (n2-4)

wherein $Rf^7$ is a fluorine-containing alkyl group having 1 to 40 carbon atoms or a fluorine-containing alkyl group having 2 to 100 carbon atoms and having an ether bond.

Specific examples of monomers represented by formulas (n2-3) and (n2-4) include monomers such as:
$CH_2=CHCH_2OCH_2CF_2CF_2H$,

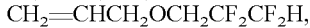

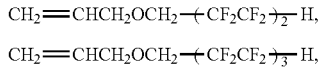

$CH_2=CHCH_2OCH_2CF_2CF_3$,
$CH_2=CHCH_2OCH_2CF_3$,

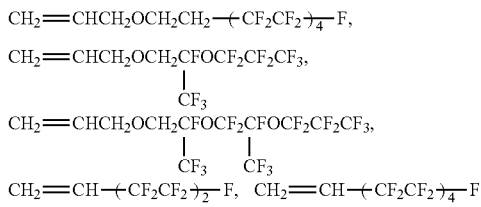

and the like.

The polymer (I) usually has a terminal group. The terminal group is a terminal group generated during polymerization, and a representative terminal group is independently selected from hydrogen, iodine, bromine, a linear or branched alkyl group, and a linear or branched fluoroalkyl group, and may optionally contain at least one catenary heteroatom. The alkyl group or fluoroalkyl group preferably has 1 to 20 carbon atoms. These terminal groups are, in general, produced from an initiator or a chain transfer agent used to form the polymer (I) or produced during a chain transfer reaction.

The content of the polymerization unit (I) in the polymer (I) is preferably 1.0 mol % or more, more preferably 3.0 mol % or more, still more preferably 5.0 mol % or more, further preferably 10 mol % or more, still further preferably 20 mol % or more, and particularly preferably 30 mol % or more based on all polymerization units. The content is more preferably 40 mol % or more, still more preferably 60 mol % or more, further preferably 80 mol % or more, particularly preferably 90 mol % or more, and still further preferably substantially 100 mol %, and most preferably the polymer (I) consists solely of the polymerization unit (I).

In the polymer (I), the content of a polymerization unit that is based on the further monomer copolymerizable with the monomer represented by the general formula (I) is preferably 99.0 mol % or less, more preferably 97.0 mol % or less, still more preferably 95.0 mol % or less, further preferably 90 mol % or less, still further preferably 80 mol % or less, and particularly preferably 70 mol % or less based on all polymerization units. The content is more preferably 60 mol % or less, still more preferably 40 mol % or less, further preferably 20 mol % or less, particularly preferably 10 mol % or less, and still further preferably substantially 0 mol %, and particularly still further preferably the polymer (I) is substantially free from a polymerization unit that is based on the further monomer.

The number average molecular weight of the polymer (I) is preferably $0.1 \times 10^4$ or more, more preferably $0.2 \times 10^4$ or more, still more preferably $0.3 \times 10^4$ or more, further preferably $0.4 \times 10^4$ or more, still further preferably $0.5 \times 10^4$ or more, particularly preferably $1.0 \times 10^4$ or more, even more particularly preferably $3.0 \times 10^4$ or more, and most preferably $3.1 \times 10^4$ or more. The number average molecular weight of the polymer (I) is preferably $75.0 \times 10^4$ or less, more preferably $50.0 \times 10^4$ or less, still more preferably $40.0 \times 10^4$ or less, further preferably $30.0 \times 10^4$ or less, and particularly preferably $20.0 \times 10^4$ or less. The number average molecular weight and the weight average molecular weight are molecular weight values calculated by gel permeation chromatography (GPC) using monodisperse polystyrene as a standard. Further, when measurement by GPC is not possible, the number average molecular weight of the polymer (I) can be determined by the correlation between the number average molecular weight calculated from the number of terminal groups obtained by NMR, FT-IR, or the like, and the melt flow rate. The melt flow rate can be measured in accordance with JIS K 7210.

The lower limit of the weight average molecular weight of the polymer (I) is, in order of preference, $0.2 \times 10^4$ or more, $0.4 \times 10^4$ or more, $0.6 \times 10^4$ or more, $0.8 \times 10^4$ or more, $1.0 \times 10^4$ or more, $2.0 \times 10^4$ or more, $5.0 \times 10^4$ or more, $10.0 \times 10^4$ or more, $15.0 \times 10^4$ or more, $20.0 \times 10^4$ or more, or $25.0 \times 10^4$ or more. The upper limit of the weight average molecular weight of the polymer (I) is, in order of preference, $150.0 \times 10^4$ or less, $100.0 \times 10^4$ or less, $60.0 \times 10^4$ or less, $50.0 \times 10^4$ or less, or $40.0 \times 10^4$ or less.

The polymer (I) preferably has an ion exchange rate (IXR) of 53 or less. The IXR is defined as the number of carbon atoms in the polymer backbone based on the ionic group. A precursor group that becomes ionic by hydrolysis (such as —$SO_2F$) is not regarded as an ionic group for the purpose of determining the IXR.

The IXR is preferably 0.5 or more, more preferably 1 or more, still more preferably 3 or more, further preferably 4 or more, still further preferably 5 or more, and particularly preferably 8 or more. Further, the IXR is more preferably 43 or less, still more preferably 33 or less, and particularly preferably 23 or less.

The ion exchange capacity of the polymer (I) is, in order of preference, 0.80 meq/g or more, 1.50 meq/g or more, 1.75 meq/g or more, 2.00 meq/g or more, 2.50 meq/g or more, 2.60 meq/g or more, 3.00 meq/g or more, or 3.50 meq/g or more. The ion exchange capacity is the content of ionic groups (anionic groups) in the polymer (I) and can be calculated from the composition of the polymer (I).

In the polymer (I), the ionic groups (anionic groups) are typically distributed along the polymer backbone. The polymer (I) contains the polymer backbone together with a repeating side chain bonded to this backbone, and this side chain preferably has an ionic group.

The polymer (I) preferably contains an ionic group having a pKa of less than 10, and more preferably less than 7. The ionic group of the polymer (I) is preferably selected from the group consisting of sulfonate, carboxylate, phosphonate, and phosphate.

The terms "sulfonate, carboxylate, phosphonate, and phosphate" are intended to refer to the respective salts or the respective acids that can form salts. A salt when used is preferably an alkali metal salt or an ammonium salt. A preferable ionic group is a sulfonate group.

The polymer (I) preferably has water-solubility. Water-solubility means the property of being readily dissolved or dispersed in an aqueous medium. The particle size of a water-soluble polymer (I) cannot be measured by, for example, dynamic light scattering (DLS). On the other hand, the particle size of a non-water-soluble polymer (I) can be measured by, for example, dynamic light scattering (DLS).

The polymer (I) may also be a polymer (11) of a monomer (11) represented by the general formula (11) wherein the content of a polymerization unit (11) that is based on the monomer (11) is 50 mol % or more based on all polymerization units constituting the polymer (11), and the weight average molecular weight (Mw) is $38.0 \times 10^4$ or more. The polymer (11) is a novel polymer.

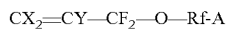  General formula (11):

wherein X and Y are independently H, F, $CH_3$, or $CF_3$, and at least one of X and Y is F. Rf is a fluorine-containing alkylene group having 1 to 40 carbon atoms or a fluorine-containing alkylene group having 2 to 100 carbon atoms and having an ether bond; and A is —COOM, —$SO_3M$, —$OSO_3M$, or —$C(CF_3)_2OM$, wherein M is H, a metal atom, $NR^7_4$, imidazolium optionally having a substituent, pyridinium optionally having a substituent, or phosphonium optionally having a substituent, and $R^7$ is H or an organic group.

In general formula (11), X and Y are independently H, F, $CH_3$, or $CF_3$, and at least one of X and Y is F. X is preferably H or F, and more preferably H. Y is preferably H or F, and more preferably F.

The Rf and A in the general formula (11) are the same as Rf and A in the general formula (1) representing the monomer constituting the polymer (1).

The polymer (11) may be a homopolymer composed solely of the polymerization unit (11) that is based on the monomer (11), or may be a copolymer containing the polymerization unit (11) and a polymerization unit that is based on a further monomer copolymerizable with the monomer (11). The further monomer is as described above. The polymerization unit (11) may be the same or different at each occurrence, and the polymer (11) may contain the polymerization unit (I) that is based on two or more different monomers represented by the general formula (11).

The content of the polymerization unit (11) in the polymer (11) is, in order of preference, 50 mol % or more, 60 mol % or more, 70 mol % or more, 80 mol % or more, 90 mol % or more, or 99 mol % or more based on all polymerization units constituting the polymer (11). The content of the polymerization unit (11) is, particularly preferably, substantially 100 mol %, and the polymer (11) is most preferably composed solely of the polymerization unit (11).

In the polymer (11), the content of the polymerization unit that is based on the further monomer copolymerizable with the monomer (11) is, in order of preference, 99.0 mol % or less, 97.0 mol % or less, 95.0 mol % or less, 90 mol % or less, 80 mol % or less, 70 mol % or less, 60 mol % or less, or 50 mol % or less based on all polymerization units constituting the polymer (11). The content of the polymerization unit that is based on the further monomer copolymerizable with the monomer (11) is, particularly preferably, substantially 0 mol %, and most preferably the polymer (11) does not contain the polymerization unit that is based on the further monomer.

The lower limit of the weight average molecular weight of the polymer (11) is, in order of preference, $38.0 \times 10^4$ or more or $40.0 \times 10^4$ or more. The upper limit of the weight average molecular weight of the polymer (11) is, in order of preference, $150.0 \times 10^4$ or less, $100.0 \times 10^4$ or less, or $60.0 \times 10^4$ or less.

The lower limit of the weight average molecular weight of the polymer (11) is, in order of preference, $5.0 \times 10^4$, $8.0 \times 10^4$, $10.0 \times 10^4$ or more, and $12.0 \times 10^4$ or more. The upper limit of the number average molecular weight of the polymer (11) is, in order of preference, $75.0 \times 10^4$ or less, $50.0 \times 10^4$ or less, $40.0 \times 10^4$ or less, or $30.0 \times 10^4$ or less.

The polymer (I) may also be a polymer (12) of a monomer (12) represented by the general formula (12) wherein the content of a polymerization unit (12) that is based on the monomer (12) is 50 mol % or more based on all polymerization units constituting the polymer (12), and the weight average molecular weight (Mw) is $1.4 \times 10^4$ or more. The polymer (12) is a novel polymer.

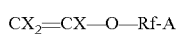  General formula (12):

wherein X is independently F or $CF_3$; Rf is a fluorine-containing alkylene group having 1 to 40 carbon atoms or a fluorine-containing alkylene group having 2 to 100 carbon atoms and having an ether bond or a keto group; and A is —COOM, —$SO_3M$, —$OSO_3M$, or —$C(CF_3)_2OM$, wherein M is —H, a metal atom, —$NR^7_4$, imidazolium optionally having a substituent, pyridinium optionally having a substituent, or phosphonium optionally having a substituent, and $R^7$ is H or an organic group.

In the general formula (12), each X is independently F or $CF_3$. At least one X is preferably F, and more preferably all X are F.

Rf and A in the general formula (12) are the same as Rf and A in the general formula (2) representing the monomer constituting the polymer (2).

The polymer (12) may be a homopolymer composed solely of the polymerization unit (12) that is based on the monomer (12), or may be a copolymer containing the polymerization unit (12) and a polymerization unit that is based on a further monomer copolymerizable with the monomer (12). The further monomer is as described above. The polymerization unit (12) may be the same or different at each occurrence, and the polymer (12) may contain the polymerization unit (12) that is based on two or more different monomers represented by the general formula (12).

The content of the polymerization unit (12) in the polymer (12) is, in order of preference, 50 mol % or more, 60 mol % or more, 70 mol % or more, 80 mol % or more, 90 mol % or more, or 99 mol % or more based on all polymerization units constituting the polymer (12). The content of the polymerization unit (12) is, particularly preferably, substantially 100 mol %, and the polymer (12) is most preferably composed solely of the polymerization unit (12).

In the polymer (12), the content of the polymerization unit that is based on the further monomer copolymerizable with the monomer (12) is, in order of preference, 50 mol % or less, 40 mol % or less, 30 mol % or less, 20 mol % or less, 10 mol % or less, or 1 mol % or less based on all polymerization units constituting the polymer (12). The content of the polymerization unit that is based on the further monomer copolymerizable with the monomer (12) is, particularly preferably, substantially 0 mol %, and most preferably the polymer (12) does not contain the polymerization unit that is based on the further monomer.

The lower limit of the weight average molecular weight (Mw) of the polymer (12) is, in order of preference, $1.4 \times 10^4$ or more, $1.7 \times 10^4$ or more, $1.9 \times 10^4$ or more, $2.1 \times 10^4$ or more, $2.3 \times 10^4$ or more, $2.7 \times 10^4$ or more, $3.1 \times 10^4$ or more, $3.5 \times 10^4$ or more, $3.9 \times 10^4$ or more, $4.3 \times 10^4$ or more, $4.7 \times 10^4$ or more, or $5.1 \times 10^4$ or more. The upper limit of the weight average molecular weight (Mw) of the polymer (12) is, in order of preference, $150.0 \times 10^4$ or less, $100.0 \times 10^4$ or less, $60.0 \times 10^4$ or less, $50.0 \times 10^4$ or less, or $40.0 \times 10^4$ or less.

The lower limit of the number average molecular weight (Mn) of the polymer (12) is, in order of preference, $0.7 \times 10^4$ or more, $0.9 \times 10^4$ or more, $1.0 \times 10^4$ or more, $1.2 \times 10^4$ or more, $1.4 \times 10^4$ or more, $1.6 \times 10^4$ or more, or $1.8 \times 10^4$ or more. The upper limit of the number average molecular weight (Mw) of the polymer (12) is, in order of preference, $75.0 \times 10^4$ or less, $50.0 \times 10^4$ or less, $40.0 \times 10^4$ or less, $30.0 \times 10^4$ or less, or $20.0 \times 10^4$ or less.

The molecular weight distribution (Mw/Mn) of the polymer (12) is preferably 3.0 or less, more preferably 2.4 or less, still more preferably 2.2 or less, particularly preferably 2.0 or less, and most preferably 1.9 or less.

<Method for Producing Polymer (I)>

The polymer (I) can be produced by a conventionally known method except that the above-described monomer is used.

Concerning the polymer (I), the polymer (11) is a novel polymer and can be produced by a production method (11) comprising polymerizing the monomer (11) represented by the general formula (11) in an aqueous medium to produce the polymer (11) of the monomer (11), wherein the oxygen concentration in the reaction system of the polymerization is maintained at 500 volume ppm or less.

In the production method (11), the oxygen concentration in the reaction system of the polymerization is 500 volume ppm or less. In the production method (11), the oxygen concentration in the reaction system is maintained at 500 volume ppm or less throughout the polymerization of the monomer (11). The oxygen concentration in the reaction system is preferably 350 volume ppm or less, more preferably 300 volume ppm or less, still more preferably 100 volume ppm or less, and particularly preferably 50 volume ppm or less. The oxygen concentration in the reaction system is usually 0.01 volume ppm or more.

In the production method (11), because the polymer (11) having a higher molecular weight can be readily produced, the polymerization temperature of the monomer (11) is preferably 59° C. or lower, more preferably 57° C. or lower, still more preferably 55° C. or lower, and particularly preferably 53° C. or lower, and is preferably 20° C. or higher, more preferably 25° C. or higher, still more preferably 30° C. or higher, and particularly preferably 35° C. or higher.

In the production method (11), the monomer (11) may be copolymerized with the above-described further monomer.

In the production method (11), the polymerization pressure is usually atmospheric pressure to 10 MPaG. The polymerization pressure is suitably determined according to the type of monomer used, the molecular weight of the target polymer, and the reaction rate.

In the production method (11), the polymerization time is usually 1 to 200 hours, and may be 5 to 100 hours.

Concerning the polymer (I), the polymer (12) is a novel polymer and can be produced by a production method (12) comprising polymerizing the monomer (12) represented by the general formula (12) in an aqueous medium to produce the polymer (12) of the monomer (12), wherein the oxygen concentration in the reaction system of the polymerization is maintained at 1,500 volume ppm or less.

In the production method (12), the oxygen concentration in the reaction system of the polymerization is 1,500 volume ppm or less. In the production method (12), the oxygen concentration in the reaction system is maintained at 1,500 volume ppm or less throughout the polymerization of the monomer (12). The oxygen concentration in the reaction system is preferably 500 volume ppm or less, more preferably 100 volume ppm or less, and still more preferably 50 volume ppm or less. The oxygen concentration in the reaction system is usually 0.01 volume ppm or more.

In the production method (12), because the polymer (12) having a higher molecular weight can be readily produced, the polymerization temperature of the monomer (12) is preferably 70° C. or lower, more preferably 65° C. or lower, still more preferably 60° C. or lower, particularly preferably 55° C. or lower, still further preferably 50° C. or lower, particularly preferably 45° C. or lower, and most preferably 40° C. or lower, and is preferably 10° C. or higher, more preferably 15° C. or higher, and still more preferably 20° C. or higher.

In the production method (12), the monomer (12) may be copolymerized with the above-described further monomer.

In the production method (12), the polymerization pressure is usually atmospheric pressure to 10 MPaG. The polymerization pressure is suitably determined according to the type of monomer used, the molecular weight of the target polymer, and the reaction rate.

In the production method (12), the polymerization time is usually 1 to 200 hours, and may be 5 to 100 hours.

In the production method (11) and the production method (12), the oxygen concentration in the reaction system of the polymerization can be controlled by causing, for example, an inert gas such as nitrogen or argon, or the gaseous monomer when a gaseous monomer is used, to flow through the liquid phase or the gas phase in the reactor. The oxygen concentration in the reaction system of the polymerization can be determined by measuring and analyzing the gas emitted from the discharge gas line of the polymerization system with a low-concentration oxygen analyzer.

In the production method (11) and the production method (12), the aqueous medium is a reaction medium in which polymerization is performed, and means a liquid containing water. The aqueous medium may be any medium containing water, and it may be a medium containing water and, for example, any of fluorine-free organic solvents such as alcohols, ethers, and ketones, and/or fluorine-containing organic solvents having a boiling point of 40° C. or lower. The aqueous medium is preferably water.

In the production method (11) and the production method (12), the monomer can be polymerized in the presence of a polymerization initiator. The polymerization initiator is not limited as long as it can generate radicals within the polymerization temperature range, and known oil-soluble and/or water-soluble polymerization initiators can be used. The polymerization initiator can be combined with a reducing agent or the like to form a redox agent and initiate the polymerization. The concentration of the polymerization initiator is suitably determined according to the type of monomer used, the molecular weight of the target polymer, and the reaction rate.

As a polymerization initiator, persulfate (such as ammonium persulfate) and organic peroxide such as disuccinic acid peroxide or diglutaric acid peroxide can be used alone or in the form of a mixture thereof. Further, the polymerization initiator may be used together with a reducing agent such as sodium sulfite so as to form a redox system. Moreover, the concentration of radicals in the system can be also regulated by adding a radical scavenger such as hydroquinone or catechol or adding a peroxide decomposer such as ammonium sulfate during polymerization.

As a polymerization initiator, persulfate is particularly preferable because a polymer having a higher molecular weight can be readily produced. Examples of persulfate include ammonium persulfate, potassium persulfate, and sodium persulfate, and ammonium persulfate is preferable.

The amount of the polymerization initiator added is not limited, and the polymerization initiator is added in an amount that does not significantly decrease the polymerization rate (e.g., a concentration of several ppm in water) or more at once in the initial stage of polymerization, or added successively or continuously. The upper limit is within a range where the reaction temperature is allowed to increase while the polymerization reaction heat is removed through the device surface, and the upper limit is more preferably within a range where the polymerization reaction heat can be removed through the device surface.

In the production method (11) and the production method (12), the polymerization initiator can be added at the initiation of polymerization, and can be added also during polymerization. The proportion of the amount of the polymerization initiator added at the initiation of polymerization to the amount of the polymerization initiator added during polymerization is preferably 95/5 to 5/95, more preferably 60/40 to 10/90, and more preferably 30/70 to 15/85. The method for adding the polymerization initiator during polymerization is not limited, and the entire amount may be added at once, may be added in two or more divided portions, or may be added continuously.

In the production method (11) and the production method (12), the total amount of the polymerization initiator added to be used in the polymerization is preferably 0.00001 to 10% by mass based on the aqueous medium because a polymer having a higher molecular weight can be readily produced. The total amount of the polymerization initiator added to be used in the polymerization is more preferably 0.0001% by mass or more, still more preferably 0.001% by mass or more, and particularly preferably 0.01% by mass or more, and is more preferably 5% by mass or less, and still more preferably 2% by mass or less.

In the production method (11) and the production method (12), the total amount of the polymerization initiator added to be used in the polymerization is preferably 0.001 to 10 mol % based on the monomer because a polymer having a higher molecular weight can be readily produced. The total amount of the polymerization initiator added to be used in the polymerization is more preferably 0.005 mol % or more, still more preferably 0.01 mol % or more, and is more preferably 5 mol % or less, still more preferably 2.5 mol % or less, particularly preferably 2.2 mol % or less, and most preferably 2.0 mol % or less.

In the production method (11) and the production method (12), because a polymer having a higher molecular weight can be readily produced, the amount of a monomer that is present and contains the monomer (11) or the monomer (12) at the initiation of polymerization is preferably 30% by mass or more based on the amount of the aqueous medium present. The amount of the monomer present is more preferably 35% by mass or more, and still more preferably 40% by mass or more. The upper limit of the amount of the monomer present is not limited, and may be 200% by mass or less from the viewpoint of causing the polymerization to proceed smoothly. The amount of the monomer present at the initiation of polymerization is the total amount of the monomer (11) or the monomer (12) and, if any, other monomers present in the reactor at the initiation of polymerization.

In the production method (11) and the production method (12), polymerization may be carried out in the presence of a pH adjuster. The pH adjuster may be added before the initiation of polymerization or after the initiation of polymerization.

Examples of the pH adjuster include ammonia, sodium hydroxide, potassium hydroxide, sodium carbonate, potassium carbonate, ammonium carbonate, sodium hydrogen carbonate, potassium hydrogen carbonate, ammonium hydrogen carbonate, sodium phosphate, potassium phosphate, sodium citrate, potassium citrate, ammonium citrate, sodium gluconate, potassium gluconate, and ammonium gluconate.

In the production method (11) and the production method (12), polymerization of the monomer (11) or the monomer (12) can be performed by charging a polymerization reactor with an aqueous medium, the monomer (11) or the monomer (12), optionally a further monomer, and optionally a further additive, stirring the contents of the reactor, maintaining the reactor at a predetermined polymerization temperature, and adding a predetermined amount of a polymerization initiator to thereby initiate the polymerization reaction. After the initiation of the polymerization reaction, the monomer, the polymerization initiator, and the further additive may be added depending on the purpose.

In the production method (11) and the production method (12), the polymerization of the monomer can be carried out substantially in the absence of a fluorine-containing surfactant. The expression "substantially in the absence of a fluorine-containing surfactant" as used herein means that the amount of the fluorine-containing surfactant is 10 mass ppm or less based on the aqueous medium. The amount of the fluorine-containing surfactant is preferably 1 mass ppm or less, more preferably 100 mass ppb or less, still more preferably 10 mass ppb or less, and further preferably 1 mass ppb or less based on the aqueous medium.

Further, the polymer (I) may have a content of a dimer and a trimer of the monomer (I) of 1.0% by mass or less based on the polymer (I).

In other words, the production method of the present disclosure also preferably comprises:
polymerizing the monomer (I) represented by the general formula (I) in an aqueous medium to obtain a crude composition containing a polymer of the monomer (I);
removing from the crude composition a dimer and a trimer of the monomer (I) contained in the crude composition to obtain the polymer (I) in which the content of the dimer and the trimer of the monomer (I) is 1.0% by mass or less based on the polymer (I); and
polymerizing tetrafluoroethylene in an aqueous medium in the presence of a nucleating agent and the polymer (I) to obtain polytetrafluoroethylene.

The polymer (I) used in the production method is substantially free from the dimer and the trimer of the monomer (I). The dimer and the trimer of the monomer (I) are usually generated when polymerizing the monomer (I) to obtain the polymer (I). The content of the dimer and the trimer in the polymer (I) is 1.0% by mass or less, preferably 0.1% by mass or less, more preferably 0.01% by mass or less, still more preferably 0.001% by mass or less, and particularly preferably 0.0001% by mass or less based on the polymer (I).

The content of the dimer and the trimer in the polymer (I) can be determined by performing gel permeation chromatography (GPC) analysis on the polymer (I) and calculating the total proportion of the peak areas (area percentages) of the dimer and the trimer to the total area of all peaks of the chromatogram obtained by the GPC analysis.

Further, when the content of the dimer and the trimer in the polymer (I) is less than 0.5% by mass based on the polymer (I), the content can be determined by liquid chromatography-mass spectrometry (LC/MS/MS) measurement.

Specifically, an aqueous solution having five or more content levels of the monomer (I) is prepared, the LC/MS/MS analysis is performed with respect to each content, the relationship between a content and an area based on that content (the integral value of the peak) is plotted, and a calibration curve of the monomer (I) is created. Moreover, calibration curves of the dimer and the trimer of the monomer (I) are created from the calibration curve of the monomer (I).

Methanol is added to the polymer (I) to prepare a mixture, and an extract (supernatant) is recovered from the mixture by centrifugation, and the resulting extract is subjected to the LC/MS/MS analysis.

Then, using the calibration curves, the chromatographic area (the integral value of peaks) of the dimer and the trimer of the monomer (I) can be converted to the content of the dimer and the trimer.

PTFE substantially free from the dimer and the trimer of the monomer (I) can be produced by using the polymer (I) that is substantially free from the dimer and the trimer when polymerizing TFE in an aqueous medium.

The polymer (I) is a polymer containing the polymerization unit (I) that is based on the monomer (I). The polymer (I) used in the present disclosure is a polymer in which a dimer (a polymer containing two polymerization units (I)) and a trimer (a polymer containing three polymerization units (I)) are substantially removed from the polymer (I) containing two or more polymerization units (I).

The molecular weight of the monomer (I) is preferably 500 or less, and more preferably 400 or less. In other words, the polymer (I) is preferably substantially free from a dimer and a trimer having a molecular weight of 1,500 or less, and is more preferably substantially free from a dimer and a trimer having a molecular weight of 1,200 or less.

The dimer and the trimer of the polymer (I) may be a polymer formed of, as the monomer (I) represented by the general formula (I), one monomer (I) or may be a copolymer formed of two or more monomers (I) having different structures.

Polymerization of the monomer (I) can be carried out by a known method. By producing a crude composition by such a method, a crude composition in which the polymer (I) is dispersed or dissolved in an aqueous medium can be obtained.

Polymerization of the monomer (I) is preferably carried out in an aqueous medium substantially in the absence of a fluorine-containing surfactant (provided that the monomer (I) represented by the general formula (I) is excluded).

The expression "substantially in the absence of a fluorine-containing surfactant" as used herein means that the amount of the fluorine-containing surfactant is 10 mass ppm or less based on the aqueous medium. The amount of the fluorine-containing surfactant is preferably 1 mass ppm or less, more preferably 100 mass ppb or less, still more preferably 10 mass ppb or less, and further preferably 1 mass ppb or less based on the aqueous medium.

The fluorine-containing surfactant will be described below in the description concerning the polymerization of TFE.

The crude composition thus obtained usually contains, as a polymer of the monomer (I), the dimer and the trimer in a total amount of more than 1.0% by mass based on the mass of the polymer of the monomer (I). The content of the dimer and the trimer in the polymer of the monomer (I), for example, may be 2.0% by mass or more, may be 3.0% by mass or more, may be 30.0% by mass or less, and may be 20.0% by mass or less based on the polymer of the monomer (I). The content of the dimer and the trimer in the crude composition can be determined by performing a gel permeation chromatography (GPC) analysis on the crude composition and calculating the total proportion of the peak areas (area percentages) of the dimer and the trimer to the total area of all peaks of the chromatogram obtained by the GPC analysis.

Next, the dimer and the trimer of the monomer (I) contained in the crude composition obtained by the polymerization of the monomer (I) are removed from the crude composition. The means for removing the dimer and the trimer is not limited, and is preferably at least one means selected from the group consisting of ultrafiltration, microfiltration, dialysis membrane treatment, liquid separation, and reprecipitation, more preferably at least one means selected from the group consisting of ultrafiltration, microfiltration, and dialysis membrane treatment, and still more preferably ultrafiltration.

It was not previously known that the polymerization of the monomer (I) produces a dimer and a trimer of the monomer (I) and, as a result, the dimer and the trimer of the monomer (I) are contained in the polymer (I). The mechanism by which the dimer and the trimer of the monomer (I) are produced is not necessarily clear, but it is conjectured that by the polymerization reaction in the polymerization system composed mostly of the monomer (I) among the monomers present in the polymerization system in particular, dimerization and trimerization of the monomer (I)

occurs with non-negligible frequency. The presence of the dimer and the trimer of the monomer (I) in the polymer (I) was discovered for the first time in the present disclosure, and it was found for the first time that the dimer and the trimer of the monomer (I) in the polymer (I) can be highly efficiently removed from the polymer (I) (a crude composition) by at least one means selected from the group consisting of ultrafiltration, microfiltration, and dialysis membrane treatment.

When removing the dimer and the trimer, usually the unreacted monomer (I) is also removed from the crude composition at the same time. The unreacted monomer (I) even when incorporated into PTFE by polymerization does not necessarily adversely affect the function of PTFE, and thus the unreacted monomer (I) does not necessarily need to be removed. However, removing the unreacted monomer (I) simultaneously with the dimer and the trimer has the advantage that the amount of monomer to be polymerized can be calculated without considering the presence of the unreacted monomer (I), and PTFE having a desired monomeric composition can be readily produced. Even when the monomer (I) remains in the polymer (I), or even when the monomer (I) is newly added as a co-monomer, depending on the polymerization reaction in a polymerization system composed mostly of a fluoromonomer (excluding the monomer (I)) among the monomers present in the polymerization system, dimerization and trimerization of the monomer (I) barely proceed, and the dimer and the trimer of the monomer (I) barely remain in the resulting PTFE.

The crude composition obtained by the polymerization of the monomer (I) may be a composition as polymerized that is obtained from polymerization, may be what is obtained by diluting or concentrating a composition as polymerized that is obtained from polymerization, or may be what is obtained by dispersion stabilization treatment or the like. In order to facilitate ultrafiltration, microfiltration, or dialysis membrane treatment, it is also preferable to adjust the viscosity of the crude composition by these treatments.

The content of the polymer of the monomer (I) in the crude composition is not limited, and may be, for example, 0.1 to 20% by mass. The content of the polymer of the monomer (I) in the crude composition, from the viewpoint of the removal efficiency of the dimer and the trimer, is preferably 18.0% by mass or less, more preferably 15.0% by mass or less, still more preferably 12.0% by mass or less, and particularly preferably 10.0% by mass or less, and is preferably 0.5% by mass or more, more preferably 1.0% by mass or more, still more preferably 1.2% by mass or more, particularly preferably 1.5% by mass or more, and most preferably 2.0% by mass or more. The content of the polymer of the monomer (I) in the crude composition can be adjusted by, for example, a method involving adding water to the crude composition obtained by the polymerization of the monomer (I), or a method involving concentrating the crude composition obtained by the polymerization of the monomer (I).

The pH of the crude composition is preferably 0 to 11, more preferably 0.5 to 8.0, and still more preferably 1.0 to 7.0. The pH of the crude composition can be adjusted by adding a pH adjuster to the crude composition obtained by the polymerization of the monomer (I). The pH adjuster may be an acid or an alkali, such as a phosphoric acid salt, sodium hydroxide, potassium hydroxide, or aqueous ammonia.

The viscosity of the crude composition is preferably 25 mPa·s or less because ultrafiltration, microfiltration, or dialysis membrane treatment is facilitated. The viscosity of the crude composition can be adjusted by, for example, a method involving adjusting the number average molecular weight of the polymer of the monomer (I), a method involving adjusting the concentration of the polymer of the monomer (I) in the crude composition, or a method involving adjusting the temperature of the crude composition.

Ultrafiltration or microfiltration is not limited no matter whether it is cross-flow filtration or dead-end filtration, and cross-flow filtration is preferable from the viewpoint of reducing the clogging of a membrane.

Ultrafiltration can be performed using an ultrafiltration membrane. Ultrafiltration can be performed using, for example, an ultrafiltration apparatus having an ultrafiltration membrane, and a centrifugal ultrafiltration method, a batch-type ultrafiltration method, a circulation-type ultrafiltration method, and the like can be employed.

The molecular weight cut-off of the ultrafiltration membrane is usually about $0.1 \times 10^4$ to $30 \times 10^4$ Da. The molecular weight cut-off of the ultrafiltration membrane is preferably $1.5 \times 10^4$ Da or more because the clogging of the membrane can be suppressed and the dimer and the trimer can be efficiently reduced. The molecular weight cut-off is more preferably $2.0 \times 10^4$ Da or more, particularly preferably $3.0 \times 10^4$ Da or more, and most preferably $5.0 \times 10^4$ Da or more. The molecular weight cut-off may be $8.0 \times 10^4$ Da or more. Further, from the viewpoint of the removal efficiency of the dimer and the trimer, the molecular weight cut-off is preferably $20 \times 10^4$ Da or less, and more preferably $10 \times 10^4$ Da or less.

The molecular weight cut-off of the ultrafiltration membrane can be, for example, a molecular weight at which 90% of polystyrene having a known weight average molecular weight that is attempted to pass through the membrane is blocked. The quantification of polystyrene can be performed using gel permeation chromatography.

The ultrafiltration membrane is not limited and may be in a conventionally known form, and examples include a hollow fiber type, a flat membrane type, a spiral type, and a tubular type. From the viewpoint of suppressing clogging, a hollow fiber type is preferable.

The inner diameter of the hollow fiber type ultrafiltration membrane is not limited, and may be, for example, 0.1 to 2 mm, and is preferably 0.8 to 1.4 mm.

The length of the hollow fiber type ultrafiltration membrane is not limited, and may be, for example, 0.05 to 3 m, and is preferably 0.05 to 2 m.

The material of the ultrafiltration membrane is not limited, and examples include organic materials such as cellulose, cellulose ester, polysulfone, sulfonated polysulfone, polyethersulfone, sulfonated polyether sulfone, chlorinated polyethylene, polypropylene, polyolefin, polyvinyl alcohol, polymethylmethacrylate, polyacrylonitrile, polyvinylidene fluoride, and polytetrafluoroethylene, metals such as stainless steel, and inorganic materials such as ceramics.

The material of the ultrafiltration membrane is preferably an organic material, more preferably chlorinated polyethylene, polypropylene, polyvinylidene fluoride, polytetrafluoroethylene, polyacrylonitrile, polysulfone, or polyethersulfone, and still more preferably polyacrylonitrile, polysulfone, or polyvinylidene fluoride.

Specific examples of the ultrafiltration membrane include G-5 type, G-10 type, G-20 type, G-50 type, PW type, and HWS UF type of DESAL; HFM-180, HFM-183, HFM-251, HFM-300, HFM-116, HFM-183, HFM-300, HFK-131, HFK-328, MPT-U20, MPS-U20P, and MPS-U20S of KOCH; SPE1, SPE3, SPE5, SPE10, SPE30, SPV5, SPV50, and SOW30 of Synder; Microza® UF series manufactured by Asahi Kasei Corporation; and NTR 7410 manufactured by Nitto Denko Corporation.

From the viewpoint of the removal efficiency of the dimer and the trimer, the ultrafiltration is preferably performed at a pressure of 0.01 MPa or more. More preferably, the pressure is 0.03 MPa or more, and still more preferably 0.05 MPa or more. Further, from the viewpoint of pressure resistance, the pressure is preferably 0.5 MPa or less, more preferably 0.25 MPa or less, and still more preferably 0.2 MPa or less.

From the viewpoint of the removal efficiency of the dimer and the trimer, the ultrafiltration is preferably performed at a flow rate of 10 mL/min or more and more preferably performed at a flow rate of 50 mL/min or more, and is preferably performed at a flow rate of 5,000 mL/min or less and more preferably performed at a flow rate of 1,000 mL/min or less.

Microfiltration can be performed using a microfiltration membrane. The microfiltration membrane usually has an average pore size of 0.05 to 1.0 µm.

The microfiltration membrane preferably has an average pore size of 0.1 µm or more because the dimer and the trimer can be efficiently removed. The average pore size is more preferably 0.075 µm or more, and still more preferably 0.1 µm or more. Further, the average pore size is preferably 1.00 µm or less. The average pore size is more preferably 0.50 µm or less, and still more preferably 0.25 µm or less.

The average pore size of the microfiltration membrane can be measured in accordance with ASTM F316-03 (a bubble point method).

The microfiltration membrane is not limited and may be in a conventionally known form, and examples include a hollow fiber type, a flat membrane type, a spiral type, and a tubular type. From the viewpoint of suppressing clogging, a hollow fiber type is preferable.

The inner diameter of the hollow fiber type microfiltration membrane is not limited, and may be, for example, 0.1 to 2 mm, and is preferably 0.8 to 1.4 mm.

The length of the hollow fiber type microfiltration membrane is not limited, and may be, for example, 0.05 to 3 m, and is preferably 0.05 to 2 m.

Examples of the material of the microfiltration membrane include cellulose, aromatic polyamide, polyvinyl alcohol, polysulfone, polyether sulfone, polyvinylidene fluoride, polyethylene, polyacrylonitrile, polypropylene, polycarbonate, polytetrafluoroethylene, ceramics, and metal. Among these, aromatic polyamide, polyvinyl alcohol, polysulfone, polyvinylidene fluoride, polyethylene, polyacrylonitrile, polypropylene, polycarbonate, or polytetrafluoroethylene is preferable, and polyacrylonitrile or polyvinylidene fluoride is particularly preferable.

Specific examples of the microfiltration membrane include Cefilt manufactured by NGK Insulators, Ltd.; Microza U Series and Microza P Series manufactured by Asahi Kasei Corporation; Poreflon SPMW, Poreflon OPMW, and Poreflon PM manufactured by Sumitomo Electric Industries, Ltd.; Trayfil manufactured by Toray Industries, Inc.; NADIR MP005 and NADIR MV020 manufactured by Microdyn-Nadir; and X-Flow manufactured by Norit.

From the viewpoint of the removal efficiency of the dimer and the trimer, microfiltration is preferably performed at a pressure of 0.01 MPa or more. The pressure is more preferably 0.03 MPa or more, and still more preferably 0.05 MPa or more. Further, from the viewpoint of pressure resistance, the pressure is preferably 0.5 MPa or less, more preferably 0.25 MPa or less, and still more preferably 0.2 MPa or less.

From the viewpoint of the removal efficiency of the dimer and the trimer, microfiltration is preferably performed at a flow rate of 10 mL/min or more and more preferably performed at a flow rate of 50 mL/min or more, and is preferably performed at a flow rate of 5,000 mL/min or less and more preferably performed at a flow rate of 1,000 mL/min or less.

The dialysis membrane treatment is performed using a dialysis membrane. The dialysis membrane usually has a molecular weight cut-off of $0.05 \times 10^4$ to $100 \times 10^4$ Da.

The molecular weight cut-off of the dialysis membrane is preferably $0.3 \times 10^4$ Da or more because the clogging of the membrane can be suppressed and the dimer and the trimer can be efficiently removed. The molecular weight cut-off is more preferably $0.5 \times 10^4$ Da or more, still more preferably $1.0 \times 10^4$ Da or more, further preferably $1.5 \times 10^4$ Da or more, still further preferably $2.0 \times 10^4$ Da or more, particularly preferably $3.0 \times 10^4$ Da or more, and most preferably $5.0 \times 10^4$ Da or more. The molecular weight cut-off may be $8.0 \times 10^4$ Da or more.

Further, from the viewpoint of the removal efficiency of the dimer and the trimer, the molecular weight cut-off is preferably $20 \times 10^4$ Da or less, and more preferably $10 \times 10^4$ Da or less.

The molecular weight cut-off of the dialysis membrane can be measured by, for example, the same method as ultrafiltration membrane.

The material of the dialysis membrane is not limited, and examples include cellulose, polyacrylonitrile, polymethylmethacrylate, ethylene vinyl alcohol copolymers, polysulfone, polyamide, and polyester polymer alloy.

Specific examples of the dialysis membrane include Spectra/Por® Float-A-Lyzer, Tube-A-Lyzer, Dialysis tubing, 6 Dialysis tubing, and 7 Dialysis tubing manufactured by Spectrum Laboratories Inc.

Ultrafiltration, microfiltration, or dialysis membrane treatment is preferably performed at a temperature of 10° C. or higher. The temperature is more preferably 15° C. or higher, still more preferably 20° C. or higher, and particularly preferably 30° C. or higher. By adjusting the temperature within the above range, the dimer and the trimer can be more efficiently reduced. The temperature is preferably 90° C. or lower, more preferably 80° C. or lower, still more preferably 70° C. or lower, and particularly preferably 60° C. or lower.

Ultrafiltration, microfiltration, or dialysis membrane treatment can be performed while adding water to the crude composition or adjusting the pH of the crude composition. Water may be added intermittently to the crude composition or continuously added to the crude composition.

The end point of ultrafiltration, microfiltration, or dialysis membrane treatment is suitably determined, and is not limited. Further, in ultrafiltration, microfiltration, or dialysis membrane treatment, in order to improve the durability of the filtration membrane, the membrane may be backwashed once per a filtration time of 1 to 24 hours as a rough guide.

Liquid separation can be carried out by, for example, adding an organic solvent to the composition to separate the composition into two phases, i.e., an aqueous phase and an organic solvent phase, and recovering the aqueous phase.

Reprecipitation can be carried out by, for example, adding a poor solvent to the composition dropwise to precipitate the polymer, recovering the precipitated polymer, dissolving the recovered polymer in a good solvent, adding the resulting solution to a poor solvent dropwise to precipitate the polymer again, and recovering the precipitated polymer.

By removing the dimer and the trimer of the monomer (I) from the crude composition containing the polymer of the monomer (I), an aqueous solution containing the polymer (I) substantially free from the dimer and the trimer is usually obtained. The polymer (I) used in the production method of the present disclosure may be the polymer (I) contained in the resulting aqueous solution, or may be the polymer (I) obtained by being separated from the aqueous solution. The method for separating the polymer (I) from the aqueous solution is not limited. For example, the polymer (I) can be separated by a method such as coagulation, washing, or drying of the polymer (I) in the aqueous solution.

The polymer (I) may be an aqueous solution containing the polymer (I). A preferable content of the dimer and the trimer of the monomer (I) based on the polymer (I) in the aqueous solution is as described above.

<Polymerization of Tetrafluoroethylene>

In the production method of the present disclosure, polytetrafluoroethylene (PTFE) is obtained by polymerizing tetrafluoroethylene (TFE) in an aqueous medium. PTFE obtained by polymerizing TFE in an aqueous medium is usually obtained in the form of primary particles dispersed in an aqueous dispersion.

Polymerization can be initiated by adding TFE, the polymer (I), and an aqueous medium to a polymerization reactor and then adding a polymerization initiator. After the initiation of polymerization, TFE, the polymerization initiator, a chain transfer agent, and the polymer (I), and the like may be added depending on the purpose. During polymerization, the contents of the polymerization reactor are preferably stirred. During polymerization, TFE may be solely polymerized, or TFE and a modified monomer may be polymerized.

In the polymerization, the nucleating agent is preferably added to the aqueous medium before the initiation of the polymerization reaction or before the concentration of PTFE in the aqueous dispersion reaches 5.0% by mass as the polymerization reaction proceeds. By adding a nucleating agent at the initial stage of polymerization, more particles can be generated during polymerization, and, moreover, primary particles having a smaller average primary particle size and aspect ratio can be obtained. In other words, the nucleating agent may be added before the initiation of the polymerization, may be added at the same time as the initiation of the polymerization, or may be added during the period in which the nuclei of PTFE particles are formed after polymerization is initiated.

The time when the nucleating agent is added is before the initiation of polymerization or before the concentration of PTFE in the aqueous dispersion reaches 5.0% by mass as the polymerization reaction proceeds, preferably before the initiation of polymerization or before the concentration of PTFE reaches 3.0% by mass, more preferably before the initiation of polymerization or before the concentration of PTFE reaches 1.0% by mass, still more preferably before the initiation of polymerization or before the concentration of PTFE reaches 0.5% by mass, and particularly preferably before the initiation of polymerization or at the same time as the initiation of polymerization.

The amount of the nucleating agent added is preferably 0.001 to 5,000 mass ppm based on the aqueous medium because more particles can be generated during polymerization, and, moreover, primary particles having a smaller average primary particle size and aspect ratio can be obtained. The lower limit of the amount of the nucleating agent is, in order of preference, 0.01 mass ppm, 0.05 mass ppm, or 0.1 mass ppm. The upper limit of the amount of the nucleating agent is, in order of preference, 2,000 mass ppm, 1,000 mass ppm, 500 mass ppm, 100 mass ppm, 50 mass ppm, or 10 mass ppm.

As described above, the nucleating agent is preferably at least one selected from the group consisting of a fluoropolyether, a nonionic surfactant, and a chain transfer agent.

The amount of fluoropolyether is preferably 5 to 5,000 mass ppm based on the aqueous medium. The lower limit of the amount of fluoropolyether is, in order of preference, 10 mass ppm, 20 mass ppm, 30 mass ppm, or 50 mass ppm. The upper limit of fluoropolyether is, in order of preference, 3,000 mass ppm, 2,000 mass ppm, 1,000 mass ppm, 500 mass ppm, or 100 mass ppm.

The amount of the nonionic surfactant is preferably 0.1 to 0.0000001% by mass based on the aqueous medium. The lower limit of the amount of the nonionic surfactant is, in order of preference, 0.000001% by mass, 0.000005% by mass, or 0.00001% by mass. The upper limit of the amount of the nonionic surfactant is, in order of preference, 0.01% by mass, 0.005% by mass, 0.001% by mass, 0.0005% by mass, and 0.0001% by mass.

The amount of the chain transfer agent is preferably 0.001 to 10,000 mass ppm based on the aqueous medium. The lower limit of the amount of the chain transfer agent is, in order of preference, 0.01 mass ppm, 0.05 mass ppm, 0.1 mass ppm, or 0.5 mass ppm. The upper limit of the amount of the chain transfer agent is, in order of preference, 1,000 mass ppm, 500 mass ppm, 100 mass ppm, or 10 mass ppm.

As for the nucleating agent, when a chain transfer agent and a nonionic surfactant are used, the mass ratio of the chain transfer agent to the nonionic surfactant (chain transfer agent/nonionic surfactant) is preferably 1,000/1 to 1/5, more preferably 200/1 to 1/2, 100/1 to 1/1, and still more preferably 50/1 to 2/1 because more particles can be generated during polymerization, and, moreover, primary particles having a smaller average primary particle size and aspect ratio can be obtained.

The polymerization temperature and the polymerization pressure in the polymerization are suitably determined according to the type of monomer used, the molecular weight of the target PTFE, and the reaction rate.

The polymerization temperature is preferably 10 to 150° C., more preferably 30° C. or higher, and still more preferably 50° C. or higher, and is more preferably 120° C. or lower, and still more preferably 100° C. or lower.

The polymerization pressure is preferably 0.05 to 10 MPaG, more preferably 0.3 MPaG or more, still more preferably 0.5 MPaG or more, still more preferably 5.0 MPaG or less, and still more preferably 3.0 MPaG or less. In particular, from the viewpoint of improving the yield of PTFE, the polymerization pressure is preferably 1.0 MPaG or higher, more preferably 1.2 MPaG or higher, still more preferably 1.5 MPaG or higher, particularly preferably 1.8 MPaG or higher, and most preferably 2.0 MPaG or higher.

In the polymerization, the amount of the polymer (I) at the initiation of polymerization is preferably 1 mass ppm or more based on the aqueous medium. The amount of the polymer (I) at the initiation of polymerization is preferably 10 mass ppm or more, more preferably 50 mass ppm or more, still more preferably 100 mass ppm or more, and further preferably 200 mass ppm or more. The upper limit is not limited, and is, for example, preferably 100,000 mass ppm, and more preferably 50,000 mass ppm. When the amount of the polymer (I) at the initiation of polymerization is in the above range, an aqueous dispersion having better dispersion stability can be obtained.

The total amount of the polymer (I) added is preferably 0.0001 to 15% by mass based on 100% by mass of the aqueous medium. The lower limit is more preferably 0.001% by mass, while the upper limit is more preferably 1% by mass. Less than 0.0001% by mass of the polymer (I) may result in insufficient dispersibility, and more than 15% by mass of the polymer (I) fails to provide the effects corresponding to the added amount. The amount of the polymer (I) added is suitably determined according to the type of monomer used, the molecular weight of the target PTFE, and the like.

Polymerization of TFE is carried out in an aqueous medium in the presence of the polymer (I). It is also preferable that the polymer (I) is continuously added during the polymerization of TFE. Continuously adding the polymer (I) means, for example, adding the polymer (I) not all at once, but adding over time and without interruption or adding in portions. By continuously adding the polymer (I), it is possible to obtain a composition having better dispersion stability.

In the case of continuously adding the polymer (I), the amount of the polymer (I) added is preferably 0.001 to 10% by mass based on 100% by mass of the aqueous medium. The lower limit is more preferably 0.005% by mass and still more preferably 0.01% by mass, and the upper limit is more preferably 5% by mass and still more preferably 2% by mass.

Polymerization of TFE can be efficiently carried out by using at least one polymer (I). Further, in the polymerization of TFE, two or more polymers (I) may be used at the same time, and a surfactant may also be used in combination as long as it is volatile or is allowed to remain in the final product.

In the polymerization step, $0.6 \times 10^{13}$ particles/ml or more particles are preferably generated. By generating a large number of particles in the polymerization step, primary particles having a small average primary particle size and a small aspect ratio can be obtained, and an aqueous dispersion having excellent stability can be obtained. The number of particles to be generated is, in order of preference, $0.7 \times 10^{13}$ particles/mL or more, $0.8 \times 10^{13}$ particles/mL or more, $0.9 \times 10^{13}$ particles/mL or more, $1.0 \times 10^{13}$ particles/mL or more, and $1.5 \times 10^{13}$ particles/mL or more. The upper limit of the number of particles to be generated is not limited, and is, for example, $7.0 \times 10^{14}$ particles/mL.

Since the particles generated by the polymerization of TFE are concentrated in the first half of the polymerization and are unlikely to be generated in the second half of the polymerization, the number of particles in the polymerization step is almost the same as the number of particles generated in the first half of the polymerization. Therefore, the number of particles in the polymerization step can be predicted by measuring the number of primary particles in the finally obtained aqueous dispersion.

In the production method of the present disclosure, it is also preferable to polymerize TFE and a modifying monomer. By polymerizing TFE and the modifying monomer, primary particles having a smaller average primary particle size and aspect ratio can be obtained, and an aqueous dispersion having better dispersion stability can be obtained.

The total amount of the modifying monomer added when polymerizing TFE is preferably 0.00001% by mass or more, more preferably 0.0001% by mass or more, still more preferably 0.001% by mass or more, and further preferably 0.005% by mass or more based on the resulting PTFE.

Further, the total amount of the modifying monomer added during polymerization is, in order of preference, 1.0% by mass or less, 0.90% by mass or less, 0.50% by mass or less, 0.40% by mass or less, 0.30% by mass or less, 0.20% by mass or less, 0.15% by mass or less, 0.10% by mass or less, and 0.05% by mass or less based on the resulting PTFE.

In the polymerization, the modifying monomer that is copolymerizable with TFE is preferably added before the initiation of the polymerization reaction or before the concentration of PTFE in the aqueous dispersion reaches 10.0% by mass, or preferably before the concentration reaches 5.0% by mass as the polymerization reaction proceeds. The modifying monomer is usually added to a reactor. By adding the modifying monomer at the initial stage of polymerization, more particles can be generated during polymerization, and, moreover, primary particles having a smaller average primary particle size and aspect ratio can be obtained. The modifying monomer may be added before the initiation of the polymerization, may be added at the same time as the initiation of the polymerization, or may be added during the period in which the nuclei of PTFE particles are formed after the polymerization is initiated. The modifying monomer is added at least before the initiation of the polymerization reaction or before the concentration of PTFE formed in the aqueous dispersion reaches 10.0% by mass or less as the polymerization reaction proceeds, and the modifying monomer may be further added after the concentration of PTFE exceeds 10.0% by mass. For example, the modifying monomer may be continuously added from the time before the concentration of PTFE reaches 10.0% by mass and even when the concentration exceeds 10.0% by mass. Further, the modifying monomer may be added at least once before the concentration of PTFE reaches 10.0% by mass, and the modifying monomer may be further added at least once after the concentration exceeds 10.0% by weight. The method of adding the modifying monomer may be pushing the modifying monomer into the reactor by TFE.

The amount of the modifying monomer added before the polymerization reaction is initiated or before the concentration of PTFE in the aqueous dispersion reaches 10.0% by mass or less or preferably before the concentration reaches 5.0% by mass or less as the polymerization reaction proceeds is preferably 0.00001% by mass or more, more preferably 0.0001% by mass or more, still more preferably 0.001% by mass or more, and particularly preferably 0.003% by mass or more based on the resulting PTFE. Further, the amount of the modifying monomer added before the polymerization reaction is initiated or before the concentration of PTFE in the aqueous dispersion reaches 10.0% by mass or preferably before the concentration reaches 5.0% by mass as the polymerization reaction proceeds is, in order of preference, 1.0% by mass or less, 0.90% by mass or less, 0.50% by mass or less, 0.40% by mass or less, 0.30% by mass or less, 0.20% by mass or less, 0.15% by mass or less, 0.10% by mass or less, and 0.05% by mass or less based on all polymerization units of the resulting PTFE.

The modifying monomer is not limited as long as it is copolymerizable with TFE, and examples include fluoromonomers and non-fluoromonomers. Further, one kind or a plurality of kinds of the modifying monomers may be used.

Examples of non-fluoromonomers include, but not limited to, monomers represented by the general formula:

wherein $R^{Q1}$ represents a hydrogen atom or an alkyl group; L represents a single bond, —CO—O—*, —O—CO—*, or —O—; * represents the bond position with $R^{Q2}$. $R^{Q2}$ represents a hydrogen atom, an alkyl group, or a nitrile group.

Examples of non-fluoromonomers include methyl acrylate, methyl methacrylate, ethyl acrylate, ethyl methacrylate, propyl acrylate, propyl methacrylate butyl acrylate, butyl methacrylate, hexyl methacrylate, cyclohexyl methacrylate, vinyl methacrylate, vinyl acetate, acrylic acid, methacrylic acid, acrylonitrile, methacrylonitrile, ethyl vinyl ether, and cyclohexyl vinyl ether. Among these, the non-fluoromonomer is preferably butyl methacrylate, vinyl acetate, or acrylic acid.

Examples of fluoromonomers include perfluoroolefins such as hexafluoropropylene (HFP); hydrogen-containing fluoroolefins such as trifluoroethylene and vinylidene fluoride (VDF); perhaloolefins such as chlorotrifluoroethylene; perfluorovinyl ethers; (perfluoroalkyl)ethylenes; and perfluoroallyl ethers.

Examples of perfluorovinyl ethers include, but are not limited to, unsaturated perfluoro compounds represented by the general formula (A):

$$CF_2=CF-ORf \quad (A)$$

wherein Rf represents a perfluoro organic group. The "perfluoro organic group" as used herein means an organic group in which all hydrogen atoms bonded to the carbon atoms are replaced with fluorine atoms. The perfluoro organic group may have ether oxygen.

Examples of perfluorovinyl ethers include perfluoro(alkyl vinyl ether) (PAVE) in which Rf is a perfluoroalkyl group having 1 to 10 carbon atoms in the general formula (A). The perfluoroalkyl group preferably has 1 to 5 carbon atoms.

Examples of the perfluoroalkyl group in PAVE include a perfluoromethyl group, a perfluoroethyl group, a perfluoropropyl group, a perfluorobutyl group, a perfluoropentyl group, and a perfluorohexyl group.

Examples of the perfluorovinyl ether further include those represented by the general formula (A) in which Rf is a perfluoro(alkoxyalkyl) group having 4 to 9 carbon atoms; those in which Rf is a group represented by the following formula:

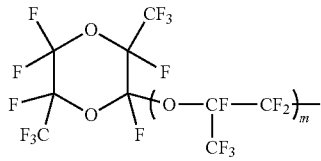

wherein m represents an integer of 0 or 1 to 4; and those in which Rf is a group represented by the following formula:

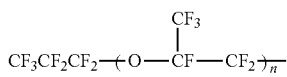

wherein n is an integer of 1 to 4.

Examples of hydrogen-containing fluoroolefins include $CH_2=CF_2$, $CFH=CH_2$, $CFH=CF_2$, $CF_2=CFCF_3$, $CH_2=CFCF_3$, $CH_2=CHCF_3$, $CHF=CHCF_3$ (E-form), and $CHF=CHCF_3$ (Z-form).

Examples of (perfluoroalkyl)ethylene (PFAE) include, but are not limited to, (perfluorobutyl)ethylene (PFBE) and (perfluorohexyl) ethylene.

Examples of perfluoroallyl ether include fluoromonomers represented by the general formula:

$$CF_2=CF-CF_2-ORf$$

wherein Rf represents a perfluoro organic group.

Rf in the above general formula is the same as Rf in the general formula (A). Rf is preferably a perfluoroalkyl group having 1 to 10 carbon atoms or a perfluoroalkoxyalkyl group having 1 to 10 carbon atoms. Perfluoroallyl ether is preferably at least one selected from the group consisting of $CF_2=CF-CF_2-O-CF_3$, $CF_2=CF-CF_2-O-C_2F_5$, $CF_2=CF-CF_2-O-C_3F_7$, and $CF_2=CF-CF_2-O-C_4F_9$, more preferably at least one selected from the group consisting of $CF_2=CF-CF_2-O-C_2F_5$, $CF_2=CF-CF_2-O-C_3F_7$, and $CF_2=CF-CF_2-O-C_4F_9$, and still more preferably $CF_2=CF-CF_2-O-CF_2CF_2CF_3$.

The modifying monomer is also preferably exemplified by a modifying monomer (3) having a monomer reactivity ratio of 0.1 to 8. Due to the presence of the modifying monomer (3), primary particles having a small average primary particle size and aspect ratio are obtained, and thereby an aqueous dispersion having high dispersion stability can be obtained.

The monomer reactivity ratio in the copolymerization with TFE is a value obtained by dividing a rate constant attained when the propagating radical reacts with TFE when the propagating radical is less than a repeating unit based on TFE by a rate constant attained when the propagating radical reacts with a modifying monomer. The lower the value is, the more reactive with TFE the modifying monomer is. The monomer reactivity ratio can be calculated by copolymerizing TFE and the modifying monomer, determining the composition of the polymer formed immediately after initiation, and calculating the reactivity ratio by Fineman-Ross equation.

Copolymerization is performed using 3,600 g of deionized degassed water, 1,000 mass ppm of ammonium perfluorooctanoate based on the water, and 100 g of paraffin wax contained in an autoclave made of stainless steel with an internal volume of 6.0 L at a pressure of 0.78 MPaG and a temperature of 70° C. The modifying monomer in an amount of 0.05 g, 0.1 g, 0.2 g, 0.5 g, or 1.0 g is added to the reactor, and then 0.072 g of ammonium persulfate (20 mass ppm based on water) is added, and TFE is continuously fed to maintain the polymerization pressure at 0.78 MPaG. When the amount of TFE charged reaches 1,000 g, stirring is terminated, and the pressure is released until the pressure in the reactor decreases to atmospheric pressure. After cooling, paraffin wax is separated to obtain an aqueous dispersion containing the resulting polymer. The aqueous dispersion is stirred so that the resulting polymer coagulates, and the polymer is dried at 150° C. The composition of the resulting polymer is calculated by suitably combining NMR, FT-IR, elemental analysis, and X-ray fluorescence analysis according to the type of monomer.

The modifying monomer (3) having a monomer reactivity ratio of 0.1 to 8 is preferably at least one selected from the group consisting of modifying monomers represented by the formulas (3a) to (3d):

$$CH_2=CH-Rf^1 \quad (3a)$$

wherein $Rf^1$ is a perfluoroalkyl group having 1 to 10 carbon atoms;

$$CF_2=CF-O-Rf^2 \quad (3b)$$

wherein $Rf^2$ is a perfluoroalkyl group having 1 to 2 carbon atoms;

$$CF_2=CF-O-(CF_2)_nCF=CF_2 \quad (3c)$$

wherein n is 1 or 2; and

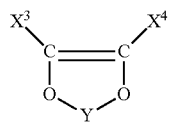 (3d)

wherein $X^3$ and $X^4$ are each F, Cl, or a methoxy group, and Y is represented by the formula Y1 or Y2:

$$-CF=CF- \quad (Y1)$$

 (Y2)

in the formula Y2, Z and Z' are each F or a fluorinated alkyl group having 1 to 3 carbon atoms.

The content of the modifying monomer (3) unit is preferably in the range of 0.00001 to 1.0% by mass based on all polymerization units of PTFE. The lower limit is more preferably 0.0001% by mass, more preferably 0.0005% by mass, still more preferably 0.001% by mass, and further preferably 0.005% by mass. The upper limit is, in order of preference, 0.90% by mass, 0.50% by mass, 0.40% by mass, 0.30% by mass, 0.20% by mass, 0.15% by mass, 0.10% by mass, 0.08% by mass, 0.05% by mass, and 0.01% by mass.

The modifying monomer is preferably at least one selected from the group consisting of hexafluoropropylene, chlorotrifluoroethylene, vinylidene fluoride, perfluoro (alkyl vinyl ether), (perfluoroalkyl)ethylene, ethylene, and modifying monomers having a functional group capable of reaction by radical polymerization and a hydrophilic group. By using the modifying monomer, more particles can be generated during polymerization, and, moreover, primary particles having a smaller average primary particle size and aspect ratio can be obtained. Further, an aqueous dispersion having a smaller amount of uncoagulated polymer can be obtained.

From the viewpoint of reactivity with TFE, the modifying monomer preferably contains at least one selected from the group consisting of hexafluoropropylene, perfluoro(alkyl vinyl ether), and (perfluoroalkyl)ethylene.

The modifying monomer more preferably contains at least one selected from the group consisting of hexafluoropropylene, perfluoro(methyl vinyl ether), perfluoro (propyl vinyl ether), (perfluorobutyl)ethylene, (perfluorohexyl)ethylene, and (perfluorooctyl)ethylene.

The total amount of the hexafluoropropylene unit, the perfluoro (alkyl vinyl ether) unit and the (perfluoroalkyl) ethylene unit is preferably in the range of 0.00001 to 1% by mass based on all polymerization units of PTFE. The lower limit of the total amount is more preferably 0.0001% by mass, more preferably 0.0005% by mass, still more preferably 0.001% by mass, and further preferably 0.005% by mass. The upper limit is, in order of preference, 0.50% by mass, 0.40% by mass, 0.30% by mass, 0.20% by mass, 0.15% by mass, 0.10% by mass, 0.08% by mass, 0.05% by mass, and 0.01% by mass.

It is also preferable that the modifying monomer contains a modifying monomer having a functional group capable of reaction by radical polymerization and a hydrophilic group (hereinafter, referred to as a "modifying monomer (A)").

By causing the modifying monomer (A) to be present, more particles can be generated during polymerization, moreover, primary particles having a smaller average primary particle size and aspect ratio can be obtained, and the amount of an uncoagulated polymer can also be reduced.

The amount of the modifying monomer (A) used is preferably an amount exceeding 0.1 mass ppm of the aqueous medium, more preferably an amount exceeding 0.5 mass ppm, still more preferably an amount exceeding 1.0 mass ppm, further preferably 5 mass ppm or more, and particularly preferably 10 mass ppm or more. When the amount of the modifying monomer (A) used is too small, the average primary particle size of the resulting PTFE is not reduced in some cases.

The amount of the modifying monomer (A) used should be in the above range, and the upper limit can be, for example, 5,000 mass ppm. Further, in the production method, the modifying monomer (A) may be added to the system during the reaction in order to improve the stability of the aqueous dispersion during or after the reaction.

Since the modifying monomer (A) is highly water-soluble, even when the unreacted modifying monomer (A) remains in the aqueous dispersion, it can be easily removed in the concentration step or the coagulation/washing step.

The modifying monomer (A) is incorporated into the resulting polymer during the course of polymerization, and since the concentration of the modifying monomer (A) in the polymerization system itself is low and the amount incorporated into the polymer is small, there is no problem such as an impaired heat resistance of PTFE or coloring of PTFE after sintering.

Examples of the hydrophilic group in the modifying monomer (A) include $-NH_2$, $-PO_3M$, $-OPO_3M$, $-SO_3M$, $-OSO_3M$, and $-COOM$, wherein M represents H, a metal atom, $NR^{7y4}$, imidazolium optionally having a substituent, pyridinium optionally having a substituent, or phosphonium optionally having a substituent, wherein $R^{7y}$ is H or an organic group and may be the same or different, and any two may be bonded to each other to form a ring. Of these, the hydrophilic group is preferably $-SO_3M$ or $-COOM$. The organic group in $R^{7y}$ is preferably an alkyl group. $R^{7y}$ is preferably H or a $C_{1-10}$ organic group, more preferably H or a $C_{1-4}$ organic group, and still more preferably H or a $C_{1-4}$ alkyl group.

Examples of the metal atom include monovalent and divalent metal atoms, alkali metals (Group 1), and alkaline earth metals (Group 2), and preferable is Na, K, or Li.

Examples of the "functional group capable of reaction by radical polymerization" in the modifying monomer (A) include a group having an ethylenically unsaturated bond such as a vinyl group or an allyl group. The group having an ethylenically unsaturated bond may be represented by the following formula:

$$CX^eX^g=CX^fR-$$

wherein $X^e$, $X^f$ and $X^g$ are each independently F, Cl, H, $CF_3$, $CF_2H$, $CFH_2$ or $CH_3$; and R is a linking group. Examples of the linking group R include linking groups denoted as $R^a$ which will be described below. Preferable examples include groups having an unsaturated bond, such as $-CH=CH_2$, $-CF=CH_2$, $-CH=CF_2$, $-CF=CF_2$, $-CH_2-CH=CH_2$, $-CF_2-CF=CH_2$, $-CF_2-CF=CF_2$, $-(C=O)-CH=CH_2$, $-(C=O)-CF=CH_2$, —(C=O)—CH=CF$_2$, —(C=O)—CF=CF$_2$, —(C=O)—C(CH$_3$)=CH$_2$, —(C=O)—C(CF$_3$)=CH$_2$, —(C=O)—C(CH$_3$)=CF$_2$, —(C=O)—C(CF$_3$)=CF$_2$, —O—CH$_2$—CH=CH$_2$, —O—CF$_2$—CF=CH$_2$, —O—CH$_2$—CH=CF$_2$, and —O—CF$_2$—CF=CF$_2$.

Since the modifying monomer (A) has a functional group capable of reaction by radical polymerization, it is presumed that when used in the polymerization, the modifying monomer (A) reacts with a fluorine-containing monomer at the initial stage of the polymerization reaction and forms highly stable particles having a hydrophilic group derived from the modifying monomer (A). Accordingly, it is considered that the number of particles increases when the polymerization is performed in the presence of the modifying monomer (A).

The polymerization may be performed in the presence of one or more modifying monomers (A).

In the polymerization, the modifying monomer (A) may be a compound having an unsaturated bond.

The modifying monomer (A) is preferably a compound represented by the general formula (4):

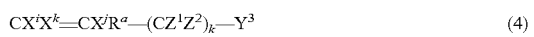

$$CX^iX^k=CX^jR^a—(CZ^1Z^2)_k—Y^3 \quad (4)$$

wherein $X^i$, $X^j$, and $X^k$ are each independently F, Cl, H, or CF$_3$; $Y^3$ is a hydrophilic group; $R^a$ is a linking group; $Z^1$ and $Z^2$ are each independently H, F, or CF$_3$; and k is 0 or 1.

Examples of the hydrophilic group include —NH$_2$, —PO$_3$M, —OPO$_3$M, —SO$_3$M, —OSO$_3$M, and —COOM, wherein M represents H, a metal atom, NR$^{7y4}$, imidazolium optionally having a substituent, pyridinium optionally having a substituent, or phosphonium optionally having a substituent, wherein R$^{7y}$ is H or an organic group and may be the same or different, and any two may be bonded to each other to form a ring. Of these, the hydrophilic group is preferably —SO$_3$M or —COOM. The organic group in R$^{7y}$ is preferably an alkyl group. R$^{7y}$ is preferably H or a C$_{1-10}$ organic group, more preferably H or a C$_{1-4}$ organic group, and still more preferably H or a C$_{1-4}$ alkyl group. Examples of the metal atom include monovalent and divalent metal atoms, alkali metals (Group 1), and alkaline earth metals (Group 2), and preferable is Na, K, or Li.

By using the modifying monomer (A), more particles can be generated during polymerization, and, moreover, primary particles having a smaller average primary particle size and aspect ratio can be obtained.

$R^a$ is a linking group. The "linking group" as used herein refers to a divalent linking group. The linking group may be a single bond and preferably contains at least one carbon atom, and the number of carbon atoms may be 2 or more, 4 or more, 8 or more, 10 or more, or 20 or more. The upper limit is not limited, and, for example, may be 100 or less, and may be 50 or less.

The linking group may be linear or branched, cyclic or acyclic, saturated or unsaturated, substituted or unsubstituted, and optionally contains one or more heteroatoms selected from the group consisting of sulfur, oxygen, and nitrogen, and optionally contains one or more functional groups selected from the group consisting of ester, amide, sulfonamide, carbonyl, carbonate, urethane, urea, and carbamate. The linking group may be free from carbon atoms and may be a catenary heteroatom such as oxygen, sulfur, or nitrogen.

$R^a$ is preferably a catenary heteroatom such as oxygen, sulfur, or nitrogen, or a divalent organic group.

When $R^a$ is a divalent organic group, the hydrogen atom bonded to the carbon atom may be replaced with a halogen other than fluorine, such as chlorine, and the divalent organic group may or may not contain a double bond. Further, $R^a$ may be linear or branched, and may be cyclic or acyclic. $R^a$ may also contain a functional group (e.g., ester, ether, ketone, amine, halide, etc.).

$R^a$ may also be a fluorine-free divalent organic group or a partially fluorinated or perfluorinated divalent organic group.

$R^a$ may be, for example, a hydrocarbon group in which a fluorine atom is not bonded to a carbon atom, a hydrocarbon group in which some of the hydrogen atoms bonded to carbon atoms are replaced with fluorine atoms, a hydrocarbon group in which all of the hydrogen atoms bonded to carbon atoms are replaced with fluorine atoms, —(C=O)—, —(C=O)—O—, or a hydrocarbon group containing —(C=O)—, and these groups optionally contain an oxygen atom, optionally contain a double bond, and optionally contain a functional group.

$R^a$ is preferably —(C=O)—, —(C=O)—O—, or a hydrocarbon group having 1 to 100 carbon atoms that optionally contains an ether bond and optionally contains a carbonyl group, wherein some or all of the hydrogen atoms bonded to carbon atoms in the hydrocarbon group may be replaced with fluorine.

$R^a$ is preferably at least one selected from —(CH$_2$)$_a$—, —(CF$_2$)$_a$—, —O—(CF$_2$)$_a$—, —(CF$_2$)$_a$—O—(CF$_2$)$_b$—, —O(CF$_2$)$_a$—O—(CF$_2$)$_b$—, —(CF$_2$)$_a$—[O—(CF$_2$)$_b$]$_c$—, —O(CF$_2$)$_a$—[O—(CF$_2$)$_b$]$_c$—, —[(CF$_2$)$_a$—O]$_b$—[(CF$_2$)$_c$—O]$_d$—, —O[(CF$_2$)$_a$—O]$_b$—[(CF$_2$)$_c$—O]$_d$—, —O—[CF$_2$CF(CF$_3$)O]$_a$—(CF$_2$)$_b$—, —(C=O)—, —(C=O)—O—, —(C=O)—(CH$_2$)$_a$—, —(C=O)—(CF$_2$)$_a$—, —(C=O)—O—(CH$_2$)$_a$—, —(C=O)—O—(CF$_2$)$_a$—, —(C=O)—[(CH$_2$)$_a$—O]$_b$—, —(C=O)—[(CF$_2$)$_a$—O]$_b$—, —(C=O)—O [(CH$_2$)$_a$—O]$_b$—, —(C=O)—O [(CF$_2$)$_a$—O]$_b$—, —(C=O)—O [(CH$_2$)$_a$—O]$_b$—(CH$_2$)$_c$—, —(C=O)—O [(CF$_2$)$_a$—O]$_b$—(CF$_2$)$_c$—, —(C=O)—(CH$_2$)$_a$—O—(CH$_2$)$_b$—, —(C=O)—(CF$_2$)$_a$—O—(CF$_2$)$_b$—, —(C=O)—O—(CH$_2$)$_a$—O—(CH$_2$)$_b$—, —(C=O)—O—(CF$_2$)$_a$—O—(CF$_2$)$_b$—, —(C=O)—O—C$_6$H$_4$—, and combinations thereof, wherein a, b, c, and d are independently at least 1 or more. a, b, c and d may independently be 2 or more, 3 or more, 4 or more, 10 or more, or 20 or more. The upper limits of a, b, c, and d are, for example, 100.

Specific suitable examples of $R^a$ include —CF$_2$—O—, —CF$_2$—O—CF$_2$—, —CF$_2$—O—CH$_2$—, —CF$_2$—O—CH$_2$CF$_2$—, —CF$_2$—O—CF$_2$CF$_2$—, —CF$_2$—O—CF$_2$CH$_2$—, —CF$_2$—O—CF$_2$CF$_2$CH$_2$—, —CF$_2$—O—CF(CF$_3$)—, —CF$_2$—O—CF(CF$_3$)CF$_2$—, —CF$_2$—O—CF(CF$_3$)CF$_2$—O—, —CF$_2$—O—CF(CF$_3$)CH$_2$—, —(C=O)—, —(C=O)—O—, —(C=O)—(CH$_2$)—, —(C=O)—(CF$_2$)—, —(C=O)—O—(CH$_2$)—, —(C=O)—O—(CF$_2$)—, —(C=O)—[(CH$_2$)$_2$—O]$_n$—, —(C=O)—[(CF$_2$)$_2$—O]$_n$—, —(C=O)—O[(CH$_2$)$_2$—O]$_n$—, —(C=O)—O[(CF$_2$)$_2$—O]$_n$—, —(C=O)—O[(CH$_2$)$_2$—O]$_n$—(CH$_2$)—, —(C=O)—O[(CF$_2$)$_2$—O]$_n$—(CF$_2$)—, —(C=O)—(CH$_2$)$_2$—O—(CH$_2$)—, —(C=O)—(CF$_2$)$_2$—O—(CF$_2$)—, —(C=O)—O—(CH$_2$)$_2$—O—(CH$_2$)—, —(C=O)—O—(CF$_2$)$_2$—O—(CF$_2$)—, and —(C=O)—O—C$_6$H$_4$—. Among these, specifically $R^a$ is preferably —CF$_2$—O—, —CF$_2$—O—CF$_2$—, —CF$_2$—O—CF$_2$CF$_2$—, —CF$_2$—O—CF(CF$_3$)—, —CF$_2$—O—CF(CF$_3$)CF$_2$—, —CF$_2$—O—CF(CF$_3$)CF$_2$—O—, —(C=O)—, —(C=O)—O—, —(C=O)—(CH$_2$)—, —(C=O)—O—(CH$_2$)—, —(C=O)—O[(CH$_2$)$_2$—O]$_n$—, —(C=O)—O[(CH$_2$)$_2$—O]$_n$—(CH$_2$)—, —(C=O)—(CH$_2$)$_2$—O—(CH$_2$)—, or —(C=O)—O—C$_6$H$_4$—.

In the formulas, n is an integer of 1 to 10.

—$R^a$—$(CZ^1Z^2)_k$— in the general formula (4) is preferably —$CF_2$—O—$CF_2$—, —$CF_2$—O—$CF(CF_3)$—, —$CF_2$—O—$C(CF_3)_2$—, —$CF_2$—O—$CF_2$—$CF_2$—, —$CF_2$—O—$CF_2$—$CF(CF_3)$—, —$CF_2$—O—$CF_2$—$C(CF_3)_2$—, —$CF_2$—O—$CF_2CF_2$—$CF_2$—, —$CF_2$—O—$CF_2CF_2$—$CF(CF_3)$—, —$CF_2$—O—$CF_2CF_2$—$C(CF_3)_2$—, —$CF_2$—O—$CF(CF_3)$—$CF_2$—, —$CF_2$—O—$CF(CF_3)$—$CF(CF_3)$—, —$CF_2$—O—$CF(CF_3)$—$C(CF_3)_2$—, —$CF_2$—O—$CF(CF_3)$—$CF_2$—, —$CF_2$—O—$CF(CF_3)$—$CF(CF_3)$—, —$CF_2$—O—$CF(CF_3)$—$C(CF_3)_2$—, —$CF_2$—O—$CF(CF_3)CF_2$—$CF(CF_3)$—, —$CF_2$—O—$CF(CF_3)CF_2$—$C(CF_3)_2$—, —$CF_2$—O—$CF(CF_3)CF_2$—O—$CF_2$—, —$CF_2$—O—$CF(CF_3)CF_2$—O—$CF(CF_3)$—, —$CF_2$—O—$CF(CF_3)CF_2$—O—$C(CF_3)_2$—, —(C=O)—, —(C=O)—O—, —(C=O)—$(CH_2)$—, —(C=O)—$(CF_2)$—, —(C=O)—O—$(CH_2)$—, —(C=O)—O—$(CF_2)$—, —(C=O)—$[(CH_2)_2$—O$]_n$—$(CH_2)$—, —(C=O)—$[(CF_2)_2$—O$]_n$—$(CF_2)$—, —(C=O)—$[(CH_2)_2$—O$]_n$—$(CH_2)$—$(CH_2)$—, —(C=O)—$[(CF_2)_2$—O$]_n$—$(CF_2)$—$(CF_2)$—, —(C=O)—O$[(CH_2)_2$—O$]_n$—$(CF_2)$—, —(C=O)—O$[(CH_2)_2$—O$]_n$—$(CH_2)$—$(CH_2)$—, —(C=O)—O$[(CF_2)_2$—O$]_n$—$(CF_2)$—, —(C=O)—O$[(CF_2)_2$—O$]_n$—$(CF_2)$—$(CF_2)$—, —(C=O)—$(CH_2)_2$—O— $(CH_2)$—$(CH_2)$—, —(C=O)—$(CF_2)_2$—O—$(CF_2)$—$(CF_2)$—, —(C=O)—O—$(CH_2)_2$—O—$(CH_2)$—$(CH_2)$—, —(C=O)—O—$(CF_2)_2$—O—$(CF_2)$—$(CF_2)$—, —(C=O)—O— $(CH_2)_2$—O—$(CH_2)$—$C(CF_3)_2$—, —(C=O)—O—$(CF_2)_2$—O—$(CF_2)$—$C(CF_3)_2$—, or —(C=O)—O—$C_6H_4$—$C(CF_3)_2$—, and more preferably —$CF_2$—O—$CF(CF_3)$—, —$CF_2$—O—$CF_2$—$CF(CF_3)$—, —$CF_2$—O—$CF_2CF_2$—$CF(CF_3)$—, —$CF_2$—O—$CF(CF_3)$—$CF(CF_3)$—, —$CF_2$—O—$CF(CF_3)CF_2$—$CF(CF_3)$—, —$CF_2$—O—$CF(CF_3)CF_2$—$CF(CF_3)$—, —(C=O)—, —(C=O)—O—$(CH_2)$—, —(C=O)—O—$(CH_2)$—$(CH_2)$—, —(C=O)—O$[(CH_2)_2$—O$]_n$—$(CH_2)$—$(CH_2)$—, —(C=O)—O—$(CH_2)_2$—O—$(CH_2)$—$C(CF_3)_2$—, or —(C=O)—O—$C_6H_4$—$C(CF_3)_2$—.

In the formulas, n is an integer of 1 to 10.

Specific examples of the compound represented by the general formula (4) include compounds represented by the following formulas:

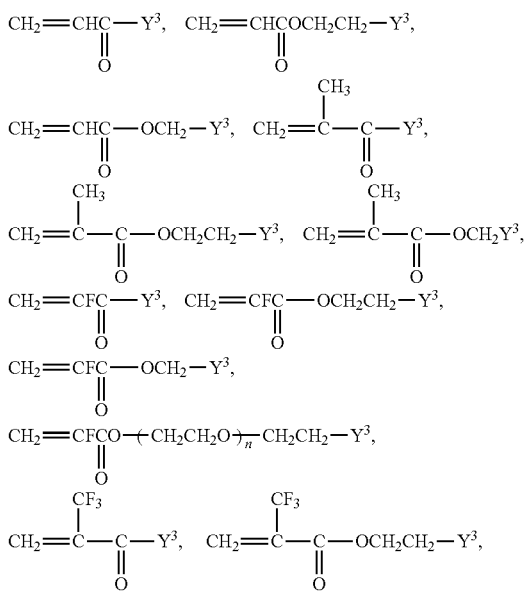

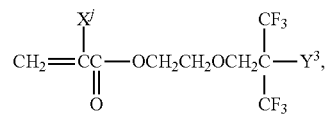

(i)

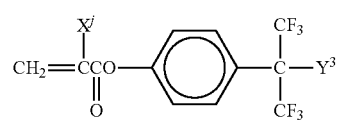

(ii)

wherein $X^j$ and $Y^3$ are as described above; and n is an integer of 1 to 10.

$R^a$ is preferably a divalent group represented by the following general formula (r1):

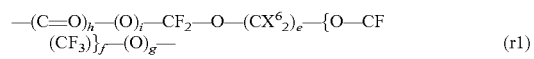

(r1)

wherein $X^6$ is each independently H, F, or $CF_3$; e is an integer of 0 to 3; f is an integer of 0 to 3; g is 0 or 1; h is 0 or 1; and i is 0 or 1, and is also preferably a divalent group represented by the general formula (r2):

(r2)

wherein $X^7$ is each independently H, F, or $CF_3$; e is an integer of 0 to 3; g is 0 or 1; h is 0 or 1; and i is 0 or 1.

—$R^a$—$(CZ^1Z^2)_k$— in the general formula (4) is also preferably a divalent group represented by the following formula (t1):

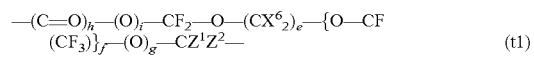

(t1)

wherein $X^6$ is each independently H, F, or $CF_3$; e is an integer of 0 to 3; f is an integer of 0 to 3; g is 0 or 1; h is 0 or 1; i is 0 or 1; and $Z^1$ and $Z^2$ are each independently F or $CF_3$, and is more preferably a group in which one of $Z^1$ and $Z^2$ is F and the other is $CF_3$ in the formula (t1).

Also, in the general formula (4), —$R^a$—$(CZ^1Z^2)_k$— is preferably a divalent group represented by the following formula (t2):

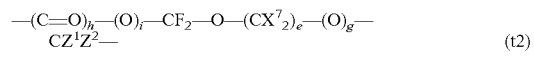

(t2)

wherein $X^7$ is each independently H, F, or $CF_3$; e is an integer of 0 to 3; g is 0 or 1; h is 0 or 1; i is 0 or 1; and $Z^1$ and $Z^2$ are each independently F or $CF_3$, and is more preferably a group in which one of $Z^1$ and $Z^2$ is F and the other is $CF_3$ in the formula (t2).

The compound represented by the general formula (4) also preferably has a C—F bond and does not have a C—H bond, in the portion excluding the hydrophilic group ($Y^3$). In other words, in the general formula (4), $X^i$, $X^j$, and $X^k$ are all F, and $R^a$ is preferably a perfluoroalkylene group having 1 or more carbon atoms; and the perfluoroalkylene group may be either linear or branched, may be either cyclic or acyclic, and may contain at least one catenary heteroatom. The perfluoroalkylene group may have 2 to 20 carbon atoms or 4 to 18 carbon atoms.

The compound represented by the general formula (4) may be partially fluorinated. In other words, the compound represented by the general formula (4) also preferably has at least one hydrogen atom bonded to a carbon atom and at least one fluorine atom bonded to a carbon atom, in the portion excluding the hydrophilic group ($Y^3$).

The compound represented by the general formula (4) is also preferably a compound represented by the following formula (4a):

$$CF_2=CF-O-Rf^0-Y^3 \qquad (4a)$$

wherein $Y^3$ is a hydrophilic group; and $Rf^0$ is a perfluorinated divalent linking group that is perfluorinated and may be a linear or branched, cyclic or acyclic, saturated or unsaturated, substituted or unsubstituted, and optionally contains one or more heteroatoms selected from the group consisting of sulfur, oxygen, and nitrogen.

The compound represented by the general formula (4) is also preferably a compound represented by the following formula (4b):

$$CH_2=CH-O-Rf^0-Y^3 \qquad (4b)$$

wherein $Y^3$ is a hydrophilic group; and $Rf^0$ is a perfluorinated divalent linking group as defined in the formula (4a).

In a preferable embodiment, $Y^3$ in the general formula (4) is $-OSO_3M$. Examples of the compound represented by the general formula (4) when $Y^3$ is $-OSO_3M$ include $CF_2=CF(OCF_2CF_2CH_2OSO_3M)$, $CH_2=CH((CF_2)_4CH_2OSO_3M)$, $CF_2=CF(O(CF_2)_4CH_2OSO_3M)$, $CF_2=CF(OCF_2CF(CF_3)CH_2OSO_3M)$, $CF_2=CF(OCF_2CF(CF_3)OCF_2CF_2CH_2OSO_3M)$, $CH_2=CH((CF_2)_4CH_2OSO_3M)$, $CF_2=CF(OCF_2CF_2SO_2N(CH_3)CH_2CH_2OSO_3M)$, $CH_2=CH(CF_2CF_2CH_2OSO_3M)$, and $CF_2=CF(OCF_2CF_2CF_2CF_2SO_2N(CH_3)CH_2OSO_3M)$. In the formulas, M is as described above.

In a preferable embodiment, $Y^3$ in the general formula (4) is also $-SO_3M$. Examples of the compound represented by the general formula (4) when $Y^3$ is $-SO_3M$ include $CF_2=CF(OCF_2CF_2SO_3M)$, $CF_2=CF(O(CF_2)_4SO_3M)$, $CF_2=CF(OCF_2CF(CF_3)SO_3M)$, $CF_2=CF(OCF_2CF(CF_3)OCF_2CF_2SO_3M)$, $CH_2=CH(CF_2CF_2SO_3M)$, $CF_2=CF(OCF_2CF(CF_3)OCF_2CF_2CF_2SO_3M)$, $CH_2=CH((CF_2)_4SO_3M)$, and $CH_2=CH((CF_2)_3SO_3M)$. In the formulas, M is as described above.

In a preferable embodiment, $Y^3$ in the general formula (4) is also $-COOM$. When $Y^3$ is $-COOM$, examples of the compound represented by the general formula (4) include $CF_2=CF(OCF_2CF_2COOM)$, $CF_2=CF(OCF_2CF_2CF_2COOM)$, $CF_2=CF(O(CF_2)_5COOM)$, $CF_2=CF(OCF_2CF(CF_3)COOM)$, $CF_2=CF(OCF_2CF(CF_3)O(CF_2)_nCOOM)$ (n is greater than 1), $CH_2=CH(CF_2CF_2COOM)$, $CH_2=CH((CF_2)_4COOM)$, $CH_2=CH((CF_2)_3COOM)$, $CF_2=CF(OCF_2CF_2SO_2NR'CH_2COOM)$, $CF_2=CF(O(CF_2)_4SO_2NR'CH_2COOM)$, $CF_2=CF(OCF_2CF(CF_3)SO_2NR'CH_2COOM)$, $CF_2=CF(OCF_2CF(CF_3)OCF_2CF_2SO_2NR'CH_2COOM)$, $CH_2=CH(CF_2CF_2SO_2NR'CH_2COOM)$, $CF_2=CF(OCF_2CF(CF_3)OCF_2CF_2CF_2CF_2SO_2NR'CH_2COOM)$, $CH_2=CH((CF_2)_4SO_2NR'CH_2COOM)$, and $CH_2=CH((CF_2)_3SO_2NR'CH_2COOM)$. In the formulas, R' is H or a $C_{1-4}$ alkyl group, and M is as described above.

In a preferable embodiment, $Y^3$ in the general formula (4) is also $-OPO_3M$ or $-OP(O)(OM)_2$. Examples of the compound represented by the general formula (4) when $Y^3$ is $-OPO_3M$ or $-OP(O)(OM)_2$ include $CF_2=CF(OCF_2CF_2CH_2OP(O)(OM)_2)$, $CF_2=CF(O(CF_2)_4CH_2OP(O)(OM)_2)$, $CF_2=CF(OCF_2CF(CF_3)CH_2OP(O)(OM)_2)$, $CF_2=CF(OCF_2CF(CF_3)OCF_2CF_2CH_2OP(O)(OM)_2)$, $CF_2=CF(OCF_2CF_2SO_2N(CH_3)CH_2CH_2OP(O)(OM)_2)$, $CF_2=CF(OCF_2CF_2CF_2CF_2SO_2N(CH_3)CH_2CH_2OP(O)(OM)_2)$, $CH_2=CH(CF_2CF_2CH_2OP(O)(OM)_2)$, $CH_2=CH((CF_2)_4CH_2OP(O)(OM)_2)$, and $CH_2=CH((CF_2)_3CH_2OP(O)(OM)_2)$. In the formulas, M is as described above.

In a preferable embodiment, $Y^3$ in the general formula (4) is also $-PO_3M$ or $-P(O)(OM)_2$. Examples of the compound represented by the general formula (4) when $Y^3$ is $-PO_3M$ or $-P(O)(OM)_2$ include $CF_2=CF(OCF_2CF_2P(O)(OM)_2)$, $CF_2=CF(O(CF_2)_4P(O)(OM)_2)$, $CF_2=CF(OCF_2CF(CF_3)P(O)(OM)_2)$, $CF_2=CF(OCF_2CF(CF_3)OCF_2CF_2P(O)(OM)_2)$, $CH_2=CH(CF_2CF_2P(O)(OM)_2)$, $CH_2=CH((CF_2)_4P(O)(OM)_2)$, and $CH_2=CH((CF_2)_3P(O)(OM)_2)$, wherein M is as described above.

The compound represented by the general formula (4) is preferably at least one selected from the group consisting of:

a compound represented by the general formula (5):

$$CX_2=CY(-CZ_2-O-Rf-Y^3) \qquad (5)$$

wherein X is the same or different and is $-H$ or $-F$; Y is $-H$, $-F$, an alkyl group, or a fluorine-containing alkyl group; Z is the same or different and $-H$, $-F$, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is as described above;

a compound represented by the general formula (6):

$$CX_2=CY(-O-Rf-Y^3) \qquad (6)$$

wherein X is the same or different and is $-H$ or $-F$; Y is $-H$, $-F$, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is as described above; and a compound represented by the general formula (7):

$$CX_2=CY(-Rf-Y^3) \qquad (7)$$

wherein X is the same or different and is $-H$ or $-F$; Y is $-H$, $-F$, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is as described above.

The fluorine-containing alkylene group having 2 to 100 carbon atoms and having an ether bond is an alkylene group that does not include a structure wherein an oxygen atom is an end and that contains an ether bond between carbon atoms.

In the general formula (5), each X is $-H$ or $-F$. X may be both $-F$, or at least one may be $-H$. For example, one may be $-F$ and the other may be $-H$, or both may be $-H$.

In the general formula (5), Y is $-H$, $-F$, an alkyl group, or a fluorine-containing alkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Y is preferably $-H$, $-F$, or $-CF_3$, and more preferably $-F$.

In the general formula (5), Z is the same or different and is $-H$, $-F$, an alkyl group, or a fluoroalkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Z is preferably —H, —F, or —$CF_3$, and more preferably —F.

In the general formula (5), at least one of X, Y, and Z preferably contains a fluorine atom. For example, X may be —H, and Y and Z may be —F.

In the general formula (5), Rf is a fluorine-containing alkylene group having 1 to 40 carbon atoms or a fluorine-containing alkylene group having 2 to 100 carbon atoms and having an ether bond.

The fluorine-containing alkylene group preferably has 2 or more carbon atoms. The fluorine-containing alkylene group also preferably has 30 or less carbon atoms, more preferably 20 or less carbon atoms, and still more preferably 10 or less carbon atoms. Examples of the fluorine-containing alkylene group include —$CF_2$—, —$CH_2CF_2$—, —$CF_2CF_2$—, —$CF_2CH_2$—, —$CF_2CF_2CH_2$—, —$CF(CF_3)$—, —$CF(CF_3)CF_2$—, and —$CF(CF_3)CH_2$—. The fluorine-containing alkylene group is preferably a perfluoroalkylene group.

The fluorine-containing alkylene group having an ether bond preferably has 3 or more carbon atoms. Further, the fluorine-containing alkylene group having an ether bond preferably has 60 or less, more preferably 30 or less, and still more preferably 12 or less carbon atoms.

The fluorine-containing alkylene group having an ether bond is also preferably a divalent group represented by the following formula:

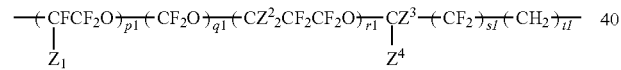

wherein $Z^1$ is F or $CF_3$; $Z^2$ and $Z^3$ are each H or F; $Z^4$ is H, F, or $CF_3$; p1+q1+r1 is an integer of 1 to 10; s1 is 0 or 1; and t1 is an integer of 0 to 5.

Specific examples of the fluorine-containing alkylene group having an ether bond include —$CF(CF_3)CF_2$—O—$CF(CF_3)$—, —$(CF(CF_3)CF_2$—O$)_n$—$CF(CF_3)$— (wherein n is an integer of 1 to 10), —$CF(CF_3)CF_2$—O—$CF(CF_3)$ $CH_2$—, —$(CF(CF_3)CF_2$—O$)_n$—$CF(CF_3)CH_2$— (wherein n is an integer of 1 to 10), —$CH_2CF_2CF_2O$—$CH_2CF_2CH_2$—, —$CF_2CF_2CF_2O$—$CF_2CF_2$—, —$CF_2CF_2CF_2O$—$CF_2CF_2CH_2$—, —$CF_2CF_2O$—$CF_2$—, and —$CF_2CF_2O$—$CF_2CH_2$—. The fluorine-containing alkylene group having an ether bond is preferably a perfluoroalkylene group.

In the general formula (5), $Y^3$ is preferably —COOM, —$SO_3M$, or —$OSO_3M$, wherein M is H, a metal atom, $NR^{7y}_4$, imidazolium optionally having a substituent, pyridinium optionally having a substituent, or phosphonium optionally having a substituent, wherein $R^{7y}$ is H or an organic group, and may be the same or different, and any two may be bonded to each other to form a ring.

The organic group in $R^{7y}$ is preferably an alkyl group.

$R^{7y}$ is preferably H or a $C_{1-10}$ organic group, more preferably H or a $C_{1-4}$ organic group, and still more preferably H or a $C_{1-4}$ alkyl group.

Examples of the metal atom include alkali metals (Group 1) and alkaline earth metals (Group 2), and preferable is Na, K, or Li.

M is preferably —H, a metal atom, or $NR^{7}_4$, more preferably —H, an alkali metal (Group 1), an alkaline earth metal (Group 2), or $NR^{7}_4$, still more preferably —H, —Na, —K, —Li, or —$NH_4$, further preferably —H, —Na, —K, or $NH_4$, particularly preferably —H, —Na, or $NH_4$, and most preferably —H or —$NH_4$.

$Y^3$ is preferably —COOM or —$SO_3M$, and more preferably —COOM.

The compound represented by the general formula (5) is preferably a compound (5a) represented by the general formula (5a):

$$CH_2=CF(-CF_2-O-Rf-Y^3) \qquad (5a)$$

wherein Rf and $Y^3$ are as described above.

Specific examples of the compound represented by the general formula (5a) include compounds represented by the following formula:

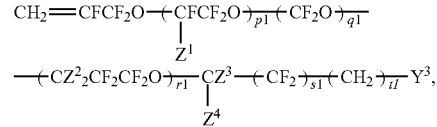

wherein $Z^1$ is F or $CF_3$; $Z^2$ and $Z^3$ are each H or F; $Z^4$ is H, F, or $CF_3$; p1+q1+r1 is an integer of 0 to 10; s1 is 0 or 1; t1 is an integer of 0 to 5; and $Y^3$ is as described above, provided that when $Z^3$ and $Z^4$ are both H, p1+q1+r1+s1 is not 0. More specifically, preferable examples include:

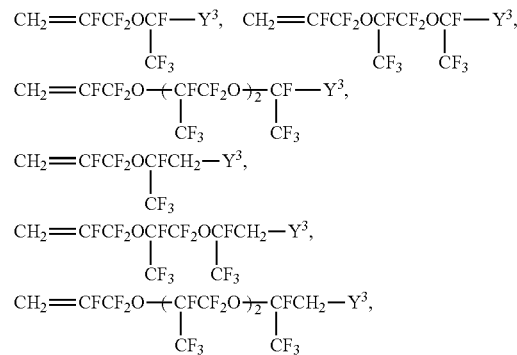

$CH_2=CFCF_2OCH_2CF_2$—$Y^3$, $CH_2=CFCF_2O$ $(CH_2CF_2CF_2O)CH_2CF_2$—$Y^3$,
$CH_2=CFCF_2OCH_2CF_2CH_2$—$Y^3$,
$CH_2=CFCF_2O(CH_2CF_2CF_2O)CH_2CF_2CH_2$—$Y^3$,
$CH_2=CFCF_2OCF_2CF_2$—$Y^3$, $CH_2=CFCF_2O$ $(CF_2CF_2CF_2O)CF_2CF_2Y^3$,
$CH_2=CFCF_2OCF_2CF_2CH_2$—$Y^3$,
$CH_2=CFCF_2O(CF_2CF_2CF_2O)CF_2CF_2CH_2$—$Y^3$,
$CH_2=CFCF_2OCF_2$—$Y^3$, $CH_2=CFCF_2O(CF_2CF_2O)$ $CF_2$—$Y^3$,
$CH_2=CFCF_2OCF_2CH_2$—$Y^3$,
$CH_2=CFCF_2O(CF_2CF_2O)CF_2CH_2$—$Y^3$,
Of these,

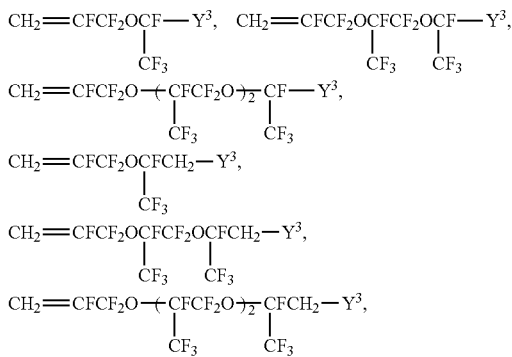

are preferable.

In the compound represented by the general formula (5a), $Y^3$ in the formula (5a) is preferably —COOM, and, specifically, the compound is preferably at least one selected from the group consisting of $CH_2=CFCF_2OCF(CF_3)COOM$ and $CH_2=CFCF_2OCF(CF_3)CF_2OCF(CF_3)COOM$ (wherein M is as defined above), and more preferably $CH_2=CFCF_2OCF(CF_3)COOM$.

The compound represented by the general formula (5) is preferably a compound (5b) represented by the general formula (5b):

$$CX^2{}_2=CFCF_2-O-(CF(CF_3)CF_2O)_{n5}-CF(CF_3)-Y^3 \qquad (5b)$$

wherein each $X^2$ is the same and represents F or H; n5 represents 0 or an integer of 1 to 10; and $Y^3$ is as defined above.

In the general formula (5b), n5 is preferably an integer of 0 or 1 to 5, more preferably 0, 1, or 2, and still more preferably 0 or 1 from the viewpoint of stability of the resulting aqueous dispersion. $Y^3$ is preferably —COOM from the viewpoint of obtaining appropriate water-solubility and stability of the aqueous dispersion, and M is preferably H or $NH_4$ from the viewpoint of being less likely to remain as impurities and improving the heat resistance of the resulting molded body.

Examples of the compound represented by the general formula (5b) include $CH_2=CFCF_2OCF(CF_3)COOM$ and $CH_2=CFCF_2OCF(CF_3)CF_2OCF(CF_3)COOM$, wherein M is as defined above.

Examples of the compound represented by the general formula (5) further include compounds represented by the general formula (5c):

$$CF_2=CFCF_2-O-Rf-Y^3 \qquad (5c)$$

wherein Rf and $Y^3$ are as described above.

More specific examples include:

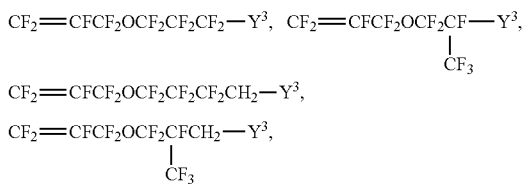

and the like.

In the general formula (6), each X is —H or —F. X may be both —F, or at least one may be —H. For example, one may be —F and the other may be —H, or both may be —H.

In the general formula (6), Y is —H, —F, an alkyl group, or a fluorine-containing alkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Y is preferably —H, —F, or —$CF_3$, and more preferably —F.

In the general formula (6), at least one of X and Y preferably contains a fluorine atom. For example, X may be —H, and Y and Z may be —F.

In the general formula (6), Rf is a fluorine-containing alkylene group having 1 to 40 carbon atoms or a fluorine-containing alkylene group having 2 to 100 carbon atoms and having an ether bond.

The fluorine-containing alkylene group preferably has 2 or more carbon atoms. Further, the fluorine-containing alkylene group preferably has 30 or less carbon atoms, more preferably 20 or less carbon atoms, and still more preferably 10 or less carbon atoms. Examples of the fluorine-containing alkylene group include —$CF_2$—, —$CH_2CF_2$—, —$CF_2CF_2$—, —$CF_2CH_2$—, —$CF_2CF_2CH_2$—, —$CF(CF_3)$—, —$CF(CF_3)CF_2$—, and —$CF(CF_3)CH_2$—. The fluorine-containing alkylene group is preferably a perfluoroalkylene group.

In the general formula (6), $Y^3$ is preferably —COOM, —$SO_3M$, or —$OSO_3M$, wherein M is H, a metal atom, $NR^{7y}{}_4$, imidazolium optionally having a substituent, pyridinium optionally having a substituent, or phosphonium optionally having a substituent, wherein $R^{7y}$ is H or an organic group, and may be the same or different, and any two may be bonded to each other to form a ring.

The alkyl group is preferable as the organic group of $R^{7y}$. $R^{7y}$ is preferably H or a $C_{1-10}$ organic group, more preferably H or a $C_{1-4}$ organic group, and still more preferably H or a $C_{1-4}$ alkyl group.

Examples of the metal atom include alkali metals (Group 1) and alkaline earth metals (Group 2), and preferable is Na, K, or Li.

M is preferably —H, a metal atom, or $NR^7{}_4$, more preferably —H, an alkali metal (Group 1), an alkaline earth metal (Group 2), or $NR^7{}_4$, still more preferably —H, —Na, —K, —Li, or $NH_4$, further preferably —H, —Na, —K, or $NH_4$, particularly preferably —H, —Na, or $NH_4$, and most preferably —H or —$NH_4$.

$Y^3$ is preferably —COOM or —$SO_3M$, and more preferably —COOM.

The compound represented by the general formula (6) is preferably at least one selected from the group consisting of compounds represented by the general formulas (6a), (6b), (6c), (6d), and (6e):

wherein n1 represents an integer of 1 to 10, and $Y^3$ is as defined above;

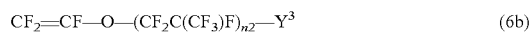

wherein n2 represents an integer of 1 to 5, and $Y^3$ is as defined above;

$$CF_2=CF-O-(CFX^1)_{n3}-Y^3 \quad (6c)$$

wherein $X^1$ represents F or $CF_3$, n3 represents an integer of 1 to 10, and $Y^3$ is as defined above;

$$CF_2=CF-O-(CF_2CFX^1O)_{n4}-(CF_2)_{n6}-Y^3 \quad (6d)$$

wherein n4 represents an integer of 1 to 10, n6 represents an integer of 1 to 3, and $Y^3$ and $X^1$ are as defined above; and $$CF_2=CF-O-(CF_2CF_2CFX^1O)_{n5}-CF_2CF_2CF_2-Y^3 \quad (6e)$$

wherein n5 represents an integer of 0 to 10, and $Y^3$ and $X^1$ are the same as those defined above.

In the formula (6a), n1 is preferably an integer of 5 or less, and more preferably an integer of 2 or less. $Y^3$ is preferably —COOM from the viewpoint of obtaining appropriate water-solubility and stability of the aqueous dispersion, and M is preferably H or $NH_4$ from the viewpoint of being less likely to remain as impurities and improving the heat resistance of the resulting molded body.

Examples of the compound represented by the general formula (6a) include $CF_2=CF-O-CF_2COOM$, $CF_2=CF(OCF_2CF_2COOM)$, and $CF_2=CF(OCF_2CF_2CF_2COOM)$, wherein M is the same as those defined above.

In the formula (6b), n2 is preferably an integer of 3 or less from the viewpoint of stability of the resulting aqueous dispersion, $Y^3$ is preferably —COOM from the viewpoint of obtaining appropriate water-solubility and stability of the aqueous dispersion, and M is preferably H or $NH_4$ from the viewpoint of being less likely to remain as impurities and improving the heat resistance of the resulting molded body.

In the formula (6c), n3 is preferably an integer of 5 or less from the viewpoint of water-solubility, $Y^3$ is preferably —COOM from the viewpoint of obtaining appropriate water-solubility and stability of the aqueous dispersion, and M is preferably H or $NH_4$ from the viewpoint of improving dispersion stability.

In the formula (6d), $X^1$ is preferably —$CF_3$ from the viewpoint of stability of the aqueous dispersion, n4 is preferably an integer of 5 or less from the viewpoint of water-solubility, $Y^3$ is preferably —COOM from the viewpoint of obtaining appropriate water-solubility and stability of the aqueous dispersion, and M is preferably H or $NH_4$.

Examples of the compound represented by the formula (6d) include $CF_2=CFOCF_2CF(CF_3)OCF_2CF_2COOM$, $CF_2=CFOCF_2CF(CF_3)OCF_2COOM$, and $CF_2=CFOCF_2CF(CF_3)OCF_2CF_2CF_2COOM$, wherein M represents H, $NH_4$, or an alkali metal.

In the general formula (6e), n5 is preferably an integer of 5 or less in terms of water solubility, $Y^3$ is preferably —COOM in terms of obtaining moderate water solubility and stability of the aqueous dispersion, and M is preferably H or $NH_4$.

Examples of the compound represented by the general formula (6e) include $CF_2=CFOCF_2CF_2CF_2COOM$ wherein M represents H, $NH_4$, or an alkali metal.

In the general formula (7), Rf is preferably a fluorine-containing alkylene group having 1 to 40 carbon atoms. In the general formula (7), at least one of X and Y preferably contains a fluorine atom.

The compound represented by the general formula (7) is preferably at least one selected from the group consisting of:

a compound represented by the general formula (7a):

$$CF_2=CF-(CF_2)_{n1}-Y^3 \quad (7a)$$

wherein n1 represents an integer of 1 to 10, and $Y^3$ is as defined above; and a compound represented by the general formula (7b):

$$CF_2=CF-(CF_2C(CF_3)F)_{n2}-Y^3 \quad (7b)$$

wherein n2 represents an integer of 1 to 5, and $Y^3$ is as defined above.

$Y^3$ is preferably —$SO_3M$ or —COOM, and M is preferably H, a metal atom, $NR^{7y}_4$, imidazolium optionally having a substituent, pyridinium optionally having a substituent, or phosphonium optionally having a substituent. $R^{7y}$ represents H or an organic group.

In the general formula (7a), n1 is preferably an integer of 5 or less, and more preferably an integer of 2 or less. $Y^3$ is preferably —COOM from the viewpoint of obtaining appropriate water-solubility and stability of the aqueous dispersion, and M is preferably H or $NH_4$ from the viewpoint of being less likely to remain as impurities and improving the heat resistance of the resulting molded body.

Examples of the compound represented by the formula (7a) include $CF_2=CFCF_2COOM$ wherein M is as defined above.

In the formula (7b), n2 is preferably an integer of 3 or less from the viewpoint of stability of the resulting aqueous dispersion, $Y^3$ is preferably —COOM from the viewpoint of obtaining appropriate water-solubility and stability of the aqueous dispersion, and M is preferably H or $NH_4$ from the viewpoint of being less likely to remain as impurities and improving the heat resistance of the resulting molded body.

The modifying monomer preferably contains the modifying monomer (A), and preferably contains at least one selected from the group consisting of compounds represented by the general formulas (5a), (5c), (6a), (6b), (6c), and (6d), and more preferably contains a compound represented by the general formula (5a) or (5c).

When the modifying monomer (A) is used as the modifying monomer, the content of the modifying monomer (A) unit is preferably in the range of 0.00001 to 1.0% by mass based on all polymerization units of PTFE. The lower limit is more preferably 0.0001% by mass, more preferably 0.0005% by mass, still more preferably 0.001% by mass, and further preferably 0.005% by mass. The upper limit is, in order of preference, 0.90% by mass, 0.50% by mass, 0.40% by mass, 0.30% by mass, 0.20% by mass, 0.15% by mass, 0.10% by mass, 0.08% by mass, 0.05% by mass, and 0.01% by mass.

<Aqueous Medium>

The aqueous medium means a liquid containing water. The aqueous medium may be any medium containing water, and it may be a medium containing water and, for example, any of fluorine-free organic solvents such as alcohols, ethers, and ketones, and/or fluorine-containing organic solvents having a boiling point of 40° C. or lower.

<Polymerization Initiator>

The polymerization initiator may be any polymerization initiator capable of generating radicals within the polymerization temperature range, and known oil-soluble and/or water-soluble polymerization initiators may be used. The polymerization initiator can be combined with a reducing agent or the like to form a redox agent and initiate the polymerization. The concentration of the polymerization initiator is suitably determined according to the type of monomer, the molecular weight of the target PTFE, and the reaction rate.

The polymerization initiator to be used may be an oil-soluble radical polymerization initiator or a water-soluble radical polymerization initiator.

The oil-soluble radical polymerization initiator may be a known oil-soluble peroxide, and representative examples include dialkyl peroxycarbonates such as diisopropyl peroxydicarbonate and di-sec-butyl peroxydicarbonate; peroxy esters such as t-butyl peroxyisobutyrate and t-butyl peroxypivalate; and dialkyl peroxides such as di-t-butyl peroxide, as well as di[perfluoro (or fluorochloro) acyl] peroxides such as di(ω-hydro-dodecafluorohexanoyl)peroxide, di(ω-hydro-tetradecafluoroheptanoyl)peroxide, di(ω-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(ω-chloro-hexafluorobutyryl)peroxide, di(ω-chloro-decafluorohexanoyl)peroxide, di(ω-chloro-tetradecafluorooctanoyl)peroxide, ω-hydro-dodecafluoroheptanoyl-ω-hydrohexadecafluorononanoyl-peroxide, ω-chloro-hexafluorobutyryl-ω-chloro-decafluorohexanoyl-peroxide, ω-hydrododecafluoroheptanoyl-perfluorobutyryl-peroxide, di(dichloropentafluorobutanoyl)peroxide, di(trichlorooctafluorohexanoyl)peroxide, di(tetrachloroundecafluorooctanoyl)peroxide, di(pentachlorotetradecafluorodecanoyl)peroxide, and di(undecachlorodotoriacontafluorodocosanoyl)peroxide.

The water-soluble radical polymerization initiator may be a known water-soluble peroxide, and examples include ammonium salts, potassium salts, and sodium salts of persulphuric acid, perboric acid, perchloric acid, perphosphoric acid, and percarbonic acid, organic peroxides of disuccinic acid peroxide and diglutaric acid peroxide, t-butyl permaleate, and t-butyl hydroperoxide. A reducing agent such as a sulfite or a sulfurous acid salt may be also contained, and the amount thereof may be 0.1 to 20 times the amount of peroxide.

For example, when performing the polymerization at a low temperature of 30° C. or lower, the polymerization initiator used is preferably a redox initiator obtained by combining an oxidizing agent and a reducing agent. Examples of the oxidizing agent include persulfate, organic peroxide, potassium permanganate, manganese triacetate, ammonium cerium nitrate, and bromate. Examples of the reducing agent include sulfite, bisulfite, bromate, diimine, and oxalic acid. Examples of persulfate include ammonium persulfate and potassium persulfate. Examples of sulfite include sodium sulfite and ammonium sulfite. In order to increase the decomposition rate of the initiator, the combination of the redox initiator preferably contains a copper salt or an iron salt. An example of the copper salt is copper(II) sulfate and an example of the iron salt is iron(II) sulfate.

Examples of the redox initiator include potassium permanganate/oxalic acid, ammonium persulfate/bisulfite/iron (II) sulfate, ammonium persulfate/sulfite/iron(II) sulfate, ammonium persulfate/sulfite, ammonium persulfate/iron(II) sulfate, manganese triacetate/oxalic acid, ammonium cerium nitrate/oxalic acid, bromate/sulfite, and bromate/bisulfite, and potassium permanganate/oxalic acid and ammonium persulfate/sulfite/iron(II) sulfate are preferable. When using a redox initiator, the polymerization may be initiated by charging a reaction vessel with either an oxidizing agent or a reducing agent in advance and then continuously or intermittently adding the other. For example, when using potassium permanganate/oxalic acid, preferably, a reaction vessel is charged with oxalic acid, and potassium permanganate is continuously added thereto.

The amount of the polymerization initiator added is not limited, and the polymerization initiator is added in an amount that does not significantly decrease the polymerization rate (e.g., a concentration of several ppm in water) or more at once in the initial stage of polymerization, or added successively or continuously. The upper limit is within a range where the reaction temperature is allowed to increase while the polymerization reaction heat is removed through the device surface, and the upper limit is more preferably within a range where the polymerization reaction heat can be removed through the device surface.

<Additive>

In the production method of the present disclosure, in addition to the polymer (I) and the optionally used further compound having surfactant function, an additive may be used to stabilize the compounds. Examples of the additive include a buffer, a pH adjuster, a stabilizing aid, and a dispersion stabilizer.

The stabilizing aid is preferably paraffin wax, fluorine-containing oil, a fluorine-containing solvent, silicone oil, or the like. The stabilizing aid may be used alone or in combination of two or more. The stabilizing aid is more preferably paraffin wax. Paraffin wax may be in the form of a liquid, semi-solid, or solid at room temperature, and is preferably a saturated hydrocarbon having 12 or more carbon atoms. Paraffin wax usually preferably has a melting point of 40 to 65° C., and more preferably 50 to 65° C.

The amount of the stabilizing aid used is preferably 0.1 to 12% by mass, and more preferably 0.1 to 8% by mass, based on the mass of the aqueous medium used. It is desirable that the stabilizing aid be sufficiently hydrophobic and be completely separated from the aqueous dispersion obtained after completion of the polymerization reaction, and does not serve as a contaminating component. Further, the stabilizing aid is preferably removed from the aqueous dispersion obtained by polymerization.

Examples of the pH adjuster include ammonia, sodium hydroxide, potassium hydroxide, sodium carbonate, potassium carbonate, ammonium carbonate, sodium hydrogen carbonate, potassium hydrogen carbonate, ammonium hydrogen carbonate, sodium phosphate, potassium phosphate, sodium citrate, potassium citrate, ammonium citrate, sodium gluconate, potassium gluconate, and ammonium gluconate.

The pH of the aqueous medium when polymerizing TFE is preferably basic. The pH of the aqueous medium may be adjusted by adding a pH adjuster to the aqueous medium. The pH of the aqueous medium when polymerizing TFE is preferably 7.1 or higher, and more preferably 7.5 or higher. By adjusting the pH to be basic, the stability increasing effect on the aqueous dispersion due to the presence of the polymer (I) is further enhanced, and the polymerization of TFE in the aqueous medium proceeds more smoothly. The pH can be measured with a pH meter manufactured by Orion.

<Anionic Hydrocarbon Surfactant>

In one embodiment of the polymerization of TFE, TFE is polymerized in the presence of an anionic hydrocarbon surfactant. By using an anionic hydrocarbon surfactant, the stability of the aqueous dispersion produced by the polymerization is enhanced, and the polymerization of TFE proceeds smoothly.

In another embodiment of the polymerization of TFE, TFE is polymerized substantially in the absence of an anionic hydrocarbon surfactant. In the polymerization of TFE performed in the presence of the polymer (I), the polymerization of TFE proceeds smoothly without using an anionic hydrocarbon surfactant.

The expression "substantially in the absence of an anionic hydrocarbon surfactant" as used herein means that the amount of the anionic hydrocarbon surfactant in the aqueous medium is 10 mass ppm or less, preferably 1 mass ppm or less, more preferably 100 mass ppb or less, still more preferably 10 mass ppb or less, and further preferably 1 mass ppb or less.

The anionic hydrocarbon surfactant usually has a hydrophilic moiety such as a carboxylate, a sulfonate or a sulfate, and a hydrophobic moiety that is a long chain hydrocarbon moiety such as alkyl.

Examples of the anionic hydrocarbon surfactant include Versatic® 10 manufactured by Resolution Performance Products, and Avanel S series (S-70, S-74, etc.) manufactured by BASF.

Examples of the anionic hydrocarbon surfactant include an anionic surfactant represented by R-L-M, wherein R is a linear or branched alkyl group having one or more carbon atoms and optionally having a substituent, or a cyclic alkyl group having 3 or more carbon atoms and optionally having a substituent, and optionally contains a monovalent or divalent heterocycle or optionally forms a ring when having 3 or more carbon atoms; L is —$ArSO_3^-$, —$SO_3^-$, —$SO_4$—, —$PO_3^-$, or $COO^-$; and M is H, a metal atom, $NR^5_4$, imidazolium optionally having a substituent, pyridinium optionally having a substituent, or phosphonium optionally having a substituent, wherein $R^5$ is H or an organic group, and —$ArSO_3^-$ is an aryl sulfonate.

Specific examples include compounds represented by $CH_3$—$(CH_2)_n$-L-M, wherein n is an integer of 6 to 17, as represented by lauryl acid and lauryl sulfate, and L and M are as described above. Mixtures of those in which R is an alkyl group having 12 to 16 carbon atoms and L-M is sulfate or sodium dodecyl sulfate (SDS) can also be used.

Further, examples of the anionic hydrocarbon surfactant include an anionic surfactant represented by $R^6$(-L-M)$_2$, wherein $R^6$ is a linear or branched alkylene group having one or more carbon atoms and optionally having a substituent, or a cyclic alkylene group having 3 or more carbon atoms and optionally having a substituent, and optionally contains a monovalent or divalent heterocycle or optionally forms a ring when having 3 or more carbon atoms; L is —$ArSO_3^-$, —$SO_3^-$, —$SO_4$—, —$PO_3^-$, or $COO^-$; and M is H, a metal atom, $NR^5_4$, imidazolium optionally having a substituent, pyridinium optionally having a substituent, or phosphonium optionally having a substituent, wherein $R^5$ is H or an organic group, and —$ArSO_3^-$ is an aryl sulfonate.

Further, examples of the anionic hydrocarbon surfactant include an anionic surfactant represented by $R^7$(-L-M)$_3$, wherein $R^7$ is a linear or branched alkylidine group having one or more carbon atoms and optionally having a substituent, or a cyclic alkylidine group having 3 or more carbon atoms and optionally having a substituent, and optionally contains a monovalent or divalent heterocycle or optionally forms a ring when having 3 or more carbon atoms; L is —$ArSO_3^-$, —$SO_3^-$, —$SO_4$—, —$PO_3^-$, or $COO^-$; and M is H, a metal atom, $NR^5_4$, imidazolium optionally having a substituent, pyridinium optionally having a substituent, or phosphonium optionally having a substituent, wherein $R^5$ is H or an organic group, and —$ArSO_3^-$ is an aryl sulfonate.

Further, examples of the anionic hydrocarbon surfactant include a siloxane hydrocarbon surfactant. Examples of the siloxane hydrocarbon surfactant include those described in Silicone Surfactants, R. M. Hill, Marcel Dekker, Inc., ISBN: 0-8247-00104. The structure of the siloxane hydrocarbon surfactant includes distinct hydrophobic and hydrophilic moieties. The hydrophobic moiety contains one or more dihydrocarbyl siloxane units, wherein the substituents on the silicone atoms are completely hydrocarbon. In the sense that the carbon atoms of the hydrocarbyl groups are fully substituted with hydrogen atoms where they can be substituted with halogen such as fluorine, these siloxane surfactants can also be regarded as hydrocarbon surfactants, i.e. the monovalent substituents on the carbon atoms of the hydrocarbyl groups are hydrogen.

The hydrophilic moiety of the siloxane hydrocarbon surfactant may contain one or more polar moieties including ionic groups such as sulfate, sulfonate, phosphonate, phosphate ester, carboxylate, carbonate, sulfosuccinate, taurate (as a free acid, a salt or an ester), phosphine oxide, betaine, betaine copolyol, or quaternary ammonium salts. Ionic hydrophobic moieties may also contain ionically functionalized siloxane grafts. Examples of such siloxane hydrocarbon surfactants include polydimethylsiloxane-graft-(meth) acrylic acid salts, polydimethylsiloxane-graft-polyacrylate salts, and polydimethylsiloxane-grafted quaternary amines. The polar moieties of the hydrophilic moiety of the siloxane hydrocarbon surfactant may contain nonionic groups formed by polyethers, such as polyethylene oxide (PEO), and mixed polyethylene oxide/polypropylene oxide polyethers (PEO/PPO); mono- and disaccharides; and water-soluble heterocycles such as pyrrolidinone. The ratio of ethylene oxide to propylene oxide (EO/PO) may be varied in mixed polyethylene oxide/propylene oxide polyethers.

The hydrophilic moiety of the siloxane hydrocarbon surfactant may also contain a combination of ionic and non-ionic moieties. Such moieties include, for example, ionically end-functionalized or randomly functionalized polyether or polyol. Preferable is siloxane having a nonionic moiety, i.e., a nonionic siloxane surfactant.

The arrangement of the hydrophobic and hydrophilic moieties of the structure of a siloxane hydrocarbon surfactant may take the form of a diblock polymer (AB), a triblock polymer (ABA), wherein the "B" represents the siloxane portion of the molecule, or a multi-block polymer. Alternatively, the siloxane surfactant may include a graft polymer.

The siloxane hydrocarbon surfactant also includes those disclosed in U.S. Pat. No. 6,841,616.

Examples of the siloxane-based anionic hydrocarbon surfactant include Noveon® by Lubrizol Advanced Materials, Inc. and SilSense™ PE-100 silicone and SilSense™ CA-1 silicone available from Consumer Specialties.

Examples of the anionic hydrocarbon surfactant also include a sulfosuccinate surfactant Lankropol® K8300 by Akzo Nobel Surface Chemistry LLC. Examples of the sulfosuccinate surfactant include sodium diisodecyl sulfosuccinate (Emulsogen® SB10 by Clariant) and sodium diisotridecyl sulfosuccinate (Polirol® TR/LNA by Cesapinia Chemicals).

Examples of the anionic hydrocarbon surfactants also include PolyFox® surfactants by Omnova Solutions, Inc. (PolyFox™ PF-156A, PolyFox™ PF-136A, etc.).

The anionic hydrocarbon surfactant includes a compound (α) represented by the following formula (α):

$$R^{10}\text{—COOM} \quad (\alpha)$$

wherein $R^{10}$ is a monovalent organic group containing one or more carbon atoms; and M is H, a metal atom, $NR^{11}_4$, imidazolium optionally having a substituent, pyridinium optionally having a substituent, or phosphonium optionally having a substituent, wherein $R^{11}$ is H or an organic group and may be the same or different. $R^{11}$ is preferably H or a $C_{1-10}$ organic group, and more preferably H or a $C_{1-4}$ organic group. From the viewpoint of surfactant function, the number of carbon atoms in $R^{10}$ is preferably 2 or more, and more preferably 3 or more. From the viewpoint of water-solubility, the number of carbon atoms in $R^{10}$ is preferably 29 or less, and more preferably 23 or less. Examples of the metal atom as M include alkali metals (Group 1) and alkaline earth metals (Group 2), and preferable is Na, K, or Li. M is preferably H, a metal atom, or $NR^{11}_4$, more preferably H, an alkali metal (Group 1), an alkaline earth metal (Group 2), or $NR^{11}_4$, still more preferably H, Na, K, Li, or $NH_4$, further preferably Na, K, or $NH_4$, particularly preferably Na or $NH_4$, and most preferably $NH_4$.

Examples of the compound (α) include anionic hydrocarbon surfactants represented by $R^{12}$—COOM, wherein $R^{12}$ is a linear or branched alkyl group, alkenyl group, alkylene group, or alkenylene group having 1 or more carbon atoms and optionally having a substituent, or a cyclic alkyl group, alkenyl group, alkylene group, or alkenylene group having 3 or more carbon atoms and optionally having a substituent, each of which optionally contains an ether bond; when having 3 or more carbon atoms, $R^{12}$ optionally contains a monovalent or divalent heterocycle, or optionally forms a ring; and M is as described above. Specific examples include compounds represented by $CH_3$—$(CH_2)_n$—COOM wherein n is an integer of 2 to 28, and M is as described above.

From the viewpoint of emulsion stability, the compound (α) may be a compound that does not contain a carbonyl group which is not in a carboxyl group. Preferable examples of the hydrocarbon-containing surfactant that does not contain a carbonyl group include a compound of the following formula (A): R—COO-M (A) wherein R is an alkyl group, an alkenyl group, an alkylene group, or an alkenylene group containing 6 to 17 carbon atoms, each of which optionally contains an ether bond; M is H, a metal atom, $NR^{11}_4$, imidazolium optionally having a substituent, pyridinium optionally having a substituent, or phosphonium optionally having a substituent; and $R^{11}$ is the same or different and is H or an organic group having 1 to 10 carbon atoms. In the formula (A), R is preferably an alkyl group or an alkenyl group, each of which optionally contains an ether group. The alkyl group or alkenyl group for R may be linear or branched. The number of carbon atoms in R is not limited and is, for example, 2 to 29.

When the alkyl group is linear, the number of carbon atoms in R is preferably 3 to 29, and more preferably 5 to 23. When the alkyl group is branched, the number of carbon atoms in R is preferably 5 to 35, and more preferably 11 to 23. When the alkenyl group is linear, the number of carbon atoms in R is preferably 2 to 29, and more preferably 9 to 23. When the alkenyl group is branched, the number of carbon atoms in R is preferably 2 to 29, and more preferably 9 to 23.

Examples of the alkyl group and the alkenyl group include a methyl group, an ethyl group, an isobutyl group, a t-butyl group, and a vinyl group.

Further, the anionic hydrocarbon surfactant may also be a carboxylic acid-type hydrocarbon surfactant. Examples of the carboxylic acid-type hydrocarbon surfactant include butylic acid, valeric acid, caproic acid, enanthic acid, caprylic acid, pelargonic acid, capric acid, lauric acid, myristic acid, pentadecylic acid, palmitic acid, palmitoleic acid, margaric acid, stearic acid, oleic acid, vaccenic acid, linoleic acid, (9,12,15)-linolenic acid, (6,9,12)linolenic acid, eleostearic acid, arachidic acid, 8,11-eicosadienoic acid, mead acid, arachidonic acid, behenic acid, lignoceric acid, nervonic acid, cerotic acid, montanic acid, melissic acid, crotonic acid, myristoleic acid, palmitoleic acid, sapienoic acid, oleic acid, elaidic acid, vaccenic acid, gadoleic acid, eicosenoic acid, erucic acid, nervonic acid, linoleic acid, eicosadienoic acid, docosadienoic acid, linolenic acid, pinolenic acid, α-eleostearic acid, β-eleostearic acid, mead acid, dihomo-γ-linolenic acid, eicosatrienoic acid, stearidonic acid, arachidonic acid, eicosatetraenoic acid, adrenic acid, boseopentaenoic acid, eicosapentaenoic acid, osbond acid, sardine acid, tetracosapentaenoic acid, docosahexaenoic acid, nisinic acid, and salts thereof. Particularly, preferable is at least one selected from the group consisting of lauric acid, capric acid, myristic acid, pentadecylic acid, palmitic acid, and salts thereof. Examples of the salts include, but are not limited to, those in which hydrogen of the carboxyl group is replaced with a metal atom, $NR^{11}_4$, imidazolium optionally having a substituent, pyridinium optionally having a substituent, or phosphonium optionally having a substituent as M in the formula described above.

Further, the anionic hydrocarbon surfactant may be, for example, an anionic hydrocarbon surfactant disclosed in International Publication No. WO 2013/146950 or International Publication No. WO 2013/146947. Examples include those having a saturated or unsaturated aliphatic chain having 6 to 40 carbon atoms, preferably 8 to 20 carbon atoms, and more preferably 9 to 13 carbon atoms. The saturated or unsaturated aliphatic chain may be either linear or branched, or may have a cyclic structure. The hydrocarbon may have aromaticity, or may have an aromatic group. The hydrocarbon may contain a hetero atom such as oxygen, nitrogen, or sulfur.

Examples of the anionic hydrocarbon surfactant include alkyl sulfonates, alkyl sulfates, and alkyl aryl sulfates, and salts thereof; aliphatic (carboxylic) acids and salts thereof; and phosphoric acid alkyl esters and phosphoric acid alkyl aryl esters, and salts thereof. Of these, preferable are alkyl sulfonates, alkyl sulfates, and aliphatic carboxylic acids, and salts thereof.

Preferable examples of alkyl sulfates or salts thereof include ammonium lauryl sulfate and sodium lauryl sulfate.

Preferable examples of aliphatic carboxylic acids or salts thereof include succinic acid, decanoic acid, undecanoic acid, undecenoic acid, lauric acid, hydrododecanoic acid, or salts thereof.

<Fluorine-Containing Surfactant>

In one embodiment of the polymerization of TFE, TFE is polymerized in the presence of a fluorine-containing surfactant (excluding compounds having a functional group capable of reaction by radical polymerization and a hydrophilic group). By using a fluorine-containing surfactant, the stability of the aqueous dispersion produced by the polymerization is enhanced, and the polymerization of TFE proceeds smoothly.

In another embodiment of the polymerization of TFE, TFE is polymerized substantially in the absence of a fluorine-containing surfactant (excluding compounds having a functional group capable of reaction by radical polymerization and a hydrophilic group). In the polymerization of TFE performed in the presence of the polymer (I), the polymerization of TFE proceeds smoothly without using a fluorine-containing surfactant.

The expression "substantially in the absence of a fluorine-containing surfactant" as used herein means that the amount of the fluorine-containing surfactant in the aqueous medium is 10 mass ppm or less, preferably 1 mass ppm or less, more preferably 100 mass ppb or less, still more preferably 10 mass ppb or less, and further preferably 1 mass ppb or less.

Examples of the fluorine-containing surfactant include anionic fluorine-containing surfactants. The anionic fluorine-containing surfactant may be, for example, a fluorine atom-containing surfactant having 20 or less carbon atoms in total in the portion excluding the anionic group.

Further, the fluorine-containing surfactant may be a fluorine-containing surfactant having an anionic moiety having a molecular weight of 800 or less. The "anionic moiety" means the portion of the fluorine-containing surfactant excluding the cation. For example, in the case of $F(CF_2)_{n1}COOM$ represented by the formula (I) described below, the anionic moiety is the "$F(CF_2)_{n1}COO$" portion.

Examples of the fluorine-containing surfactant include fluorine-containing surfactants having a Log POW of 3.5 or less. The Log POW is a partition coefficient between 1-octanol and water, which is represented by Log P (wherein P is the ratio between the concentration of the fluorine-containing surfactant in octanol and the concentration of the fluorine-containing surfactant in water in a phase-separated octanol/water (1:1) liquid mixture containing the fluorine-containing surfactant). Log POW is determined as follows. Specifically, HPLC is performed on standard substances (heptanoic acid, octanoic acid, nonanoic acid, and decanoic acid) each having a known octanol/water partition coefficient using TOSOH ODS-120T ((φ4.6 mm×250 mm, manufactured by Tosoh Corp.) as a column and acetonitrile/0.6% by mass $HClO_4$ aqueous solution (=1/1 (vol/vol %)) as an eluent at a flow rate of 1.0 ml/min, a sample amount of 300 μL, and a column temperature of 40° C., with a detection light of UV 210 nm. For each standard substance, a calibration curve is drawn with respect to the elution time and the known octanol/water partition coefficient. Based on the calibration curve, Log POW is calculated from the elution time of the sample liquid in HPLC.

Specific examples of the fluorine-containing surfactant include those disclosed in U.S. Patent Application Publication No. 2007/0015864, U.S. Patent Application Publication No. 2007/0015865, U.S. Patent Application Publication No. 2007/0015866, U.S. Patent Application Publication No. 2007/0276103, U.S. Patent Application Publication No. 2007/0117914, U.S. Patent Application Publication No. 2007/142541, U.S. Patent Application Publication No. 2008/0015319, U.S. Pat. Nos. 3,250,808, 3,271,341, Japanese Patent Laid-Open No. 2003-119204, International Publication No. WO 2005/042593, International Publication No. WO 2008/060461, International Publication No. WO 2007/046377, Japanese Patent Laid-Open No. 2007-119526, International Publication No. WO 2007/046482, International Publication No. WO 2007/046345, U.S. Patent Application Publication No. 2014/0228531, International Publication No. WO 2013/189824, and International Publication No. WO 2013/189826.

Examples of the anionic fluorine-containing surfactant include compounds represented by the general formula ($N^0$):

wherein $X^{n0}$ is H, Cl, or F; $Rf^{n0}$ is a linear, branched, or cyclic alkylene group having 3 to 20 carbon atoms in which some or all of Hs are replaced with F; the alkylene group may contain one or more ether bonds, and some Hs may be replaced with Cl; and $Y^0$ is an anionic group.

The anionic group $Y^0$ may be —COOM, —$SO_2$M, or —$SO_3$M, and may be —COOM or —$SO_3$M. M is H, a metal atom, $NR^7_4$, imidazolium optionally having a substituent, pyridinium optionally having a substituent, or phosphonium optionally having a substituent, wherein $R^7$ is H or an organic group. Examples of the metal atom include alkali metals (Group 1) and alkaline earth metals (Group 2), such as Na, K, or Li. $R^7$ may be H or a $C_{1-10}$ organic group, may be H or a $C_{1-4}$ organic group, and may be H or a $C_{1-4}$ alkyl group. M may be H, a metal atom, or $NR^7_4$, may be H, an alkali metal (Group 1), an alkaline earth metal (Group 2), or $NR^7_4$, and may be H, Na, K, Li, or $NH_4$. $Rf^{n0}$ may be one in which 50% or more of H is replaced with fluorine.

Examples of the compound represented by the general formula ($N^0$) include:

a compound represented by the general formula ($N^1$):

wherein $X^{n0}$ is H, Cl, and F, m1 is an integer of 3 to 15, and $Y^0$ is as defined above;

a compound represented by the following general formula ($N^2$):

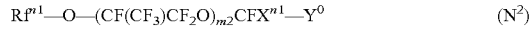

wherein $Rf^{n1}$ is a perfluoroalkyl group having 1 to 5 carbon atoms, m2 is an integer of 0 to 3, $X^{n1}$ is F or $CF_3$, and $Y^0$ is as defined above;

a compound represented by the following general formula ($N^3$):

wherein $Rf^{n2}$ is a partially or fully fluorinated alkyl group having 1 to 13 carbon atoms and optionally containing an ether bond, m3 is an integer of 1 to 3, $Rf^{n3}$ is a linear or branched perfluoroalkylene group having 1 to 3 carbon atoms, q is 0 or 1, and $Y^0$ is as defined above;

a compound represented by the following general formula ($N^4$):

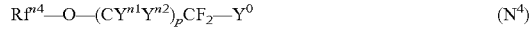

wherein $Rf^{n4}$ is a linear or branched partially or fully fluorinated alkyl group having 1 to 12 carbon atoms and optionally containing an ether bond and/or a chlorine atom, and $Y^{n1}$ and $Y^{n2}$ are the same or different and are each H or F, p is 0 or 1, and $Y^0$ is as defined above; and a compound represented by the general formula ($N^5$):

wherein $X^{n2}$, $X^{n3}$, and $X^{n4}$ may be the same or different and are each H, F, or a linear or branched partial or fully fluorinated alkyl group having 1 to 6 carbon atoms and optionally containing an ether bond, $Rf^{n5}$ is a linear or branched partially or fully fluorinated alkylene group having 1 to 3 carbon atoms and optionally containing an ether bond, L is a linking group, and $Y^0$ is as defined above, provided that the total number of carbon atoms of $X^{n2}$, $X^{n3}$, $X^{n4}$, and $Rf^{n5}$ is 18 or less.

Examples of the compound represented by the general formula ($N^0$) include a perfluorocarboxylic acid (I) represented by the general formula (I), an ω-H perfluorocarboxylic acid (II) represented by the general formula (II), a perfluoropolyethercarboxylic acid (III) represented by the general formula (III), a perfluoroalkylalkylenecarboxylic acid (IV) represented by the general formula (IV), a perfluoroalkoxyfluorocarboxylic acid (V) represented by the general formula (V), a perfluoroalkylsulfonic acid (VI) represented by the general formula (VI), an ω-H perfluorosulfonic acid (VII) represented by the general formula (VII), a perfluoroalkylalkylene sulfonic acid (VIII) represented by the general formula (VIII), an alkylalkylene carboxylic acid (IX) represented by the general formula (IX), a fluorocarboxylic acid (X) represented by the general formula (X), an alkoxyfluorosulfonic acid (XI) represented by the general formula (XI), a compound (XII) represented by the general formula (XII), and a compound (XIII) represented by the following general formula (XIII).

The perfluorocarboxylic acid (I) is represented by the general formula (I):

$$F(CF_2)_{n1}COOM \quad (I)$$

wherein n1 is an integer of 3 to 14; and M is H, a metal atom, $NR^7{}_4$, imidazolium optionally having a substituent, pyridinium optionally having a substituent, or phosphonium optionally having a substituent, and $R^7$ is H or an organic group.

The ω-H perfluorocarboxylic acid (II) is represented by the general formula (II):

$$H(CF_2)_{n2}COOM \quad (II)$$

wherein n2 is an integer of 4 to 15; and M is as defined above.

The perfluoropolyethercarboxylic acid (III) is represented by the general formula (III):

$$Rf^1-O-(CF(CF_3)CF_2O)_{n3}CF(CF_3)COOM \quad (III)$$

wherein $Rf^1$ is a perfluoroalkyl group having 1 to 5 carbon atoms; n3 is an integer of 0 to 3; and M is as defined above.

The perfluoroalkylalkylenecarboxylic acid (IV) is represented by the general formula (IV):

$$Rf^2(CH_2)_{n4}Rf^3COOM \quad (IV)$$

wherein $Rf^2$ is a perfluoroalkyl group having 1 to 5 carbon atoms; $Rf^3$ is a linear or branched perfluoroalkylene group having 1 to 3 carbon atoms; n4 is an integer of 1 to 3; and M is as defined above.

The alkoxyfluorocarboxylic acid (V) is represented by the general formula (V):

$$Rf^4-O-CY^1Y^2CF_2-COOM \quad (V)$$

wherein $Rf^4$ is a linear or branched partially or fully fluorinated alkyl group having 1 to 12 carbon atoms and optionally containing an ether bond and/or a chlorine atom; $Y^1$ and $Y^2$ are the same or different and are each H or F; and M is as defined above.

The perfluoroalkylsulfonic acid (VI) is represented by the general formula (VI):

$$F(CF_2)_{n5}SO_3M \quad (VI)$$

wherein n5 is an integer of 3 to 14; and M is as defined above.

The ω-H perfluorosulfonic acid (VII) is represented by the general formula (VII):

$$H(CF_2)_{n6}SO_3M \quad (VII)$$

wherein n6 is an integer of 4 to 14; and M is as defined above.

The perfluoroalkylalkylenesulfonic acid (VIII) is represented by the general formula (VIII):

$$Rf^5(CH_2)_{n7}SO_3M \quad (VIII)$$

wherein $Rf^5$ is a perfluoroalkyl group having 1 to 13 carbon atoms; n7 is an integer of 1 to 3; and M is as defined above.

The alkylalkylenecarboxylic acid (IX) is represented by the general formula (IX):

$$Rf^6(CH_2)_{n8}COOM \quad (IX)$$

wherein $Rf^6$ is a linear or branched partially or fully fluorinated alkyl group having 1 to 13 carbon atoms and optionally containing an ether bond; n8 is an integer of 1 to 3; and M is as defined above.

The fluorocarboxylic acid (X) is represented by the general formula (X):

$$Rf^7-O-Rf^8-O-CF_2-COOM \quad (X)$$

wherein $Rf^7$ is a linear or branched partially or fully fluorinated alkyl group having 1 to 6 carbon atoms and optionally containing an ether bond and/or a chlorine atom; $Rf^8$ is a linear or branched partially or fully fluorinated alkyl group having 1 to 6 carbon atoms; and M is as defined above.

The alkoxyfluorosulfonic acid (XI) is represented by the general formula (XI):

$$Rf^9-O-CY^1Y^2CF_2-SO_3M \quad (XI)$$

wherein $Rf^9$ is a linear or branched partially or fully fluorinated alkyl group having 1 to 12 carbon atoms and optionally containing an ether bond and optionally containing chlorine; $Y^1$ and $Y^2$ are the same or different and are each H or F; and M is as defined above.

The compound (XII) is represented by the general formula (XII):

wherein $X^1$, $X^2$, and $X^3$ may be the same or different and are H, F, or a linear or branched partially or fully fluorinated alkyl group having 1 to 6 carbon atoms and optionally containing an ether bond; $Rf^{10}$ is a perfluoroalkylene group having 1 to 3 carbon atoms; L is a linking group; and $Y^0$ is an anionic group. $Y^0$ may be —COOM, —SO$_2$M, or —SO$_3$M, and may be —SO$_3$M or COOM, wherein M is as defined above. Examples of L include a single bond, and a partially or fully fluorinated alkylene group having 1 to 10 carbon atoms and optionally containing an ether bond.

The compound (XIII) is represented by the following general formula (XIII):

$$Rf^{11}-O-(CF_2CF(CF_3)O)_{n9}(CF_2O)_{n10}CF_2COOM \quad (XIII)$$

wherein $Rf^{11}$ is a fluoroalkyl group having 1 to 5 carbon atoms containing chlorine, n9 is an integer of 0 to 3, n10 is an integer of 0 to 3, and M is the same as those defined above. Examples of the compound (XIII) include CF$_2$ClO(CF$_2$CF(CF$_3$)O)$_{n9}$(CF$_2$O)$_{n10}$CF$_2$COONH$_4$ (a mixture having an average molecular weight of 750, n9 and n10 in the formula are defined above).

Thus, examples of the anionic fluorine-containing surfactant include a carboxylic acid-based surfactant and a sulfonic acid-based surfactant.

The fluorine-containing surfactant may be one fluorine-containing surfactant, or may be a mixture containing two or more fluorine-containing surfactants.

Examples of the fluorine-containing surfactant include compounds represented by the following formulas. The fluorine-containing surfactant may be a mixture of these compounds. In one embodiment of the polymerization, a fluoromonomer is polymerized substantially in the absence of compounds represented by the following formulas:

F(CF$_2$)$_7$COOM,

F(CF$_2$)$_5$COOM,

H(CF$_2$)$_6$COOM,

CF$_3$O(CF$_2$)$_3$OCHFCF$_2$COOM,

C$_3$F$_7$OCF(CF$_3$)CF$_2$OCF(CF$_3$)COOM,

CF$_3$CF$_2$CF$_2$OCF(CF$_3$)COOM,

CF$_3$CF$_2$OCF$_2$CF$_2$OCF$_2$COOM,

C$_2$F$_5$OCF(CF$_3$)CF$_2$OCF(CF$_3$)COOM,

CF$_3$OCF(CF$_3$)CF$_2$OCF(CF$_3$)COOM,

CF$_2$ClCF$_2$CF$_2$OCF(CF$_3$)CF$_2$OCF$_2$COOM,

CF$_2$ClCF$_2$CF$_2$OCF$_2$CF(CF$_3$)OCF$_2$COOM,

CF$_2$ClCF(CF$_3$)OCF(CF$_3$)CF$_2$OCF$_2$COOM, and

CF$_2$ClCF(CF$_3$)OCF$_2$CF(CF$_3$)OCF$_2$COOM,

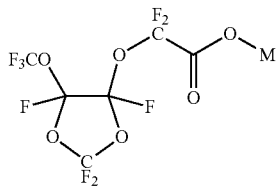

wherein M is H, a metal atom, NR$^7$$_4$, imidazolium optionally having a substituent, pyridinium optionally having a substituent, or phosphonium optionally having a substituent, and R$^7$ represents H or an organic group.

<Polymerization Terminator and Decomposer>

After the polymerization of TFE has sufficiently progressed, the polymerization of TFE may be terminated by adding a polymerization terminator (a radical scavenger) to obtain an aqueous dispersion.

The polymerization terminator may be a compound having no reinitiation ability after addition or chain transfer to a free radical in the polymerization system. Specifically, used is a compound that readily undergoes a chain transfer reaction with a primary radical or a propagating radical and then generates a stable radical that does not react with a monomer or a compound that readily undergoes an addition reaction with a primary radical or a propagating radical to generate a stable radical. The activity of what is commonly referred to as a chain transfer agent is characterized by the chain transfer constant and the reinitiation efficiency, and, among the chain transfer agents, those having almost 0% reinitiation efficiency are called polymerization terminators. The polymerization terminator is preferably at least one selected from the group consisting of aromatic hydroxy compounds, aromatic amines, N,N-diethylhydroxylamine, quinone compounds, terpenes, thiocyanates, and cupric chloride (CuCl$_2$). Examples of the aromatic hydroxy compound include unsubstituted phenols, polyhydric phenols, salicylic acid, m- or p-salicylic acid, gallic acid, and naphthol. Examples of the unsubstituted phenol include o-, m-, or p-nitrophenol, o-, m-, or p-aminophenol, and p-nitrosophenol. Examples of the polyhydric phenol include catechol, resorcin, hydroquinone, pyrogallol, phloroglucin, and naphthoresorcinol. Examples of the aromatic amines include o-, m-, or p-phenylenediamine and benzidine. Examples of the quinone compound include hydroquinone, o-, m- or p-benzoquinone, 1,4-naphthoquinone, and alizarin. Examples of the thiocyanate include ammonium thiocyanate (NH$_4$SCN), potassium thiocyanate (KSCN), and sodium thiocyanate (NaSCN). In particular, the polymerization terminator is preferably a quinone compound, and more preferably hydroquinone.

From the viewpoint of reducing the standard specific gravity, the polymerization terminator is preferably added before 90% by mass of all TFE consumed in the polymerization reaction is polymerized. More preferably, the polymerization terminator is added before 85% by mass, and still more preferably 80% by mass, of all TFE consumed in the polymerization reaction is polymerized. Further, the polymerization terminator is preferably added after 5% by mass of all TFE consumed in the polymerization reaction is polymerized, and more preferably after 10% by mass is polymerized. The amount of the polymerization terminator added is preferably an amount corresponding to 0.1 to 20 mass ppm and more preferably an amount corresponding to 3 to 10 mass ppm of the mass of the aqueous medium used.

By adding the decomposer when polymerizing TFE, the concentration of a radical during polymerization can be adjusted. Examples of the decomposer include sulfite, bisulfite, bromate, diimine, oxalic acid, copper salts, and iron salts. Examples of sulfite include sodium sulfite and ammonium sulfite. The copper salt may be copper(II) sulfate, and the iron salt may be iron (II) sulfate. The amount of the decomposer added is in the range of 25 to 300% by mass based on the amount of the oxidizing agent combined as a polymerization initiator (a redox initiator). The amount of the decomposer added is preferably 25 to 150% by mass, and more preferably 50 to 100% by mass. Further, the decomposer is preferably added after 5% by mass of all TFE consumed in the polymerization reaction is polymerized, and more preferably after 10% by mass is polymerized. The amount of the decomposer added is preferably an amount corresponding to 0.1 to 20 mass ppm and more preferably an amount corresponding to 3 to 10 mass ppm of the mass of the aqueous medium used.

<Polytetrafluoroethylene>

Polytetrafluoroethylene (PTFE) is obtained by the production method of the present disclosure. PTFE obtained by polymerizing TFE in an aqueous medium is usually in the form of primary particles dispersed in an aqueous dispersion.

PTFE is usually stretchable, fibrillatable, and non-molten secondary processible. Being non-molten secondary processible means a property that the melt flow rate cannot be measured at a temperature higher than the crystal melting point, or that is to say, a property that does not easily flow even in the melting temperature region, in accordance with ASTM D 1238 and D 2116.

PTFE obtained by the production method of the present disclosure may be a tetrafluoroethylene (TFE) homopolymer solely containing a TFE unit or modified PTFE containing a TFE unit and a modifying monomer unit.

Concerning the modified PTFE, the content of a polymerization unit that is based on a modifying monomer (hereinafter also referred to as a "modifying monomer unit") is preferably in the range of 0.00001 to 1% by mass based on all polymerization units of PTFE. The lower limit of the content of the modifying monomer unit is more preferably 0.0001% by mass, still more preferably 0.001% by mass, and further preferably 0.005% by mass. The upper limit of the content of the modifying monomer unit is, in order of preference, 0.80% by mass, 0.70% by mass, 0.50% by mass, 0.30% by mass, 0.20% by mass, 0.15% by mass, 0.10% by mass, and 0.05% by mass. The modifying monomer unit as used herein means a portion that is a part of the molecular structure of PTFE and is derived from the modifying monomer.

In the present disclosure, the contents of the respective monomer units constituting PTFE can be calculated by a suitable combination of NMR, FT-IR, elemental analysis, and X-ray fluorescence analysis according to the type of monomer. Further, the contents of the respective monomer units constituting PTFE can also be obtained by calculation from the amount of the modifying monomer used in the polymerization.

When the modifying monomer contains the modifying monomer (A), the content of the polymerization unit that is based on the modifying monomer (A) is preferably in the range of 0.00001 to 1.0% by mass based on all polymerization units of PTFE. The lower limit is more preferably 0.0001% by mass, more preferably 0.0005% by mass, still more preferably 0.001% by mass, and further preferably 0.005% by mass. The upper limit is, in order of preference, 0.90% by mass, 0.50% by mass, 0.40% by mass, 0.30% by mass, 0.20% by mass, 0.15% by mass, 0.10% by mass, 0.08% by mass, 0.05% by mass, and 0.01% by mass.

PTFE may have a core-shell structure. The core-shell structure is a conventionally known structure, and is a structure of primary particles in an aqueous dispersion that can be produced by, for example, the method described in U.S. Pat. No. 6,841,594.

Examples of PTFE having a core-shell structure include a core-shell structure including a core portion of a TFE homopolymer and a shell portion of modified PTFE, a core-shell structure including a core portion of modified PTFE and a shell portion of a TFE homopolymer, and a core-shell structure including a core portion of modified PTFE and a shell portion of modified PTFE having a monomer composition different from that of modified PTFE constituting the core portion.

PTFE having a core-shell structure can be obtained by, for example, first polymerizing TFE and optionally a modifying monomer to produce a core portion (TFE homopolymer or modified PTFE), and then polymerizing TFE and optionally a modifying monomer to produce a shell portion (TFE homopolymer or modified PTFE).

The shell portion means a portion constituting a predetermined thickness from the surface of PTFE primary particles to the inside of the particles, and the core portion means a portion constituting the inside of the shell portion.

In the present disclosure, the core-shell structure includes all of (1) a core-shell structure including a core portion and a shell portion having different monomeric compositions, (2) a core-shell structure including a core portion and a shell portion having the same monomeric composition with different number average molecular weights in both portions, and (3) a core-shell structure including a core portion and a shell portion having different monomeric compositions with different number average molecular weights in both portions.

When the shell portion is modified PTFE, the content of the modifying monomer in the shell portion is preferably 0.0001 to 1% by mass. The content is more preferably 0.001% by mass or more, and still more preferably 0.01% by mass or more. Further, the content is more preferably 0.50% by mass or less, and still more preferably 0.30% by mass or less.

When the core portion is modified PTFE, the content of the modifying monomer in the core portion is preferably 0.00001 to 1.0% by mass. The content is more preferably 0.0001% by mass or more, and still more preferably 0.001% by mass or less. Further, the content is more preferably 0.50% by mass or less, and still more preferably 0.30% by mass or less.

In PTFE, the average primary particle size of primary particles is preferably 500 nm or less, more preferably 400 nm or less, and still more preferably 350 nm or less. Since the average primary particle size of primary particles is relatively small, the polymerization of TFE in an aqueous medium proceeds smoothly, and PTFE can be easily produced. The relatively small average primary particle size of primary particles can be obtained by, for example, adding a modifying monomer to the polymerization system at the initial stage of polymerization of TFE. The lower limit of the average primary particle size may be, for example, but not limited to, 50 nm or 100 nm. From the viewpoint of molecular weight, the lower limit is preferably 100 nm or more, and more preferably 150 nm or more.

The average primary particle size of the primary particles of PTFE can be determined by dynamic light scattering. The average primary particle size may be determined by preparing a PTFE aqueous dispersion with a polymer solid concentration being adjusted to 1.0% by mass and using dynamic light scattering at a measurement temperature of 25° C. with 70 measurement processes, wherein the solvent (water) has a refractive index of 1.3328 and the solvent (water) has a viscosity of 0.8878 mPa·s. In dynamic light scattering, for example, ELSZ-1000S (manufactured by Otsuka Electronics Co., Ltd.) can be used.

The upper limit of the aspect ratio of the primary particles of PTFE is, in order of preference, less than 2.00, 1.90 or less, 1.80 or less, 1.70 or less, 1.60 or less, 1.50 or less, 1.45 or less, 1.40 or less, 1.35 or less, 1.30 or less, 1.20 or less, or 1.10 or less. Since the aspect ratio is relatively small, the polymerization of TFE in an aqueous medium proceeds smoothly, and PTFE can be easily produced. The relatively small aspect ratio of primary particles can be obtained by, for example, adding a modifying monomer to the polymerization system at the initial stage of polymerization of TFE.

When the aspect ratio of PTFE is measured using a PTFE aqueous dispersion, the aspect ratio can be determined by preparing a PTFE aqueous dispersion adjusted to have a polymer solid concentration of about 1.0% by mass, observing the aqueous dispersion under a scanning electron microscope (SEM), performing image processing on 400 or more particles selected at random, and averaging the ratios of the major axis to the minor axis. When measuring the aspect ratio of PTFE using a PTFE powder, a PTFE aqueous dispersion is prepared by irradiating a PTFE powder with an electron beam, adding the PTFE powder to an aqueous solution of a fluorine-containing surfactant, and applying ultrasonic waves to redisperse the PTFE powder in the aqueous solution. Using the aqueous dispersion prepared in this manner, the aspect ratio can be determined by the above method.

The standard specific gravity (SSG) of PTFE is preferably 2.280 or less, more preferably 2.200 or less, still more preferably 2.190 or less, and further preferably 2.180 or less. Also, SSG is preferably 2.130 or more. When SSG is within the above range, excellent moldability and excellent physical properties of a molded product obtained by molding can be simultaneously achieved. SSG is determined by the water replacement method in accordance with ASTM D 792 using a sample molded in accordance with ASTM D 4895-89.

PTFE may have a thermal instability index (TII) of 20 or more. The thermal instability index (TII) of PTFE can be adjusted within the above range by, for example, producing PTFE using the polymer (I). TII is preferably 25 or more, more preferably 30 or more, and still more preferably 35 or more. TII is particularly preferably 40 or more. TII is measured in accordance with ASTM D 4895-89.

PTFE may have a 0.1% mass loss temperature of 400° C. or lower. The 0.1% mass loss temperature of PTFE can be adjusted within the above range by, for example, producing PTFE using the polymer (I).

The 0.1% mass loss temperature can be measured using TG/DTA (thermogravimetric-differential thermal analyzer) by precisely weighing about 10 mg of PTFE powder, which has no history of being heated to a temperature of 300° C. or higher, and storing it in a dedicated aluminum pan. The 0.1% mass loss temperature can be specified as a temperature corresponding to the point at which the mass of the aluminum pan is reduced by 0.1% by mass by heating the aluminum pan under the condition of 10° C./min in the temperature range from 25° C. to 600° C. in air.

PTFE may have a 1.0% mass loss temperature of 492° C. or lower. The 1.0% mass loss temperature of PTFE can be adjusted within the above range by, for example, producing PTFE using the polymer (I).

The 1.0% mass loss temperature can be measured using TG/DTA (thermogravimetric-differential thermal analyzer) by precisely weighing about 10 mg of PTFE powder, which has no history of being heated to a temperature of 300° C. or higher, and storing it in a dedicated aluminum pan. The 1.0% mass loss temperature can be specified as a temperature corresponding to the point at which the mass of the aluminum pan is reduced by 1.0% by mass by heating the aluminum pan under the condition of 10° C./min in the temperature range from 25° C. to 600° C. in air.

The peak temperature of PTFE may be 322 to 347° C.

When PTFE is high molecular weight PTFE, the upper limit of the peak temperature of PTFE may be 347° C. or lower, 346° C. or lower, 345° C. or lower, 344° C. or lower, 343° C. or lower, 342° C. or lower, 341° C. or lower, or 340° C. or lower.

The lower limit of the peak temperature of PTFE when PTFE is high molecular weight PTFE may be 333° C. or higher, or 335° C. or higher.

The upper limit of the peak temperature of PTFE when PTFE is low molecular weight PTFE may be 333° C. or lower, or 332° C. or lower.

The lower limit of the peak temperature of PTFE when PTFE is low molecular weight PTFE may be 322° C. or higher, or 324° C. or higher.

The peak temperature of PTFE can be measured using TG/DTA (thermogravimetric-differential thermal analyzer) by precisely weighing about 10 mg of PTFE powder, which has no history of being heated to a temperature of 300° C. or higher, and storing it in a dedicated aluminum pan. The peak temperature can be specified as a temperature corresponding to a maximum value appearing in a differential thermal analysis (DTA) curve obtained by raising the temperature of PTFE, which has no history of heating to a temperature of 300° C. or higher, under a condition of 10° C./min using TG-DTA (thermogravimetric-differential thermal analyzer).

The extrusion pressure of PTFE is preferably 50.0 MPa or less and more preferably 40.0 MPa or less, and is preferably 5.0 MPa or more, preferably 10.0 MPa or more, and still more preferably 15.0 MPa or more.

The extrusion pressure is a value determined by the following method in accordance with the method disclosed in Japanese Patent Laid-Open No. 2002-201217. The extrusion pressure of PTFE can be specified by the following method. To 100 g of a PTFE powder, 21.7 g of a lubricant (trade name: Isopar H®, manufactured by Exxon) is added and mixed for 3 minutes in a glass bottle at room temperature. Then, the glass bottle is left to stand at room temperature (25° C.) for at least 1 hour before extrusion to obtain a lubricated resin. The lubricated resin is paste-extruded at a reduction ratio of 100:1 at room temperature through an orifice (diameter 2.5 mm, land length 11 mm, entrance angle 30°) into a uniform beading (beading: extruded body). The extrusion speed, i.e., ram speed, is 20 inch/min (51 cm/min). Concerning the extrusion pressure, the value obtained by measuring the load when the extrusion load reaches equilibrium in paste extrusion and dividing the measured load by the cross-sectional area of the cylinder used in the paste extrusion is taken as the extrusion pressure.

The breaking strength A of PTFE is, in order of preference, 10.0 N or more, 13.0 N or more, 16.0 N or more, 18.0 N or more, 19.0 N or more, 20.0 N or more, 21.0 N or more, 22.0 N or more, 25.0 N or more, 28.0 N or more, or 30.0 N or more. The higher the breaking strength A, the better, but the upper limit of the breaking strength A may be, for example, 100 N or less, 80.0 N or less, and 50.0 N or less.

The breaking strength A is a value determined by the following method in accordance with the method described in Japanese Patent Laid-Open No. 2002-201217.

The breaking strength A of PTFE can be specified by the following method. First, a stretching test A is performed on an extruded beading by the following method to prepare a sample for breaking strength A measurement.

PTFE is heat-treated at 210° C. To 100 g of a powder obtained by the heat treatment, 21.7 g of a lubricant is added and mixed for 3 minutes in a glass bottle at room temperature. Then, the glass bottle is left to stand at room temperature (25° C.) for at least 1 hour before extrusion to obtain a lubricated resin. The lubricated resin is paste-extruded at a reduction ratio of 100:1 at room temperature through an orifice (diameter 2.5 mm, land length 11 mm, entrance angle 30°) into a uniform beading (beading: extruded body). The extrusion speed, i.e., ram speed, is 20 inch/min (51 cm/min).

The beading obtained by the paste extrusion is heated at 230° C. for 30 minutes to remove the lubricant from the beading. Next, an appropriate length of the beading (extruded body) is cut and clamped at each end leaving a space of 1.5 inch (38 mm) between clamps, and heated to 300° C. in an air circulation furnace. Then, the clamps are moved apart from each other at a desired rate (stretch rate) until the separation distance corresponds to a desired stretch (total stretch) to perform the stretching test. This stretch method essentially follows the method disclosed in U.S. Pat. No. 4,576,869, except that the extrusion speed is different (51 cm/min instead of 84 cm/min). "Stretch" is an increase in length due to stretching, usually expressed as a ratio to the original length. In the production method, the stretching rate is 1,000%/sec, and the total stretching is 2,400%.

The stretched beading (produced by stretching the beading) obtained in the stretching test A is clamped by movable jaws having a gauge length of 5.0 cm, a tensile test is performed at 25° C. at a rate of 300 mm/min, and the strength at the time of breaking is taken as the breaking strength A.

PTFE preferably has a stress relaxation time of 50 seconds or more, more preferably 80 seconds or more, and still more preferably 100 seconds or more, and the stress relaxation time may be 150 seconds or more.

The stress relaxation time is a value determined by the following method in accordance with the method disclosed in Japanese Patent Laid-Open No. 2002-201217.

The stress relaxation time of PTFE can be specified by the following method. Both ends of the stretched beading obtained in the stretching test A are tied to a fixture to form a tightly stretched beading sample having an overall length of 8 inches (20 cm). The fixture is placed in an oven through a (covered) slit on the side of the oven, while keeping the oven at 390° C. The time it takes for the beading sample to break after it is placed in the oven is taken as the stress relaxation time.

Low molecular weight PTFE can also be produced by the production method of the present disclosure.

Low molecular weight PTFE may be produced by polymerization, and can also be produced by reducing the molecular weight of high molecular weight PTFE obtained by polymerization by a known method (thermal decomposition, radiation decomposition, or the like).

Low molecular weight PTFE having a molecular weight of 600,000 or less (also referred to as a PTFE micropowder) is, in addition to having excellent chemical stability and extremely low surface energy, less likely to generate fibrils, and is therefore suitably used as an additive for, for example, improving lubricity and the coating-surface texture in production of plastics, inks, cosmetics, coating materials, greases, parts of office automation equipment, toners, and the like (e.g., see Japanese Patent Laid-Open No. 10-147617).

Further, low molecular weight PTFE may be obtained by dispersing the polymerization initiator and the polymer (I) in an aqueous medium in the presence of a chain transfer agent, and polymerizing TFE or polymerizing TFE and a monomer that is copolymerizable with TFE. In this case, the chain transfer agent is preferably at least one selected from the group consisting of alkanes having 2 to 4 carbon atoms. Specifically, methane, ethane, propane, butane, and isobutane are more preferable, and ethane and propane are still more preferable. In this case, the amount of the chain transfer agent is preferably 10 mass ppm or more or more than 10 mass ppm based on the aqueous medium. These chain transfer agents function as nucleating agents during polymerization and adjust the melt viscosity and the peak temperature of the polymer obtained by polymerization to give low molecular weight PTFE.

When using the low molecular weight PTFE obtained by polymerization as a powder, powder particles can be obtained by coagulating the aqueous dispersion.

In the present disclosure, high molecular weight PTFE means non melt-processible and fibrillatable PTFE. On the other hand, low molecular weight PTFE means melt-fabricable and non-fibrillatable PTFE.

Being non-melt processible means a property that the melt flow rate cannot be measured at a temperature higher than the crystal melting point in accordance with ASTM D 1238 and D 2116.

The presence or absence of fibrillatability can be determined by "paste extrusion", which is a representative method of molding a "high molecular weight PTFE powder", which is a powder made of a TFE polymer. Usually, high molecular weight PTFE can be paste-extruded when it is fibrillatable. When a non-sintered molded product obtained by paste extrusion shows substantially no strength or elongation (for example, when it shows an elongation of 0% and is broken when stretched), it can be regarded as non-fibrillatable.

High molecular weight PTFE preferably has a standard specific gravity (SSG) of 2.130 to 2.280. The standard specific gravity is determined by the water replacement method in accordance with ASTM D 792 using a sample molded in accordance with ASTM D 4895-89. The "high molecular weight" in the present disclosure means that the standard specific gravity is within the above range.

Low molecular weight PTFE has a complex viscosity of $1 \times 10^2$ to $7 \times 10^5$ Pa·s at 340° C. The "low molecular weight" in the present disclosure means that the complex viscosity is within the above range.

Low molecular weight PTFE has a melt viscosity of $1 \times 10^2$ to $7 \times 10^5$ Pa·s at 340° C. The "low molecular weight" in the present disclosure means that the complex viscosity is within the above range. The melt viscosity is a value measured while maintaining 2 g of a sample, which is heated for 5 minutes at 380° C. in advance, at that temperature under a load of 0.7 MPa in accordance with ASTM D 1238 using a flow tester (manufactured by Shimadzu Corporation) and a 2φ-8 L die.

High molecular weight PTFE has a complex viscosity (melt viscosity) that is significantly higher than that of low molecular weight PTFE, and it is difficult to accurately measure the complex viscosity thereof. The complex viscosity (melt viscosity) of low molecular weight PTFE is measurable, but it is difficult to obtain a molded article usable in the measurement of standard specific gravity from low molecular weight PTFE, and it is thus difficult to measure the accurate standard specific gravity thereof. Accordingly, in the present disclosure, the standard specific gravity is used as an index of the molecular weight of high molecular weight PTFE, while the complex viscosity (melt viscosity) is used as an index of the molecular weight of low molecular weight PTFE. It should be noted that there is no known measuring method for directly specifying the molecular weight of either high molecular weight PTFE or low molecular weight PTFE.

High molecular weight PTFE preferably has a peak temperature of 333 to 347° C., and more preferably 335 to 345° C. Low molecular weight PTFE preferably has a peak temperature of 322 to 333° C., and more preferably 324 to 332° C. The peak temperature can be specified as a temperature corresponding to the maximum value appearing in a differential thermal analysis (DTA) curve obtained by raising the temperature of PTFE, which has no history of being heated to a temperature of 300° C. or higher, under a condition of 10° C./min using TG-DTA (thermogravimetric-differential thermal analyzer).

The average primary particle size of primary particles of low molecular weight PTFE is preferably 10 to 200 nm and more preferably 20 nm or more, and is more preferably 140 nm or less, still more preferably 150 nm or less, and particularly preferably 90 nm or less. The relatively small average primary particle size of primary particles can be obtained by, for example, adding a modifying monomer to the polymerization system at the initial stage of polymerization of TFE.

The average primary particle size of primary particles of low molecular weight PTFE can be determined by a dynamic light scattering. The average primary particle size may be determined by preparing an aqueous dispersion of low molecular weight PTFE with a polymer solid concentration being adjusted to 1.0% by mass and using dynamic light scattering at a measurement temperature of 25° C. with 70 measurement processes, wherein the solvent (water) has a refractive index of 1.3328 and the solvent (water) has a viscosity of 0.8878 mPa·s. In dynamic light scattering, for example, ELSZ-1000S (manufactured by Otsuka Electronics Co., Ltd.) can be used.

A PTFE aqueous dispersion can be obtained by the production method of the present disclosure. The solid concentration of the PTFE aqueous dispersion is not limited, and may be, for example, 1.0 to 70% by mass. The solid concentration is preferably 8.0% by mass or more and more preferably 10.0% by mass or more, and is more preferably 60.0% by mass or less and more preferably 50.0% by mass or less.

In the method for producing PTFE of the present disclosure, the adhesion amount is preferably 3.0% by mass or less, more preferably 2.0% by mass or less, more preferably 1.0% by mass or less, still more preferably 0.8% by mass or less, further preferably 0.7% by mass or less, and particularly preferably 0.6% by mass or less based on the finally obtained PTFE.

Next, the applications and the like of PTFE obtained by the production method of the present disclosure will now be described in more detail.

PTFE may be a PTFE aqueous dispersion in which primary particles of PTFE are dispersed in an aqueous medium.

The applications of the PTFE aqueous dispersion are not limited, and examples to which the aqueous dispersion is directly applied include coating achieved by applying the aqueous dispersion to a substrate, drying the dispersion, and optionally sintering the workpiece; impregnation achieved by impregnating a porous support such as nonwoven fabric or a resin molded article with the aqueous dispersion, drying the dispersion, and preferably sintering the workpiece; and casting achieved by applying the aqueous dispersion to a substrate such as glass, drying the dispersion, optionally immersing the workpiece in water to remove the substrate and to thereby provide a thin film. Examples of such applications include aqueous dispersion-type coating materials, tent canvas, conveyor belts, printed circuit boards (CCL), binders for electrodes, and water repellents for electrodes.

The PTFE aqueous dispersion may be used in the form of an aqueous coating material by being mixed with a known compounding agent such as a pigment, a thickener, a dispersant, a antifoaming agent, an antifreezing agent, a film-forming aid, or by being blended with another polymer compound.

Further, the PTFE aqueous dispersion may be used in additive applications such as a binder application for preventing the active material of an electrode from falling off, a compound application such as a drip inhibitor, or a dust suppressing treatment application for preventing floating of sand, dust, and the like.

The PTFE aqueous dispersion is also preferably used as a dust suppression treatment agent. The dust suppression treatment agent can be used in a method for suppressing dust of a dust-generating substance by fibrillating PTFE by mixing with a dust-generating substance and applying a compression-shearing action to the mixture at a temperature of 20 to 200° C., such as a method disclosed in Japanese Patent No. 2827152 or Japanese Patent No. 2538783.

The PTFE aqueous dispersion can be suitably used in, for example, the dust suppression treatment agent composition described in International Publication No. WO 2007/004250, and can be suitably used in the dust control treatment method described in International Publication No. WO 2007/000812.

The dust suppression treatment agent is suitably used in the fields of building-products, soil stabilizers, solidifying materials, fertilizers, landfill of incineration ash and harmful substance, explosion proof equipment, cosmetics, sands for pet excretion represented by cat sand, and the like.

The production method of the present disclosure can further include at least one of the steps of recovering the PTFE aqueous dispersion obtained by the method described above, coagulating PTFE that is present in the PTFE aqueous dispersion, recovering the coagulated PTFE, and drying the recovered PTFE at 100 to 250° C. With such a step being included in the production method of the present disclosure, a PTFE powder can be obtained.

A powder can be produced by coagulating PTFE contained in the aqueous dispersion. The PTFE aqueous dispersion can be used as a powder in various applications after being post-treated such as concentration if necessary, and then coagulated, washed, and dried. Coagulation of the PTFE aqueous dispersion is usually performed by diluting the aqueous dispersion obtained by polymerization of polymer latex with, for example, water to a polymer concentration of 10 to 25% by mass, optionally adjusting the pH to neutral or alkaline, and stirring the polymer more vigorously than during the reaction in a vessel equipped with a stirrer. Coagulation may be performed under stirring while adding a water-soluble organic compound such as methanol or acetone, an inorganic salt such as potassium nitrate or ammonium carbonate, or an inorganic acid such as hydrochloric acid, sulfuric acid, or nitric acid as a coagulating agent. Coagulation may be continuously performed using a device such as an inline mixer.

The aqueous dispersion may be any of an aqueous dispersion obtained by performing the above-described polymerization, a dispersion obtained by concentrating, or performing a dispersion stabilization treatment on, such an aqueous dispersion, and what is obtained by dispersing a powder made of PTFE in an aqueous medium in the presence of the above surfactant.

Concerning the method for producing an aqueous dispersion, also, a purified aqueous dispersion can be produced by step (I) of bringing the aqueous dispersion obtained by the polymerization into contact with an anion exchange resin or a mixed bed containing an anion exchange resin and a cation exchange resin in the presence of a nonionic surfactant and/or step (II) of concentrating the aqueous dispersion obtained by the polymerization such that the solid concentration is 30 to 70% by mass based on 100% by mass of the aqueous dispersion.

The nonionic surfactant is not limited, but a known nonionic surfactant can be used. The anion exchange resin is not limited, and a known anion exchange resin is usable. Further, the method for bringing the aqueous dispersion into contact with an anion exchange resin may be a known method.

Concerning the method for producing an aqueous dispersion, a purified aqueous dispersion can be produced by performing step (I) on the aqueous dispersion obtained by the polymerization and performing step (II) on the aqueous dispersion obtained in step (I). Further, a purified aqueous dispersion can also be produced by performing step (II) without performing step (I). Further, step (I) and step (II) can be repeatedly performed, and can be combined as well.

Examples of the anion exchange resin include known resins such as a strongly basic anion exchange resin containing as a functional group a —N⁺X⁻(CH₃)₃ group (wherein X represents Cl or OH) and a strongly basic anion exchange resin containing a —N⁺X⁻(CH₃)₃(C₂H₄OH) group (wherein X is as described above). Specific examples include those described in International Publication No. WO 99/62858, International Publication No. WO 03/020836, International Publication No. WO 2004/078836, International Publication No. WO 2013/027850, and International Publication No. WO 2014/084399.

Examples of the cation exchange resin include, but are not limited to, known resins such as a strongly acidic cation exchange resin containing as a functional group a —SO₃⁻ group and a weakly acidic cation exchange resin containing as a functional group a —COO⁻ group. Of these, from the viewpoint of removal efficiency, a strongly acidic cation exchange resin is preferable, a H⁺-type strongly acidic cation exchange resin is more preferable.

The "mixed bed containing a cation exchange resin and an anion exchange resin" encompasses, but is not limited to, those in which the resins are filled in the same column, those in which the resins are filled in different columns, and those in which the resins are dispersed in an aqueous dispersion.

A known method is used as the concentration method. Specific examples include those described in International Publication No. WO 2007/046482 and International Publication No. WO 2014/084399. Examples include phase separation, centrifugal sedimentation, cloud point concentration, electroconcentration, electrophoresis, filtration treatment involving ultrafiltration, filtration treatment involving a reverse osmosis membrane (RO membrane), and nanofiltration treatment. In the above concentration, PTFE can be concentrated to 30 to 70% by mass according to the application. Concentration may impair the stability of the dispersion, and in such a case, further a dispersion stabilizer may be added.

As for the dispersion stabilizer, the above nonionic surfactant and various other surfactants may be added.

The nonionic surfactant is the same as the above-described nonionic surfactant exemplified as a nucleating agent, and the above-described nonionic surfactant can be suitably used. The nonionic surfactant preferably does not contain an aromatic moiety.

Further, the cloud point of the nonionic surfactant is a measure of solubility of the surfactant in water. The surfactant used in the aqueous dispersion of the present disclosure has a cloud point of about 30° C. to about 90° C., and preferably about 35° C. to about 85° C.

The total amount of the dispersion stabilizer is a concentration of 0.5 to 20% by mass based on the solid content of the dispersion. A total amount of less than 0.5% by mass may result in a poor dispersion stability, and a total amount exceeding 20% by mass does not provide effects corresponding to the amount of the dispersion stabilizer present, which are not practical. The lower limit of the dispersion stabilizer is more preferably 2% by mass, while the upper limit is more preferably 12% by mass.

The surfactant may be removed by the above concentration operation.

Depending on the application, the aqueous dispersion obtained by performing the polymerization can also be subjected to a dispersion stabilization treatment without being concentrated, to thus prepare an aqueous dispersion having a long pot life. Examples of the dispersion stabilizer to be used can be the same as those described above.

An anionic surfactant can be preferably contained to adjust the viscosity of the aqueous dispersion or to improve miscibility with a pigment, a filler, or the like. The anionic surfactant can be suitably added as long as there is neither an economical nor environmental problem.

Examples of the anionic surfactant include non-fluorinated anionic surfactants and fluorine-containing anionic surfactants, and non-fluorinated anionic surfactants that do not contain fluorine, i.e., hydrocarbon anion surfactants are preferable.

To adjust viscosity, the type is not limited as long as the anionic surfactant is a known anionic surfactant, and, for example, anionic surfactants disclosed in International Publication No. WO 2013/146950 and International Publication No. WO 2013/146947 are usable. Examples include those having a saturated or unsaturated aliphatic chain having 6 to 40 carbon atoms, preferably 8 to 20 carbon atoms, and more preferably 9 to 13 carbon atoms. The saturated or unsaturated aliphatic chain may be either linear or branched, or may have a cyclic structure. The hydrocarbon may have aromaticity, or may have an aromatic group. The hydrocarbon may have a hetero atom such as oxygen, nitrogen, or sulfur.

Examples of anionic surfactants include alkyl sulfonates, alkyl sulfates, and alkyl aryl sulfates, and salts thereof; aliphatic (carboxylic) acids and salts thereof; and phosphoric acid alkyl esters and phosphoric acid alkyl aryl esters, and salts thereof. Of these, preferable are alkyl sulfonates, alkyl sulfates, aliphatic carboxylic acids, and salts thereof.

Preferable examples of alkyl sulfates or salts thereof include ammonium lauryl sulfate and sodium lauryl sulfate.

Preferable examples of aliphatic carboxylic acids or salts thereof include succinic acid, decanoic acid, undecanoic acid, undecenoic acid, lauric acid, hydrododecanoic acid, and salts thereof.

The amount of the anionic surfactant added varies depending on the type of the anionic surfactant and other compounding agents, and is preferably 10 mass ppm to 5,000 mass ppm based on the mass of the solids of PTFE.

The lower limit of the amount of the anionic surfactant added is more preferably 50 mass ppm or more, and still more preferably 100 mass ppm or more. An excessively small amount of the anionic surfactant added results in a poor viscosity adjusting effect.

The upper limit of the amount of the anionic surfactant added is more preferably 3,000 mass ppm or less, and still more preferably 2,000 mass ppm or less. An excessive amount of the anionic surfactant added may result in impaired mechanical stability and storage stability of the aqueous dispersion.

To adjust the viscosity of the aqueous dispersion, for example, methyl cellulose, alumina sol, polyvinyl alcohol, carboxylated vinyl polymer, and the like can also be added in addition to the anionic surfactant.

To adjust the pH of the aqueous dispersion, a pH regulator such as aqueous ammonia can also be added.

As necessary, the aqueous dispersion may contain a further water-soluble polymer compound as long as the characteristics of the aqueous dispersion are not impaired.

The further water-soluble polymer compound is not limited, and examples include polyethylene oxide (a dispersion stabilizer), polyethylene glycol (a dispersion stabilizer), polyvinylpyrrolidone (a dispersion stabilizer), phenol resin, urea resin, epoxy resin, melamine resin, polyester resin, polyether resin, acrylic silicone resin, silicone resin, silicone polyester resin, and polyurethane resin. Moreover, preservatives such as isothiazolone, azole, pronopol, chlorothalonil, methylsulfonyltetrachloropyrrolidine, carbendazim, fluoroforbet, sodium diacetate, and diiodomethyl p-tolylsulfone may be contained.

In the present disclosure, the PTFE aqueous dispersion used in coagulation stirring (hereinafter referred to as a PTFE dispersion for coagulation) preferably has a PTFE solid concentration of 10 to 25% by mass. The PTFE solid concentration is preferably 10 to 22% by mass, and more preferably 10 to 20% by mass. To increase the bulk density of a PTFE fine powder, the PTFE solid concentration in the PTFE aqueous dispersion for coagulation is preferably high. When the PTFE solid concentration in the PTFE aqueous dispersion for coagulation is high, the degree of association of primary particles of PTFE is increased, and the primary particles of PTFE are densely associated/coagulated to be formed into granules. When the PTFE solid concentration of the PTFE aqueous dispersion for coagulation is less than 10% by mass, the coagulation density of primary particles of PTFE is likely low, and a PTFE fine powder having a high bulk density is unlikely obtained. On the other hand, when the PTFE solid concentration in the PTFE aqueous dispersion for coagulation is excessive, the amount of uncoagulated PTFE is increased, and the solid concentration of uncoagulated PTFE in the coagulation discharge water is increased. A high solid concentration of uncoagulated PTFE in coagulated discharge water results in pipe clogging and a costly and troublesome discharge water treatment. Further, the yield of a PTFE fine powder is poor. The solid concentration of uncoagulated PTFE in coagulation discharge water is preferably low from the viewpoint of productivity of a PTFE fine powder, and is more preferably less than 0.4% by mass, still more preferably less than 0.3% by mass, and particularly preferably less than 0.2% by mass. When the solid concentration of PTFE in the PTFE aqueous dispersion for coagulation exceeds 25% by mass, it is difficult to reduce the solid concentration of uncoagulated PTFE in coagulation discharge water to less than 0.4% by mass. Since the solid concentration of PTFE in the PTFE aqueous dispersion obtained in step 1 is about 10 to 45% by mass, when the solid concentration of PTFE is high, a dilution solvent such as water is added to adjust the concentration to be 10 to 25% by mass. When the solid concentration of PTFE in the PTFE aqueous dispersion after polymerization is 10 to 25% by mass, the PTFE aqueous dispersion can be used directly as the PTFE aqueous dispersion for coagulation.

A pigment-containing or filler-containing PTFE powder in which pigments and fillers are uniformly mixed can be obtained by adding pigments for coloring and various fillers for improving mechanical properties before or during coagulation.

The wet powder obtained by coagulating PTFE is usually dried by means of vacuum, high-frequency waves, hot air, or the like while keeping the wet powder in a state in which the wet powder barely flows, or preferably in a stationary state. Friction between powder particles especially at high temperature usually has unfavorable effects on PTFE in the form of a fine powder. This is because particles made of such PTFE easily become fibrillated even with a small shearing force and lose its original, stable particle structure. Drying is performed at a drying temperature of 10 to 300° C. (preferably 10 to 250° C.), preferably 100 to 300° C. (preferably 100 to 250° C.).

The PTFE powder preferably has an average particle size (an average secondary particle size) of 100 to 2,000 μm. The lower limit of the average secondary particle size is more preferably 200 μm or more, and still more preferably 300 μm or more. The upper limit of the average secondary particle size is preferably 1,000 μm or less, more preferably 800 μm or less, and particularly preferably 700 μm or less. The average particle size is a value measured in accordance with JIS K 6891.

The PTFE powder is preferable for molding, and suitable applications include tubes and the like for hydraulic systems and fuel systems of aircrafts and automobiles, flexible hoses for chemical liquid, steam, and the like, and electric wire coating applications. The PTFE powder can also be used as a binder for batteries and in dustproof applications. Further, a stretched body can also be produced from the PTFE powder.

As for the stretched body, for example, a powder of PTFE obtained by the production method of the present disclosure is paste-extruded to thereby provide an extrudate such as a sheet-shaped extrudate or a rod-shaped extrudate, and roll-stretching the resulting extrudate in the extrusion direction, and thus a uniaxially stretched film can be obtained as the stretched body. Further, by stretching the resulting uniaxially stretched film in a transverse direction using a tenter or the like, a biaxially stretched film can be obtained as the stretched body. Prebaking treatment may be performed on the extrudate before stretching. As for the drawing conditions, a speed of 5 to 2,000%/sec and a draw ratio of 200% or more are preferably employed. Stretching causes PTFE in the powder to readily fibrillate, resulting in a stretched body made of nodes and fibers.

Examples of specific applications will now be provided below.

Electrochemical Field

Examples of applications in this field include prepregs for dielectric materials, EMI-shielding materials, and heat conductive materials. More specifically, examples include printed circuit boards, electromagnetic interference shielding materials, insulating heat conductive materials, and insulating materials.

Sealant Field

Examples of applications in this field include gaskets, packings, pump diaphragms, pump tubes, and sealants for aircraft.

Air Filter Field

Examples of applications in this field include ULPA filters (for production of semiconductors), HEPA filters (for hospitals and for production of semiconductors), cylindrical cartridge filters (for industries), bag filters (for industries), heat-resistant bag filters (for exhaust gas treatment), heat-resistant pleated filters (for exhaust gas treatment), SINBRAN filters (for industries), catalyst filters (for exhaust gas treatment), adsorbent-attached filters (for HDD embedment), adsorbent-attached vent filters (for HDD embedment), vent filters (for HDD embedment, for example), filters for cleaners (for cleaners), general-purpose multilayer felt materials, cartridge filters for GT (for interchangeable items for GT), and cooling filters (for housings of electronic devices).

Ventilation/Internal Pressure Adjustment Field

Examples of applications in this field include materials for freeze drying such as vessels for freeze drying, ventilation materials for automobiles for electronic circuits and lamps, applications relating to vessels such as vessel caps, protective ventilation for electronic devices, including small devices such as tablet terminals and mobile phone terminals, and ventilation for medical treatment.

Liquid Filter Field

Examples of applications in this field include liquid filters for semiconductors (for production of semiconductors), hydrophilic PTFE filters (for production of semiconductors), filters for chemicals (for chemical liquid treatment), filters for pure water production lines (for production of pure water), and back-washing liquid filters (for treatment of industrial discharge water).

Consumer Goods Field

Examples of applications in this field include clothes, cable guides (movable wires for motorcycles), clothes for motor cyclists, cast liners (medical supporters), filters for cleaners, bagpipes (musical instruments), cables (such as signal cables for guitars), and strings (for string instrument).

Textile Field

Examples of applications in this field include PTFE fibers (fiber materials), machine threads (textiles), weaving yarns (textiles), and ropes.

Medical Treatment Field

Examples of applications in this field include implants (stretched articles), artificial blood vessels, catheters, general surgical operations (tissue reinforcing materials), products for head and neck (dura mater alternatives), oral health (tissue regenerative medicine), and orthopedics (bandages).

While embodiments have been described above, it will be understood that various changes in form and details can be made without departing from the gist and scope of the claims.

The present disclosure provides a method for producing polytetrafluoroethylene, the method comprising polymerizing tetrafluoroethylene in an aqueous medium in the presence of a nucleating agent and a polymer (I) containing a polymerization unit (I) based on a monomer represented by the general formula (I) to obtain polytetrafluoroethylene:

wherein $X^1$ and $X^3$ are each independently F, Cl, H, or $CF_3$; $X^2$ is H, F, an alkyl group, or a fluorine-containing alkyl group; $A^0$ is an anionic group; R is a linking group; $Z^1$ and $Z^2$ are each independently H, F, an alkyl group, or a fluorine-containing alkyl group; and m is an integer of 1 or more.

In the production method of the present disclosure, the anionic group is preferably at least one selected from the group consisting of a sulfate group, a carboxylate group, a phosphate group, a phosphonate group, a sulfonate group, and $—C(CF_3)_2OM$, wherein M is $—H$, a metal atom, $—NR^7_4$, imidazolium optionally having a substituent, pyridinium optionally having a substituent, or phosphonium optionally having a substituent, and $R^7$ is H or an organic group.

In the production method of the present disclosure, the polymer (I) preferably has a number average molecular weight of $1.0 \times 10^4$ or more.

In the production method of the present disclosure, m in the general formula (I) is preferably 1.

In the production method of the present disclosure, the nucleating agent is preferably at least one selected from the group consisting of fluoropolyether, a nonionic surfactant, and a chain transfer agent.

In the production method of the present disclosure, the chain transfer agent is preferably at least one selected from the group consisting of alcohols having 1 to 4 carbon atoms and alkanes having 2 to 4 carbon atoms.

In the production method of the present disclosure, the chain transfer agent is at least one selected from the group consisting of isopropanol, sec-butanol, and tert-butanol.

In the production method of the present disclosure, the nonionic surfactant is preferably at least one selected from the group consisting of a nonionic surfactant represented by the general formula (i) and a nonionic surfactant represented by the general formula (ii):

wherein $R^3$ is a linear or branched primary or secondary alkyl group having 8 to 18 carbon atoms, and $A^1$ is a polyoxyalkylene chain; and

wherein $R^4$ is a linear or branched primary or secondary alkyl group having 4 to 12 carbon atoms, and $A^2$ is a polyoxyalkylene chain.

In the production method of the present disclosure, the nucleating agent is preferably a chain transfer agent.

In the production method of the present disclosure, the nucleating agent is preferably the chain transfer agent and one or both of the nonionic surfactant and fluoropolyether.

In the production method of the present disclosure, the nucleating agent is preferably the chain transfer agent and the nonionic surfactant.

In the production method of the present disclosure, tetrafluoroethylene and a modifying monomer are preferably polymerized.

In the production method of the present disclosure, the polytetrafluoroethylene is low molecular weight polytetrafluoroethylene.

In the production method of the present disclosure, primary particles of the polytetrafluoroethylene preferably have an aspect ratio of less than 2.00.

EXAMPLES

Next, embodiments of the present disclosure will now be described with reference to Examples, but the present disclosure is not limited only to these Examples.

The numerical values of the Examples were measured by the following methods.

<Method for Measuring Weight-Average Molecular Weight (Mw) and Number-Average Molecular Weight (Mn) of Polymers D and H>

Mw and Mn of polymer D were measured by gel permeation chromatography (GPC) using GPC HLC-8020 manufactured by Tosoh Corporation and columns manufactured by Showa Denko K.K. (one GPC KF-801, one GPC KF-802, and two GPC KF-806M connected in series) while allowing tetrahydrofuran (THF) to flow as a solvent at a flow rate of 1 ml/min, and the molecular weights were calculated using monodisperse polystyrene as a standard.

<Method for Measuring Content of Dimer and Trimer of Monomers (Such as Monomers D and G) in Polymers (Such as Polymers D and G)>

(1) Extraction from Aqueous Solution

The solid content of an aqueous solution of a polymer was measured, and the amount of the aqueous solution corresponding to 0.2 g of the solid content of the polymer was weighed. Thereafter, water and methanol were added such that the volume ratio of water, including water contained in the aqueous solution, to methanol was 50/50 (vol %) to obtain a mixed solution containing the polymer, water, and methanol. Thereafter, the resulting mixed solution was centrifuged at 4,000 rpm for 1 hour, and the supernatant containing the polymer was recovered as an extract.

The extract was analyzed using a liquid chromatograph-mass spectrometer (Waters, LC-MS ACQUITY UPLC/TQD) to obtain a chromatogram of the extract.

The content of a dimer and a trimer of a monomer contained in the extract was obtained by converting the integral values of peaks derived from the dimer and the trimer of the monomer appearing in the chromatogram of the extract into the contents of the dimer and the trimer of the monomer using a calibration curve.

(2) Calibration Curve of Monomer

Five concentration levels of a methanol standard solution of a monomer having a known content of 1 ng/mL to 100 ng/mL were prepared, and measurement was made using a liquid chromatograph-mass spectrometer (Waters, LC-MS ACQUITY UPLC/TQD). The relationship between the content of each monomer and the integrated value of a peak corresponding to the content was plotted to prepare a calibration curve (first-order approximation) of each monomer. Next, the calibration curve (first-order approximation) of each monomer was used to prepare calibration curves of the dimer and the trimer of each monomer.

Measuring instrument configuration and LC-MS measurement conditions are bellow:

TABLE 1

| | LC unit |
|---|---|
| Apparatus | Acquity UPLC manufactured by Waters |
| Column | Acquity UPLC BEH C18 1.7 mm (2.1 × 50 mm) manufactured by Waters |
| Mobile Phase | A CH$_3$CN |
| | B 20 mM CH$_3$COONH$_4$/H$_2$O |
| | 0→1.5 min    A:B = 10:90 |
| | 1.5→8.5 min  A:B = 10:90 → A:B = 90:10 Linear gradient |
| | 8.5→10 min   A:B = 90:10 |
| Flow rate | 0.4 mL/min |
| Column temperature | 40° C. |
| Amount of injected sample | 5 μL |

| | MS unit |
|---|---|
| Apparatus | TQ Detector |
| Measurement mode | MRM (Multiple Reaction Monitoring) |
| Ionization method | Electrospray ionization SCAN |

The quantification limit in this measuring instrument configuration is 1 ng/mL.

<Content of Modifying Monomer Unit>

The content of the HFP unit was determined based on the infrared absorbance obtained by producing a thin film disk by press molding a PTFE powder and carrying out FT-IR measurement, in which the ratio of the absorbance at 982 cm$^{-1}$/the absorbance at 935 cm$^{-1}$ was multiplied by 0.3.

The content of the perfluoro(methyl vinyl ether) (PMVE) unit was determined using the following formula from a spectrum obtained by solid-state $^{19}$F-MAS NMR measurement:

$$X=(4B/3)/(A+(B/3))\times 100$$

X: Content (mol %) of PMVE unit
A: Integral value of signal at −120 ppm
B: Integral value of CF signal at −52 ppm The chemical shift value used was a value obtained when the peak top of the signal derived from the backbone of PTFE was −120 ppm.

<Concentration of Polymer (Such as Polymer D)>

In a vacuum dryer, about 1 g of an aqueous solution of a polymer was dried at 60° C. for 60 minutes, the mass of non-volatile matter was measured, and the ratio of the mass of the non-volatile matter to the mass (1 g) of the aqueous solution of the polymer was expressed in percentage and taken as the concentration thereof.

<Solid Concentration of Aqueous Dispersion Containing PTFE>

In an air dryer, 1 g of an aqueous dispersion was dried at 150° C. for 60 minutes, and the ratio of the mass of the non-volatile matter to the mass of the aqueous dispersion (1 g) was expressed in percentage and taken as the solid concentration thereof.

<Average Primary Particle Size>

The average primary particle size was determined by preparing a PTFE aqueous dispersion adjusted to a solid concentration of about 1.0% by mass, and by conducting a measurement by using ELSZ-1000S (manufactured by Otsuka Electronics Co., Ltd.) at 25° C. with 70 accumulations. The refractive index of the solvent (water) was 1.3328, and the viscosity of the solvent (water) was 0.8878 mPa·s.

<Number of Particles>

The number of particles can be calculated from the polymer solid concentration when spherical particles having a diameter corresponding to the average primary particle diameter measured by the above method and having a specific gravity of 2.28 is used. The number X of PTFE particles can be calculated by the following formula where the primary particle diameter is A nm, and the polymer solid concentration is B % by mass.

$$X=((B/100)/(1-B/100))/(4/3\times 3.14\times ((A/2)\times 10^{-7})^3 \times 2.28)$$

<Aspect Ratio>

The aspect ratio was determined by observing the diluted aqueous dispersion to a solid concentration of about 1% by mass with a scanning electron microscope (SEM), performing image processing on 400 or more particles selected at random, and averaging the ratios of the major axis to the minor axis.

<Standard Specific Gravity (SSG)>

Using a sample molded in accordance with ASTM D 4895-89, the SSG was determined by the water replacement method in accordance with ASTM D 792.

<Peak Temperature>

The peak temperature was measured using TG/DTA (thermogravimetric-differential thermal analyzer) by precisely weighing about 10 mg of a PTFE powder, which had no history of being heated to a temperature of 300° C. or higher, and storing it in a dedicated aluminum pan. A differential thermal (DTA) curve by heating the aluminum pan under the condition of 10° C./min in a temperature range from 25° C. to 600° C. in air was obtained, and the temperature corresponding to the maximum value of the resulting differential thermal (DTA) curve was regarded as the peak temperature.

<Extrusion Pressure>

The extrusion pressure was determined by the following method in accordance with the method disclosed in Japanese Patent Laid-Open No. 2002-201217. To 100 g of a PTFE powder, 21.7 g of a lubricant (trade name: Isopar H®, manufactured by Exxon) was added and mixed for 3 minutes in a glass bottle at room temperature. Then, the glass bottle was left to stand at room temperature (25° C.) for at least 1 hour before extrusion to obtain a lubricated resin. The lubricated resin was paste-extruded at a reduction ratio of 100:1 at room temperature through an orifice (diameter 2.5 Mm, land length 11 ram, entrance angle 30°) into a uniform beading (beading: extruded body). The extrusion speed, i.e., ram speed, was 20 inch/min (51 cm/min). The extrusion pressure was calculated by measuring the load when the extrusion load reached equilibrium in the paste extrusion and dividing the measured load by the cross-sectional area of the cylinder used in the paste extrusion.

<Stretching Test>

The stretching test and the measurement of breaking strength A were carried out by the following methods in accordance with the methods disclosed in Japanese Patent Laid-Open No. 2002-201217.

The beading obtained by the paste extrusion above was heated at 230° C. for 30 minutes to remove the lubricant from the beading. Next, an appropriate length of the beading (an extruded body) was cut and clamped at each end leaving a space of 1.5 inch (38 mm) between clamps, and heated to 300° C. in an air circulation furnace. Then, the clamps were moved apart from each other at a desired rate (a stretch rate) until the separation distance corresponds to a desired stretch (a total stretch) to perform the stretching test. This stretch method essentially followed a method disclosed in U.S. Pat. No. 4,576,869, except that the extrusion speed was different (51 cm/min instead of 84 cm/min). "Stretch" is an increase in length due to stretching, usually expressed as a ratio to the original length. In the stretch method, the stretch rate was 1,000%/sec, and the total stretch was 2,400%.

<Breaking Strength A>

The stretched beading (those produced by stretching the beading) obtained in the stretching test above was clamped by movable jaws having a gauge length of 5.0 cm, and a tensile test was performed at 25° C. at a rate of 300 mm/min, and the strength at the time of breaking was taken as breaking strength A.

<Stress Relaxation Time>

The stress relaxation time was determined by the following methods in accordance with the methods disclosed in Japanese Patent Laid-Open No. 2002-201217.

Both ends of the stretched beading obtained in the stretching test above were tied to a fixture to form a tightly stretched beading sample having an overall length of 8 inches (20 cm). The fixture was placed in an oven through a (covered) slit on the side of the oven, while keeping the oven at 390° C. The time it takes for the beading sample to break after it was placed in the oven was determined as the stress relaxation time.

<Appearance of Stretched Body>

The appearance of the stretched beading (those produced by stretching the beadings) obtained in the stretching test above was visually observed and evaluated by the following criteria.

Uniform: Appearance of stretched beading was uniform.
Non-uniform: Appearance of stretched beading was not uniform, e.g., cracking, swelling, and coarseness and fineness were observed in the stretched beading.

<Content of Polymer D and the Like>

Content of Polymer D and the Like Contained in PTFE Powder

The content of polymer D contained in PTFE powder was determined using the following formula from a spectrum obtained by solid-state $^{19}$F-MAS NMR measurement:

$$Y=(4B/(5A+3B))\times100$$

Y: Content (mol %) of polymer D
A: Integral value of signal at −120 ppm
B: Sum of integral values of $CF_2$ and $CF_3$ signals at −83 ppm The chemical shift value used was a value obtained when the peak top of the signal derived from the backbone of PTFE was −120 ppm.

<Melt Viscosity>

The melt viscosity was measured while maintaining 2 g of a sample, which were heated at 340° C. for 5 minutes in advance, at that temperature under a load of 0.7 MPa in accordance with ASTM D 1238 using a flow tester (manufactured by Shimadzu Corporation) and a 2φ-8 L die.

<Oxygen Concentration in Reactor>

Gas discharged from the discharge gas line connected to the reactor was measured and analyzed using a low-concentration oxygen analyzer (trade name "PS-820-L", manufactured by Iijima Electronics Corporation) to thus determine the oxygen concentration in the reactor during polymerization.

Preparation Example 1

220 g of monomer D represented by $CH_2$=$CFCF_2OCF$ ($CF_3$) COOH, 513 g water, and ammonium persulfate (APS) (0.5 mol % of the monomer D) were added to a reactor, and heated and stirred at 60° C. for 24 hours in a nitrogen atmosphere to obtain a polymer D aqueous solution D-1 containing polymer D which is a homopolymer of $CH_2$=$CFCF_2OCF(CF_3)COOH$. As a result of GPC analysis of the resulting polymer D aqueous solution D-1, the polymer D had a Mw of $18\times10^4$, a Mn of $8.6\times10^4$, and a content of the dimer and the trimer of 2.0% by mass based on the polymer D.

Water was added to the resulting polymer D aqueous solution D-1 to adjust the concentration of the polymer D to 5.0% by mass, and then the aqueous solution was brought into contact with an ultrafiltration membrane (a molecular weight cut-off of 50,000 Da, made of polyethylene) at 30° C. at a water pressure of 0.1 MPa to carry out ultrafiltration. While suitably adding water, ultrafiltration was continued until a filtrate of water in an amount 7 times greater than the aqueous solution was eventually eluted, and thus a polymer D aqueous solution D-2 was obtained. As a result of GPC analysis of the resulting polymer D aqueous solution D-2, the polymer D had a Mw of $18\times10^4$, a Mn of $14\times10^4$, and a content of the dimer and the trimer of less than 1 mass ppm based on the polymer D. The concentration of the resulting polymer D aqueous solution D-2 was 5.0% by mass.

Example 1

To a reactor made of SUS with an internal volume of 6 L and equipped with a stirrer, 3,457 g of deionized water, 180 g of paraffin wax, 107.4 g of the polymer D aqueous solution D-2, and 1.1 g of an aqueous solution of isopropanol having a concentration of 1.0% by mass were added. Aqueous ammonia was added to adjust the pH to 9.1. Next, the contents of the reactor were suctioned while being heated to 70° C., and, at the same time, the reactor was purged with TFE to remove oxygen in the reactor, and the contents were stirred. After 0.54 g of PMVE was added to the reactor, TFE was added until the pressure was 0.73 MPaG. Then, 17.9 mg of an ammonium persulfate (APS) initiator dissolved in 20 g of deionized water was added to the reactor such that the pressure of the reactor was 0.83 MPaG. After the initiator was added, the pressure dropped, and the initiation of polymerization was observed. TFE was added to the reactor to maintain a constant pressure of 0.78 MPaG. When TFE consumed in the reaction reached about 180 g, the supply of TFE and stirring were stopped. Subsequently, the gas in the reactor was slowly released until the pressure of the reactor reached 0.02 MPaG. Thereafter, TFE was supplied until the pressure of the reactor was 0.78 MPaG, and stirring was started again to continue the reaction. When TFE consumed in the reaction reached about 540 g, 14.3 mg of hydroquinone dissolved in 20 g of deionized water was added to the reactor, and the reaction was continued. When TFE consumed in the reaction reached about 1,200 g, the supply of TFE was stopped, stirring was stopped, and the reaction was terminated. Thereafter, the reactor was evacuated until the pressure in the reactor reached normal pressure, and the contents were taken out from the reactor and cooled. The supernatant paraffin wax was removed from the PTFE aqueous dispersion. Various physical properties of the resulting PTFE aqueous dispersion were measured. The results are shown in Table 2.

The resulting PTFE aqueous dispersion was diluted with deionized water to have a solid concentration of about 10% by mass and coagulated under a high-speed stirring condition. The coagulated wet powder was dried at 210° C. for 18 hours. Various physical properties of the resulting PTFE powder were measured. The results are shown in Table 2.

Example 2

Polymerization was performed in the same manner as in Example 1 except that the amount of the aqueous solution of isopropanol added was changed to 2.1 g. Various physical properties of the resulting PTFE aqueous dispersion were measured. The results are shown in Table 2.

PTFE powder was obtained in the same manner as in Example 1, and various physical properties of the resulting PTFE powder were measured. The results are shown in Table 2.

Example 3

Polymerization was performed in the same manner as in Example 1 except that the isopropanol aqueous solution was changed to 1.1 g of a methanol aqueous solution having a concentration of 1.0% by mass, and when to stop supplying TFE was changed from when TFE consumed in the reaction reached about 1,200 g to when TFE consumed in the reaction reached about 900 g. Various physical properties of the resulting PTFE aqueous dispersion were measured. The results are shown in Table 2.

A PTFE powder was obtained in the same manner as in Example 1, and various physical properties of the resulting PTFE powder were measured. The results are shown in Table 2.

Example 4

Polymerization was performed in the same manner as in Example 1 except that the aqueous solution of isopropanol was changed to 1.8 g of an aqueous solution of Triton X-100 (trade name, manufactured by The Dow Chemical Company) having a concentration of 0.1% by mass. Various physical properties of the resulting PTFE aqueous dispersion were measured. The results are shown in Table 2.

A PTFE powder was obtained in the same manner as in Example 1, and various physical properties of the resulting PTFE powder were measured. The results are shown in Table 2.

Example 5

Polymerization was performed in the same manner as in Example 1 except that 0.9 g of the aqueous solution of Triton having a concentration of 0.1% by mass was further added to the reactor together with the aqueous solution of isopropanol. Various physical properties of the resulting PTFE aqueous dispersion were measured. The results are shown in Table 2.

A PTFE powder was obtained in the same manner as in Example 1, and various physical properties of the resulting PTFE powder were measured. The results are shown in Table 2.

Example 6

Polymerization was performed in the same manner as in Example 1 except that 1.8 g of the aqueous solution of Triton having a concentration of 0.1% by mass was further added to the reactor together with the aqueous solution of isopropanol. Various physical properties of the resulting PTFE aqueous dispersion were measured. The results are shown in Table 2.

A PTFE powder was obtained in the same manner as in Example 1, and various physical properties of the resulting PTFE powder were measured. The results are shown in Table 2.

Example 7

Polymerization was performed in the same manner as in Example 1 except that PMVE was changed to 2.4 g of HFP. Various physical properties of the resulting PTFE aqueous dispersion were measured. The results are shown in Table 2.

A PTFE powder was obtained in the same manner as in Example 1, and various physical properties of the resulting PTFE powder were measured. The results are shown in Table 2.

Example 8

Polymerization was performed in the same manner as in Example 7 except that 1.8 g of the aqueous solution of Triton having a concentration of 0.1% by mass was further added to the reactor together with the aqueous solution of isopropanol. Various physical properties of the resulting PTFE aqueous dispersion were measured. The results are shown in Table 2.

A PTFE powder was obtained in the same manner as in Example 1, and various physical properties of the resulting PTFE powder were measured. The results are shown in Table 2.

Example 9

Polymerization was performed in the same manner as in Example 5 except that the aqueous solution of Triton added to the reactor was changed to 1.25 g of the aqueous solution of Triton having a concentration of 0.1% by mass, the amount of PMVE added was changed to 0.27 g, and a constant pressure was maintained without stopping the feeding of TFE and stirring when TFE consumed in the reaction reached about 180 g. Various physical properties of the resulting PTFE aqueous dispersion were measured. The results are shown in Table 2.

A PTFE powder was obtained in the same manner as in Example 1, and various physical properties of the resulting PTFE powder were measured. The results are shown in Table 2.

Comparative Example 1

Polymerization was performed in the same manner as in Example 1 except that the aqueous solution of isopropanol was not added to the reactor. Various physical properties of the resulting PTFE aqueous dispersion were measured. The results are shown in Table 2.

A PTFE powder was obtained in the same manner as in Example 1, and various physical properties of the resulting PTFE powder were measured. The results are shown in Table 2.

[Table 2]

dimer and trimer of the monomer G was less than 1 mass ppm based on the polymer G. The concentration of the resulting polymer G aqueous solution G-2 was 23.2% by mass.

Example 10

To a glass reactor having a content of 1 L and equipped with a stirrer, 520 g of deionized water and 11.9 g of a polymer G aqueous solution G-2 were added. Next, the contents of the reactor were suctioned while being heated to 70° C., and, at the same time, the reactor was purged with a TFE monomer to remove oxygen in the reactor. Then, the contents were stirred at 540 rpm. After 0.12 g of ethane was added to the reactor, a TFE monomer was added until the pressure was 0.73 MPaG.

TABLE 2

|  |  | Example 1 | Example 2 | Example 3 | Example 4 | Example 5 | Example 6 | Example 7 | Example 8 | Example 9 | Comparative Example 1 |
|---|---|---|---|---|---|---|---|---|---|---|---|
| Type of modifying monomer |  | PMVE | PMVE | PMVE | PMVE | PMVE | PMVE | HFP | HFP | PMVE | PMVE |
| Modification amount | % by mass/PTFE | 0.035 | 0.038 | 0.049 | 0.036 | 0.037 | 0.037 | 0.105 | 0.094 | 0.046 | 0.037 |
| Solid concentration | % by mass | 25.5 | 24.2 | 19.7 | 24.9 | 24.6 | 24.4 | 25.0 | 24.4 | 24.7 | 24.5 |
| Average primary particle size | nm | 294 | 280 | 328 | 331 | 266 | 215 | 310 | 261 | 251 | 372 |
| Number of particles | $\times 10^{13}$ particles/ml | 1.13 | 1.22 | 0.58 | 0.77 | 1.45 | 2.72 | 0.94 | 1.52 | 1.74 | 0.53 |
| Aspect ratio | — | 1.45 | 1.42 | 1.46 | 1.46 | 1.44 | 1.37 | 1.48 | 1.36 | 1.49 | 1.59 |
| Standard specific gravity | — | 2.174 | 2.180 | 2.189 | 2.158 | 2.174 | 2.173 | 2.177 | 2.176 | 2.175 | 2.159 |
| Peak temperature | ° C. | 341 | 342 | 340 | 343 | 341 | 341 | 342 | 342 | 340 | 343 |
| Content of polymer D | % by mass | 0.44 | 0.47 | 0.61 | 0.45 | 0.46 | 0.46 | 0.45 | 0.46 | 0.46 | 0.46 |
| Extrusion pressure | MPa | 26.0 | 25.1 | 27.5 | 25.6 | 26.4 | 26.3 | 25.9 | 25.3 | 25.7 | 25.5 |
| Breaking strength A | N | 21.0 | 20.8 |  | 20.2 | 21.7 | 22.5 | 18.1 | 18.6 | 20.3 | 17.4 |
| Stress relaxation time | sec | 211 | 214 |  | 311 | 221 | 253 | 432 | 232 | 257 | 209 |
| Appearance of stretched product | — | Uniform | Uniform |  | Uniform | Uniform | Uniform | Uniform | Uniform | Uniform | Uniform |

Preparation Example 2

According to the procedure described in Comparative Example 2 of International Publication No. WO 2011/034179, obtained was a polymer G aqueous solution G-1 containing 24.8% by mass of a polymer G containing repeating units derived from $CF_2=CF_2$ and $CF_2=CF-O-(CF_2)_2-SO_3H$ and having a content of a repeating unit derived from $CF_2=CF-O-(CF_2)_2-SO_3H$ (a monomer G) of 18 mol %. The number average molecular weight of the resulting polymer G was $3.0\times10^5$. The number average molecular weight of the polymer G was calculated from the melt flow rate of the polymer G. The melt flow rate was measured in accordance with JIS K 7210 under conditions having 270° C. and 2.16 kg load. The monomer composition of the polymer G was calculated from the value of melt NMR measurement at 300° C.

Water was added to the resulting polymer G aqueous solution G-1, and then the aqueous solution was brought into contact with an ultrafiltration membrane (a molecular weight cut-off of 10,000 Da, made of polyethylene) at 30° C. at a water pressure of 0.1 MPa to carry out ultrafiltration. While suitably adding water, ultrafiltration was continued until a filtrate of water in an amount 5 times greater than the aqueous solution was eventually eluted, and thus a polymer G aqueous solution G-2 was obtained. The content of the Then, 55 mg of an ammonium persulfate (APS) initiator dissolved in 20 g of deionized water was added to the reactor such that the pressure of the reactor was 0.83 MPaG. After the initiator was added, the pressure dropped, and the initiation of polymerization was observed. A TFE monomer was added to the reactor to maintain pressure, and polymerization was continued until about 50 g of the TFE monomer had reacted. Thereafter, the reactor was evacuated until the pressure in the reactor reached normal pressure, and the contents were taken out from the reactor and cooled to obtain a PTFE aqueous dispersion. Various physical properties of the resulting PTFE aqueous dispersion were measured. The results are shown in Table 3.

After a PTFE powder was obtained in the same manner as in Example 1 except that the drying temperature was changed to 150° C., various physical properties of the resulting PTFE powder were measured. The results are shown in Table 3.

The resulting PTFE was low molecular weight PTFE.

Comparative Example 2

Polymerization was performed in the same manner as in Example 10 except that ethane was not added. Aggregation started simultaneously with the initiation of polymerization, and thus polymerization was terminated. Accordingly, it was found that a stable PTFE aqueous dispersion cannot be obtained.

TABLE 3

|  |  | Example 10 |
|---|---|---|
| Solid concentration | % by mass | 8.6 |
| Average primary particle size | nm | 63 |
| Number of particles | ×10$^{13}$ particles/ml | 31.6 |
| Melt viscosity | Pa · s | 7.1 × 10$^2$ |
| Peak temperature | ° C. | 325 |
| Content of polymer G | % by mass | 4.96 |

Preparation Example 3

To the reactor, 1,650 g of perfluoro-(6,6-dihydro-2-trifluoromethyl-3-oxa-5-hexenoic acid) (a monomer D) and 3,850 g of water were added, and the liquid in the reactor was stirred for 30 minutes at room temperature while N$_2$ bubbling. While stirring at 52° C., ammonium persulfate (APS) was added in an amount corresponding to 0.5 mol % based on the amount of the monomer D to initiate the reaction. The reaction was terminated after stirring for 23 hours. The oxygen concentration in the reactor varied between 11 volume ppm and 20 volume ppm. A polymer H aqueous solution H-1 containing a polymer H, which is a homopolymer of the monomer D, was obtained.

Water was added to the resulting polymer H aqueous solution H-1 to adjust the concentration of polymer H to 2.0% by mass, and then the aqueous solution was brought into contact with an ultrafiltration membrane (a molecular weight cut-off of 50,000 Da, made of polyacrylonitrile) at 25° C. at a water pressure of 0.1 MPa to carry out ultrafiltration. While suitably adding water, ultrafiltration was continued until a filtrate of water in an amount 7 times greater than the aqueous solution was eventually eluted, and thus a polymer H aqueous solution H-2 was obtained. As a result of GPC analysis of the resulting polymer H aqueous solution H-2, the polymer H had a Mw of 46.0×10$^4$, a Mn of 12.2×10$^4$, and a content of the dimer and the trimer of 0.1% by mass or less based on the polymer H. The concentration of the resulting polymer H aqueous solution H-2 was 2.1% by mass.

Example 11

To a reactor, 504 g of deionized water, 26.2 g of the polymer H aqueous solution H-2, and 1.7 mg of polyoxyethylene (10) octylphenyl ether were added, 0.012 g of propane was added in place of 0.12 g of ethane, 143 mg of an ammonium persulfate (APS) initiator dissolved in 20 g of deionized water was added to the reactor, and polymerization was carried out in the same manner as Example 10. Polymerization was continued until about 110 g of the TFE monomer had reacted, and thus a PTFE aqueous dispersion was obtained. Various physical properties of the resulting PTFE aqueous dispersion were measured. The results are shown in Table 4.

After a PTFE powder was obtained in the same manner as in Example 10, various physical properties of the resulting PTFE powder were measured. The results are shown in Table 4.

The resulting PTFE was low molecular weight PTFE.

TABLE 4

|  |  | Example 11 |
|---|---|---|
| Solid concentration | % by mass | 15.9 |
| Average primary particle sze | nm | 177 |
| Number of particles | ×10$^{13}$ particles/ml | 2.86 |
| Melt viscosity | Pa · s | 2.9 × 10$^4$ |
| Peak temperature | ° C. | 327 |
| Content of polymer H | % by mass | 0.25 |

Example 12

To a reactor made of SUS with an internal volume of 6 L and equipped with a stirrer, 3,302 g of deionized water, 104 g of paraffin wax, 255.7 g of the polymer H aqueous solution H-2, 1.1 g of an aqueous solution of isopropanol having a concentration of 1.0% by mass, and 1.25 g of an aqueous solution of TMN-100X (manufactured by The Dow Chemical Company) having a concentration of 0.1% by mass were added. Aqueous ammonia was added to adjust the pH to 8.7. Next, the contents of the reactor were suctioned while being heated to 70° C., and, at the same time, the reactor was purged with TFE to remove oxygen in the reactor, and the contents were stirred. The operation after adding 2.4 g of HFP was the same as in Example 1 to carry out polymerization. Various physical properties of the resulting PTFE aqueous dispersion were measured. The results are shown in Table 5.

The resulting PTFE aqueous dispersion was coagulated in the same manner as in Example 1. The coagulated wet powder was dried at 240° C. for 18 hours. Various physical properties of the resulting PTFE powder were measured. The results are shown in Table 5.

Example 13

Polymerization was carried out in the same manner as in Example 12 except that an aqueous solution of T-Det A138 (manufactured by Harcros Chemicals) was used in place of an aqueous solution of TMN-100X (manufactured by The Dow Chemical Company). Various physical properties of the resulting PTFE aqueous dispersion were measured. The results are shown in Table 5.

After a PTFE powder was obtained in the same manner as in Example 12, various physical properties of the resulting PTFE powder were measured. The results are shown in Table 5.

Example 14

Polymerization was carried out in the same manner as in Example 12 except that an aqueous solution of T-Det A1315 (manufactured by Harcros Chemicals) was used in place of an aqueous solution of TMN-100X (manufactured by The Dow Chemical Company). Various physical properties of the resulting PTFE aqueous dispersion were measured. The results are shown in Table 5.

After a PTFE powder was obtained in the same manner as in Example 12, various physical properties of the resulting PTFE powder were measured. The results are shown in Table 5.

TABLE 5

|  |  | Example 12 | Example 13 | Example 14 |
|---|---|---|---|---|
| Type of modifying monomer |  | HFP | HFP | HFP |
| Modification amount | % by mass/PTFE | 0.080 | 0.083 | 0.091 |
| Solid concentration | % by mass | 25.6 | 25.6 | 25.1 |
| Average primary particle size | nm | 233 | 219 | 219 |
| Number of particles | $\times 10^{13}$ particles/ml | 2.28 | 2.74 | 2.67 |
| Aspect ratio | — | 1.45 | 1.38 | 1.39 |
| Standard specific gravity | — | 2.179 | 2.178 | 2.178 |
| Peak temperature | ° C. | 343 | 343 | 343 |
| Content of polymer H | % by mass | 0.44 | 0.44 | 0.45 |
| Extrusion pressure | MPa | 22.0 | 21.3 | 21.2 |
| Breaking strength A | N | 23.2 | 22.9 | 26.1 |
| Stress relaxation time | sec | 129 | 177 | 189 |
| Appearance of stretched product | — | Uniform | Uniform | Uniform |

What is claimed is:

1. A method for producing polytetrafluoroethylene, comprising polymerizing tetrafluoroethylene in an aqueous medium in the presence of a nucleating agent and a polymer (I) containing a polymerization unit (I) based on a monomer represented by the general formula (I) to obtain polytetrafluoroethylene:

$$CX^1X^3=CX^2R(-CZ^1Z^2-A^0)_m \quad (I)$$

wherein $X^1$ and $X^3$ are each independently F, Cl, H, or $CF_3$; $X^2$ is H, F, an alkyl group, or a fluorine-containing alkyl group; $A^0$ is an anionic group; R is a linking group; $Z^1$ and $Z^2$ are each independently H, F, an alkyl group, or a fluorine-containing alkyl group; and m is an integer of 1 or more, primary particles of the polytetrafluoroethylene have an aspect ratio of less than 2.00, and the nucleating agent is a chain transfer agent and one or both of a nonionic surfactant and fluoropolyether.

2. The production method according to claim 1, wherein the anionic group is at least one selected from the group consisting of a sulfate group, a carboxylate group, a phosphate group, a phosphonate group, a sulfonate group, and $-C(CF_3)_2OM$, wherein M is $-H$, a metal atom, $-NR^7_4$, imidazolium optionally having a substituent, pyridinium optionally having a substituent, or phosphonium optionally having a substituent, and $R^7$ is H or an organic group.

3. The production method according to claim 1, wherein the polymer (I) has a number average molecular weight of $1.0 \times 10^4$ or more.

4. The production method according to claim 1, wherein m in the general formula (I) is 1.

5. The production method according to claim 1, wherein the chain transfer agent is at least one selected from the group consisting of alcohols having 1 to 4 carbon atoms and alkanes having 2 to 4 carbon atoms.

6. The production method according to claim 1, wherein the chain transfer agent is at least one selected from the group consisting of isopropanol, sec-butanol, and tert-butanol.

7. The production method according to claim 1, wherein the nonionic surfactant is at least one selected from the group consisting of a nonionic surfactant represented by the general formula (i) and a nonionic surfactant represented by the general formula (ii):

$$R^3-O-A^1-H \quad (i)$$

wherein $R^3$ is a linear or branched primary or secondary alkyl group having 8 to 18 carbon atoms, and $A^1$ is a polyoxyalkylene chain; and $$R^4-C_6H_4-O-A^2-H \quad (ii)$$

wherein $R^4$ is a linear or branched primary or secondary alkyl group having 4 to 12 carbon atoms, and $A^2$ is a polyoxyalkylene chain.

8. The production method according to claim 1, wherein the nucleating agent is the chain transfer agent and the nonionic surfactant.

9. The production method according to claim 1, wherein tetrafluoroethylene and a modifying monomer are polymerized.

10. The production method according to claim 1, wherein the polytetrafluoroethylene is low molecular weight polytetrafluoroethylene.

* * * * *